US009524606B1

(12) United States Patent
Stasi et al.

(10) Patent No.: US 9,524,606 B1
(45) **Date of Patent: *Dec. 20, 2016**

(54) METHOD AND SYSTEM FOR PROVIDING DYNAMIC CASINO GAME SIGNAGE WITH SELECTABLE MESSAGING TIMED TO PLAY OF A TABLE GAME

(75) Inventors: Perry Brian Stasi, Henderson, NV (US); Ryan Patrick McClellan, Las Vegas, NV (US)

(73) Assignee: Visualimits, LLC, Las Vegas, NV (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/904,778

(22) Filed: Sep. 28, 2007

Related U.S. Application Data

(63) Continuation-in-part of application No. 11/590,283, filed on Oct. 31, 2006, now abandoned, which is a continuation-in-part of application No. 11/359,225, filed on Feb. 22, 2006, now abandoned, and a continuation-in-part of application No. 11/245,930, filed on Oct. 7, 2005, now abandoned.

(60) Provisional application No. 60/683,753, filed on May 23, 2005.

(51) Int. Cl.

| | |
|---|---|
| ***A63F 13/00*** | (2014.01) |
| ***G07F 17/32*** | (2006.01) |
| ***F16K 7/12*** | (2006.01) |

(52) U.S. Cl.
CPC ........... *G07F 17/3211* (2013.01); *F16K 7/126* (2013.01)

(58) Field of Classification Search
CPC ............................ G07F 17/40; G07F 17/3211
USPC .............................................. 463/31; 40/463
See application file for complete search history.

(56) References Cited

U.S. PATENT DOCUMENTS

| | | | |
|---|---|---|---|
| 4,856,787 | A | 8/1989 | Itkis |
| 5,280,909 | A | 1/1994 | Tracy |
| 5,382,025 | A | 1/1995 | Sklansky et al. |
| 5,490,670 | A | 2/1996 | Hobert |
| 5,570,885 | A | 11/1996 | Ornstein |
| 5,573,248 | A | 11/1996 | Parra et al. |
| 5,586,766 | A | 12/1996 | Forte et al. |

(Continued)

FOREIGN PATENT DOCUMENTS

| | | |
|---|---|---|
| WO | WO 99/42186 | 8/1999 |

OTHER PUBLICATIONS

Office Action Dated Feb. 26, 2008 From Related Co-Pending U.S. Appl. No. 11/359,225.

(Continued)

*Primary Examiner* — Milap Shah
*Assistant Examiner* — Thomas H Henry
(74) *Attorney, Agent, or Firm* — Muskin & Farmer LLC

(57) ABSTRACT

A methodology and apparatus for providing casino game signage for a casino game which incorporates display information that is dynamically interchangeable between game specific and game non-specific information responsive to automatic detection of game play status at the game table. At least one electronic display is provided at respective casino game tables, and selected display information is wirelessly transmitted, and/or manually delivered, thereto. The display information which is displayed is dynamically selected based upon a sensor automatically detecting the status of play of the game, being game specific during play and selectively game specific and game non-specific during game play inactivity.

47 Claims, 27 Drawing Sheets

(56) References Cited

U.S. PATENT DOCUMENTS

| | | | |
|---|---|---|---|
| 5,613,912 | A | 3/1997 | Slater |
| 5,642,484 | A | 6/1997 | Harrison, III et al. |
| 5,718,431 | A | 2/1998 | Ornstein |
| 5,728,002 | A | 3/1998 | Hobert |
| 5,743,800 | A | 4/1998 | Huard et al. |
| 5,770,533 | A | 6/1998 | Franchi |
| 5,785,596 | A | 7/1998 | Hobert |
| 5,788,574 | A | 8/1998 | Ornstein et al. |
| 5,795,225 | A | 8/1998 | Jones et al. |
| 5,829,749 | A | 11/1998 | Hobert |
| 5,911,418 | A | 6/1999 | Adams |
| 5,911,626 | A | 6/1999 | McCrea, Jr. |
| 5,913,726 | A | 6/1999 | Jones et al. |
| 5,923,252 | A | 7/1999 | Sizer et al. |
| 5,934,998 | A | 8/1999 | Forte et al. |
| 5,941,769 | A * | 8/1999 | Order ............................ 463/12 |
| 5,941,772 | A | 8/1999 | Paige |
| 5,957,776 | A | 9/1999 | Hoehne |
| 5,966,696 | A | 10/1999 | Giraud |
| 6,015,347 | A | 1/2000 | Maahs et al. |
| 6,036,601 | A | 3/2000 | Heckel |
| 6,059,659 | A | 5/2000 | Busch et al. |
| 6,085,169 | A | 7/2000 | Walker |
| 6,089,975 | A | 7/2000 | Dunn |
| 6,123,335 | A | 9/2000 | Adkins |
| 6,146,270 | A | 11/2000 | Huard et al. |
| 6,165,069 | A | 12/2000 | Sines et al. |
| 6,217,447 | B1 | 4/2001 | Lofink et al. |
| 6,264,555 | B1 * | 7/2001 | Glazman et al. ................ 463/1 |
| 6,275,201 | B1 | 8/2001 | Kratzenberg |
| 6,283,856 | B1 | 9/2001 | Mothwurf |
| 6,293,864 | B1 | 9/2001 | Romero |
| 6,336,857 | B1 | 1/2002 | McBride |
| 6,345,824 | B1 | 2/2002 | Selitzky |
| RE37,588 | E | 3/2002 | Ornstein |
| 6,446,864 | B1 | 9/2002 | Kim et al. |
| 6,460,848 | B1 | 10/2002 | Soltys et al. |
| 6,484,148 | B1 | 11/2002 | Boyd |
| 6,485,368 | B2 | 11/2002 | Jones et al. |
| 6,517,073 | B1 | 2/2003 | Vancura |
| 6,575,834 | B1 | 6/2003 | Lindo |
| 6,585,586 | B1 | 7/2003 | Romero |
| 6,638,167 | B1 | 10/2003 | Sawyer et al. |
| 6,641,137 | B2 | 11/2003 | Sines et al. |
| 6,645,078 | B1 | 11/2003 | Mattice |
| 6,651,985 | B2 | 11/2003 | Sines et al. |
| 6,655,689 | B1 | 12/2003 | Stasi |
| 6,659,461 | B2 | 12/2003 | Yoseloff et al. |
| 6,698,020 | B1 | 2/2004 | Zigmond |
| 6,722,974 | B2 | 4/2004 | Sines et al. |
| 6,769,693 | B2 | 8/2004 | Huard et al. |
| 6,810,527 | B1 | 10/2004 | Conrad |
| 6,929,264 | B2 | 8/2005 | Huard et al. |
| 6,977,627 | B1 | 12/2005 | Dalton |
| RE38,982 | E | 2/2006 | Forte et al. |
| 7,107,346 | B2 | 9/2006 | Boyd |
| 7,136,906 | B2 | 11/2006 | Giacalone |
| 7,215,313 | B2 | 5/2007 | Giraldo et al. |
| 7,566,274 | B2 | 7/2009 | Johnson |
| 7,590,723 | B2 | 9/2009 | Mager |
| 7,901,285 | B2 | 3/2011 | Tran |
| 8,157,652 | B2 | 4/2012 | Nguyen |
| 2001/0028147 | A1 | 10/2001 | Ornstein et al. |
| 2001/0031664 | A1 | 10/2001 | Acres |
| 2001/0032121 | A1 | 10/2001 | Le |
| 2002/0042819 | A1 | 4/2002 | Reichert |
| 2002/0045478 | A1 | 4/2002 | Soltys |
| 2002/0057212 | A1 | 5/2002 | Hamilton |
| 2002/0058550 | A1 | 5/2002 | Pace |
| 2002/0069293 | A1 | 6/2002 | Natalio |
| 2002/0077170 | A1 | 6/2002 | Johnson et al. |
| 2002/0147638 | A1 | 10/2002 | Banerjee |
| 2002/0156677 | A1 | 10/2002 | Peters |
| 2003/0054887 | A1 | 3/2003 | Dettrey et al. |
| 2003/0125109 | A1 * | 7/2003 | Green ............................ 463/29 |
| 2003/0229897 | A1 | 12/2003 | Frisco |
| 2003/0232651 | A1 | 12/2003 | Huard et al. |
| 2004/0044574 | A1 | 3/2004 | Cochran et al. |
| 2004/0053655 | A1 | 3/2004 | Hyams et al. |
| 2004/0082389 | A1 * | 4/2004 | Yarbrough et al. ............. 463/46 |
| 2004/0148179 | A1 | 7/2004 | Kumhyr |
| 2004/0219975 | A1 | 11/2004 | Soltys et al. |
| 2004/0251630 | A1 | 12/2004 | Sines et al. |
| 2005/0026680 | A1 | 2/2005 | Gururajan |
| 2005/0051965 | A1 | 3/2005 | Gururajan |
| 2005/0059485 | A1 | 3/2005 | Paulsen |
| 2005/0082750 | A1 | 4/2005 | Grauzer |
| 2005/0121852 | A1 | 6/2005 | Soltys et al. |
| 2005/0137005 | A1 | 6/2005 | Soltys et al. |
| 2005/0258597 | A1 | 11/2005 | Soltys et al. |
| 2005/0288083 | A1 | 12/2005 | Downs |
| 2006/0019739 | A1 | 1/2006 | Soltys et al. |
| 2006/0079310 | A1 | 4/2006 | Friedman |
| 2006/0084502 | A1 | 4/2006 | Downs |
| 2006/0177109 | A1 | 8/2006 | Storch |
| 2006/0183540 | A1 | 8/2006 | Grauzer |
| 2006/0252521 | A1 | 11/2006 | Gururajan et al. |
| 2006/0252554 | A1 | 11/2006 | Gururajan et al. |
| 2006/0271415 | A1 | 11/2006 | Simmons |
| 2007/0011051 | A1 | 1/2007 | Findlay |
| 2007/0045959 | A1 | 3/2007 | Soltys |
| 2007/0077987 | A1 | 4/2007 | Gururajan et al. |
| 2007/0087834 | A1 | 4/2007 | Moser |
| 2007/0162328 | A1 | 7/2007 | Reich |
| 2007/0162342 | A1 | 7/2007 | Klopf |
| 2007/0206001 | A1 | 9/2007 | McKay |
| 2007/0267812 | A1 | 11/2007 | Grauzer et al. |
| 2008/0079600 | A1 | 4/2008 | Yono |
| 2008/0114656 | A1 | 5/2008 | Jersey |
| 2008/0161104 | A1 | 7/2008 | Fujimoto |
| 2009/0176566 | A1 | 7/2009 | Kelly |
| 2010/0030593 | A1 | 2/2010 | Kim |
| 2010/0210331 | A1 | 8/2010 | Hughes |
| 2010/0211431 | A1 | 8/2010 | Lutnick |
| 2010/0211442 | A1 | 8/2010 | Venkataraman |
| 2011/0098095 | A1 | 4/2011 | Kuhn |
| 2011/0191166 | A1 | 8/2011 | Joa |
| 2012/0203628 | A1 | 8/2012 | DeCaro |
| 2012/0300061 | A1 | 11/2012 | Osman |
| 2012/0330740 | A1 | 12/2012 | Pennington |
| 2013/0244778 | A1 | 9/2013 | Barclay |

OTHER PUBLICATIONS

"Multi-Table Display" Fact Sheets of TCS John Huxley, London, England Website: www.tcsjohnhuxley.com Mar. 3, 2006, 1 Page; Date of Publication Unknown.

"Omni Baccarat Display" Fact Sheets of TCS John Huxley, London, England Website: www.tcsjohnhuxley.com Mar. 3, 2006; 2 Pages; Date of Publication Unknown.

"E-FX Display" Fact Sheets of TCS John Huxley, London, England Website: www.tcsjohnhuxley.com Mar. 3, 2006; 2 Pages; Date of Publication Unknown.

"Accuplay Blackjack" Fact Sheets of TCS John Huxley, London, England Website: www.tcsjohnhuxley.com Mar. 3, 2006; 3 Pages; Date of Publication Unknown.

"One Link Media Systems" Fact Sheets of Paltronics, Inc., Crystal Lake, IL Website: www.paltronics.com, Dated 2004; 8 Pages.

"Edge-Let table Game Signs" Information Sheets of Bayworld Industries Inc. of Cotati, CA 94931 Website: www.bayworld.com, Dated 2004; 4 Pages.

"Dream Machines Table Displays" Brochure and Price Sheet of NuGames, LLC of Margate, NJ Website: www.nugames.biz, 3 Pages; Date of Publication Unknown.

"Casinolink enterprise edition" and "TableLink" Information Sheets of Progressive Gaming Intl. Corp. Las Vegas, NV 89119 Website: www.progressivegaming.net,Dec. 26, 2007; 6 Pages.

"Progressive Gaming Intl. Bolsters Its Table Management Solutions . . . " Business Wire Website: www.thefreelibrary.com, Dec. 21, 2004; 4 Pages.

(56) References Cited

OTHER PUBLICATIONS

"EZTRAK Black Jack Edition" LCD Based Tracking System of DEQ Systems Corp. of Levis, Quebec, Canada GGWSMG Website: www.deq.com; 2 Pages; Date of Publication Unknown.
"LED Illuminated Signs" Carmanah Technologies Corp. of Victoria, B.C., Canada V9A3S2 Website: www.casinosigns.net; Dated 1998-2007; 3 Pages.
Slot Machine with Display by Bally Technologies of Las Vegas, NV 89119 and in use at MGM grand Casino, Detroit, MI at least as early as 2007; 1 Page.
Craps Display Fact Sheet of IDX, Inc. of El dorado, AR 71730; Date Unknown, However Fact Sheet indicates "Patent Pending"; 1 Page.
"Min/Max table displays—Min/Max Displays Overview" Fact Sheets of Paltronics, Inc. Crystal Lake, IL Website: www.paltronics.com; Date of Publication Unknown; 2 Pages.
"Table Game Ads with Remote Control for Limit Changes" Fact Sheets of Creative Pastic Design, Las Vegas, NV Website: www.tablegameads.com; Date of Publication Unknown; 2 Pages.
"LD9000 Series Single & Double Side Pole Displays" Fact Sheets of Logic Controls of New Hyde Park, NY 11040 Website: www.logiccontrols.com; Date of Publication Unknown; 2 Pgs.
"PitTrak Table Tracking Systems" Internet Casinos of Crows Nest, Australia; Public Use since 1998 Website: www.internetcasinos.com/internetcasinos_vendors_5557.html; 2 Pages.
"Progressive Gaming International Bolsters Table Management Solutions" Press Release Dated Dec. 21, 2004 Website: www.rgtonline.com; 1 Page.
"Pit-Trak" Casino Streamlining Fact Sheets of Casino Software Solutions, Inc. of Denver, CO 80212 Website: www.casinosoftwaresolutions.com; Dated 2007; 3 Pages.
"Change-A-Limit" Product Fact Sheets From Website: www.change-a-limit.com of Action Packed gaming Products of Cocoa, FL; Believed Dated as early as Mar. 2008; 6 Pages.
"Table Game Ads" Product Fact Sheets from Website: www.tablegameads.com; Software Copyright Rivers Run of Troy, NY; Dated Dec. 21, 2007; 5 Pages.
U.S. Appl. No. 60/683,753, filed May 23, 2005, Stasi.
U.S. Appl. No. 11/359,225, filed Feb. 22, 2006, Stasi.
U.S. Appl. No. 11/590,283, filed Oct. 31, 2006, Stasi et al.
U.S. Appl. No. 11/245,930, filed Oct. 7, 2005, Stasi.
Office Action Dated Mar. 17, 2008 for U.S. Appl. No. 11/245,930.
Office Action Dated Sep. 22, 2008 for U.S. Appl. No. 11/245,930.
Casino Digital Signage. Sleek & Sharp, Progressives, Slot Toppers & Table Game Signs, http://www.fourwindsinteractive.com/casino-digital-signage/, 2011, 2 Pages, Four Winds Interactive, LLC.
Change-A-Limit, http://www.change-a-limit.com/, 2009 & 2011, 3 Pages, Action Packed Gaming Products.
Harnett, Robin, Casino Signs. Digital Table Limit Signs, http://carmanahsigns.com/casino/table-limits/, 5 Pages, Carmanah Signs.
Office Action Dated Apr. 28, 2009 for U.S. Appl. No. 11/245,930.
Office Action Dated Nov. 4, 2009 for U.S. Appl. No. 11/245,930.
Office Action Dated Jun. 8, 2010 for U.S. Appl. No. 11/245,930.
Office Action Dated Feb. 4, 2011 for U.S. Appl. No. 11/245,930.
Office Action Dated May 12, 2011 for U.S. Appl. No. 11/245,930.
Office Action Dated Dec. 15, 2011 for U.S. Appl. No. 11/245,930.
Office Action Dated Jul. 31, 2013 for U.S. Appl. No. 11/245,930.
Office Action Dated Jul. 8, 2010 for Related U.S. Appl. No. 11/590,283.
Office Action Dated Feb. 22, 2011 for Related U.S. Appl. No. 11/590,283.
Office Action Dated Oct. 12, 2011 for Related U.S. Appl. No. 11/590,283.
Office Action Dated Aug. 16, 2012 for Related U.S. Appl. No. 11/590,283.
Office Action Dated Apr. 2, 2013 for Related U.S. Appl. No. 11/590,283.
Office Action Dated Oct. 23, 2013 for Related U.S. Appl. No. 11/590,283.
Office Action Dated Aug. 24, 2011 for Related U.S. Appl. No. 12/502,923.
Office Action Dated Mar. 21, 2012 for Related U.S. Appl. No. 12/502,923.
Office Action Dated Oct. 15, 2012 for Related U.S. Appl. No. 12/502,923.
Office Action Dated Apr. 1, 2013 for Related U.S. Appl. No. 12/502,923.
Office Action Dated Dec. 5, 2013 for Related U.S. Appl. No. 12/502,923.
Office Action in U.S. Appl. No. 13/934,693 dated Jul. 15, 2015.
Office Action in U.S. Appl. No. 13/934,693 dated Feb. 6, 2015.
Office Action in U.S. Appl. No. 13/934,693 dated May 29, 2014.
Office Action in U.S. Appl. No. 13/934,693 dated Nov. 29, 2013.
Andrew Brisman, Mensa Guide to Casino Gambling Winning Ways, 1999.

* cited by examiner 190a
192
190'
60''''
68'
174''
60'''''
68R'
194
192a
192b
192c
192d
192e
192f
9D
PASS LINE
Don't Pass Bar
Don't Come Bar
4
5
SIX
8
NINE
10
COME
3•4•9•10•11
FIELD
HOP
BET
SEVEN
HORN BET
ANY CRAPS
190a'
192''
192'
192e
174''

METHOD AND SYSTEM FOR PROVIDING DYNAMIC CASINO GAME SIGNAGE WITH SELECTABLE MESSAGING TIMED TO PLAY OF A TABLE GAME

CROSS-REFERENCE TO RELATED APPLICATIONS

The present application is a continuation-in-part of regular patent application Ser. No. 11/590,283, filed on Oct. 31, 2006 now abandoned, which application Ser. No. 11/590,283 is presently pending and is a continuation-in-part of regular patent application Ser. No. 11/359,225, filed on Feb. 22, 2006 now abandoned, which application Ser. No. 11/359,225 is presently pending and is a continuation-in-part of regular patent application Ser. No. 11/245,930, filed on Oct. 7, 2005 now abandoned, which application Ser. No. 11/245,930 is presently pending and claims priority of provisional patent application Ser. No. 60/683,753 filed on May 23, 2005.

TECHNICAL FIELD

The present invention relates to signage used in casinos to inform players of game information at game tables. More particularly, the present invention relates to a method and system for providing casino game signage, wherein the information (or messaging) displayed is dynamically switchable, responsive to the status of play of a game, selectively between game specific information and game non-specific information.

BACKGROUND OF THE INVENTION

Casino games have various rules of play, for example limits on betting amounts, as well as odds, and/or various features of play of the game. Generally speaking, at each game, casino game signage is provided for conveying to the players game specific information. Ordinarily, this signage is in the form of a static placard, but may be also in the form of an electronic display. However, the casino game signage of any specific game need not be statically displayed at all times, as there are times when the game is inactive, as for example when paused during card shuffling, when the game is idle due to no players, or is closed, during which inactive times other forms of display could be provided or also provided.

The business of most casinos involves more than gaming, including, for example, restaurants, shows, exhibits, hostelry, and a plethora of other facilities. It would be, therefore, beneficial to the casino if in various places around the gaming floor advertisements and other information could be provided to the casino patrons.

Accordingly, what remains needed in casino operations is to somehow provide a method and/or system in which casino game signage can incorporate information that is not game specific.

SUMMARY OF THE INVENTION

The present invention is a casino methodology and system in which casino game signage for a casino game incorporates selectable messaging in the form of display information that is displayed in a dynamically interchangeable manner between game specific information and game non-specific information responsive to the status of play of the game at the game table of the game.

According to the present invention, an electronic display is provided at one or more casino game tables, at least one display for each game table, respectively, preferably at game tables throughout a casino. The game tables may be for a variety of games, as for a non-limiting example blackjack tables, roulette tables, baccarat tables, craps tables, etc. The display may utilize a screen provided by any electronic display technology, for example a cathode ray tube (CRT) or a plasma, but is more preferably LCD (liquid crystal diode) or OLED (organic light emitting diode) display screen. The display includes display electronics including for example an electronic interface which drives the display in response to receiving an output from a microprocessor.

By way of example of hardware for carrying out the present invention, a microprocessor (by "microprocessor" is meant a computational device conventionally inclusive of a central processing unit, memory, I/O interfaces, etc.) processes display information for being selectively displayed at the screen of the display, the display information being composed of game specific and game non-specific information, wherein the microprocessor may be located at the display, at a remote location, or both. In one hardware illustration, a microprocessor is located at a remote location, this microprocessor being designated as a "central microprocessor". The central microprocessor electronically communicates with an electronic interface or to a microprocessor at each display, respectively, which communication could be by direct wire, but is most preferably by wireless transmission. In a second hardware illustration, there is no central microprocessor and a microprocessor is located at each display, respectively, wherein the display includes a data port for receiving microprocessor programming and display information (i.e., game specific and game non-specific information) for being displayed at the screen of the display responsive to the microprocessor programming. It is preferred for the display to include a plurality of keys for controlling or altering the microprocessor programming and/or the display information, and/or entering the status of play of the game. It is further preferred for a sensor to automatically detect the status of play of the game, which status information is available to the microprocessor programming.

Displaying, selectively, at least one of the game specific information and the game non-specific information at the display is related to the status of play of the game at the game table. For example, when the status of play of the game at the game table is "inactive", there are, for non-limiting example, three possible types of game play inactivity: the game play may be "closed", wherein the game table is closed for playing of the game; the game play may be "idle", wherein the game table is open for playing of the game but no one is presently playing; or, the game play may be "paused", wherein the game is in play but paused as for example during a dealer's cards shuffle procedure, between the end of play of one game and the start of the next. When the status of play of the game is inactive, the microprocessor programming causes to be displayed at the display the game non-specific information, but also causes to be displayed the game specific information if the game play inactivity is due to the game play being idle or paused, wherein the display information displayed may be correlated to the type of game play inactivity (for example, if the game play inactivity is due to the game play being closed, preselected non-game specific information may then be displayed which is appropriate to a long duration of game play inactivity). When the status of play of the game is active (i.e., the game is actively in play), the microprocessor programming causes to be displayed at the display, preferably only, the game specific information. The display information displayed may be in static format and/or may be in moving picture format (i.e., video, streaming video, etc.), and may or may not include sound.

According to the method of the present invention, the displaying of the display information (i.e., game specific information and game non-specific information) may be dynamically changed at a remote location, at the display, or both.

According to a first example of the method according to the present invention, microprocessor programming and display information in the form of game specific information (i.e., game title, betting limits, and casino identification, etc.) and game non-specific information (i.e., advertisements, announcements, etc.) are provided and, from one or more locations in the casino, wirelessly sent to the displays at selected portions of the casino or throughout the casino. In this regard, the term "game specific information" means any information related to the game, including by way of illustration, but not limitation, the game title, the game betting limits, rules of play of the game, and identification of the casino or other facility whereat the game is played; and the term "game non-specific information" means any information unrelated to the game, including by way of illustration, but not limitation, advertisements, casino facilities information, announcements, and entertainment. It is to be understood that identification of the casino or other facility whereat the game is played can be considered game non-specific information, as well as being game specific information. Some displays may receive different game non-specific information depending, for example, upon location of game tables in the casino, the game betting limits, or the type of game that the game is. Additionally, or alternatively, authorized personnel may change the display information and/or the microprocessor programming of the display at the game table using the various keys thereat, as for example to switch between game specific and game non-specific information based upon, for example, the status of play of the game at the game table. With regard to switching display based upon status of play of the game, it is most preferred for a sensor (i.e., an electro-optical sensor detecting absence/presence of game play article (i.e., a card, puck, etc.) with respect to a location of the game table) to automatically detect the status of play of the game, which status information is available to the microprocessor programming.

Further for example, by way additionally or alternatively to the method described immediately above, the microprocessor programming and the display information in the form of game specific information and game non-specific information may be physically delivered to each display based upon data stored in a removable data storage device, as for example a laptop (notebook) computer with a data transfer cable (i.e., a USB cable), a USB flash memory drive, a flash memory card, etc., being inserted into a data port of the display, as for example a USB port a CF (compact flash) or an SD (secure digital) card port or other flash card port, etc. The microprocessor programming and/or the display information may remain on the data storage device and/or may be uploaded to a data storage device connected with microprocessor memory so as to be stored locally within the display. The display information and/or microprocessor programming is periodically changed by inserting into, or connecting to, the data port a data storage device having new or revised microprocessor programming and/or display information stored therein, and may also be changed remotely (i.e., by wireless communication) and/or by an operator. (for example, a dealer or casino personnel could manually set the status of the game, game limits and other features of the display other than the content of the game non-specific information via keys at the display). As mentioned above, with regard to switching display based upon status of play of the game, it is most preferred for a sensor (i.e., an electro-optical sensor detecting absence/presence of game play article (i.e., a card, puck, etc.) with respect to a location of the game table) to automatically detect the status of play of the game, which status information is available to the microprocessor programming. As further mentioned above, some displays may receive different game non-specific information depending, for example, upon location of game tables in the casino, the game bet limits, or the type of game that the game is.

It is an aspect of the present invention that the automatic detection of the status of play of the game may be combined with manual input (i.e., casino personnel manual key press input) of status of play of the game.

According to an additional aspect of the method according to the present invention, it is preferred to dynamically change the game specific information in response to preselected game play inactivity. For example, if the game play is idle for a predetermined period of time, then the betting limits would be manually or automatically lowered as an inducement to attract players to play the game at the game table and thereby encourage termination of the idleness of play.

According to a method of implementation of the present invention, advertisers are contracted with respect to paid advertisements for one or more display segments of the display of game non-specific information. Upon obtaining a contract with a casino for installation of displays at table games, the displays and associated electronics (as for example including automatic status of play of the game detectors (sensors)) are installed in the casino at various table games thereof, wherein the casino may receive the displays at no cost. Display segments of game non-specific information are determined and allocated among one or more of the advertisers and, preferably, also the casino. Thereupon, the invention as previously described is implemented with respect to selective display of game specific and game non-specific information.

Accordingly, it is an object of the present invention to provide a method and system in which casino game signage for a casino game incorporates display information that is dynamically interchangeable between game specific and game non-specific information responsive to the status of play of the game at the game table.

This and additional objects, features and advantages of the present invention will become clearer from the following specification of a preferred embodiment.

BRIEF DESCRIPTION OF THE DRAWINGS

FIG. 9O is a flow chart for a method of carrying out the present invention in a game in which the paused status of the game has a learned timing.

DESCRIPTION OF THE PREFERRED EMBODIMENT

Figure 1:
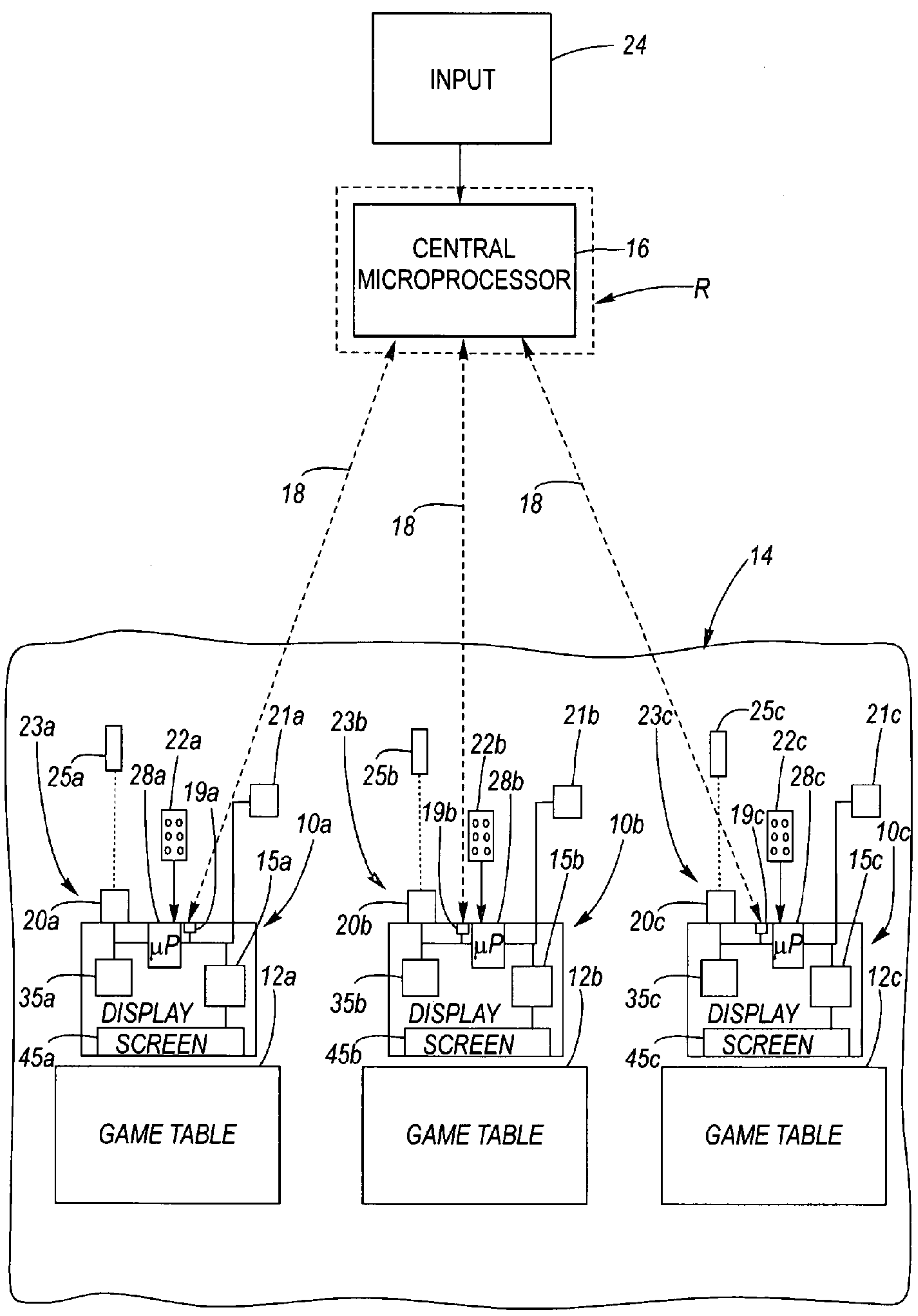
FIG. 1 is a schematic diagram of an implementation of the present invention.

Referring now to the Drawings, FIG. 1 depicts a general exemplification of a system and implementation of a method for the dynamically changeable casino signage messaging according to the present invention, wherein provided are any number of dynamically changeable casino game signage displays 10*a*, 10*b*, 10*c* for a plurality of casino game tables 12*a*, 12*b*, 12*c*, at least one display, respectively, for each game table (for example, a blackjack table may have one display, however a craps table may have two displays, one at each wing, respectively), across a casino gaming floor 14, wherein three displays and three casino game tables are merely an exemplification for illustration, as the number of displays and game tables is unlimited. The displays 10*a*, 10*b*, 10*c* display information that is dynamically interchangeable between game specific information and game non-specific information responsive to the status of play of the game at the respective game tables 12*a*, 12*b*, 12*c*. In this regard, the term "game specific information" means any information related to the game, including by way of illustration, but not limitation, the game title, the game betting limits, rules of play of the game, and identification of the casino or other facility whereat the game is played; and the term "game non-specific information" means any information unrelated to the game, including by way of illustration, but not limitation, advertisements, casino facilities information, announcements, and entertainment. It is to be understood that identification of the casino or other facility whereat the game is played can be considered game non-specific information, as well as being game specific information. In this regard further, when the status of play of the game is "inactive", there are, for non-limiting example, three possible types of game play inactivity: the game play may be "closed", wherein the game table is closed for playing of the game; the game play may be "idle", wherein the game table is open for playing of the game but no one is presently playing; or, the game play may be "paused", wherein the game is in play but paused as for example during a dealer's cards shuffle procedure, between the end of play of one game and the start of the next.

By way only of illustrative example, a central microprocessor 16 is provided with its microprocessor programming and its display information, wherein the central microprocessor is located at a remote location R of the casino. Each display 10*a*, 10*b*, 10*c*, has a respective microprocessor (μP) 28*a*, 28*b*, 28*c*, which is electronically connected to the central microprocessor 16, as for example by direct wire, but is more preferably by wireless transmission 18, wherein the wired or wireless transmission is most preferably two-way between the central microprocessor and each microprocessor of the displays.

Each display 10*a*, 10*b*, 10*c* preferably includes, for receiving microprocessor programming and display information, at least one data port 20 (see FIG. 6C) and, preferably, an electronic (wireless) communication component, as for example a wireless network interface card 19*a*, 19*b*, 19*c*, which may be a separate circuit board or may be resident in an electronic interface 15*a*, 15*b*, 15*c*. The electronic interface is, for example, in the form of one or more circuit boards having electronic components and circuitry for interfacing with the microprocessor and various ports, interfaces and buttons of the display, as well as driving the front and rear display screens (see FIGS. 7A through 7D) of the display. For example, microprocessor programming and display information (i.e., game specific and game non-specific information) may be based upon data stored in a removable data storage device 25*a*, 25*b*, 25*c*, as for example a laptop computer with a data transfer cable, a USB flash memory drive 25' (see example at FIG. 7A), a flash memory card 25 (see an example at FIG. 6C), etc., being inserted into each respective data port 20*a*, 20*b*, 20*c*, which may be, for example, a USB port, a CF or SD card port or other flash card port, etc. The microprocessor programming and the display information may remain on the data storage device and/or may be uploaded to an internal data storage device 35*a*, 35*b*, 35*c* within the display, for example, a hard drive, flash memory, or microprocessor memory. The microprocessor programming and/or the display information are periodically changed by inserting into each respective data port a new data storage device having new or revised microprocessor programming and/or display information stored therein, and may also be changed remotely by wired or wireless communication from the central microprocessor 16; and/or by an operator (i.e., dealer or casino personnel) manually via keys of a keypad 22*a*, 22*b*, 22*c*, or via keys on the display, itself (see FIGS. 6A through 7D); and/or via an automatic status of play of the game detector 21*a*, 21*b*, 21*c*, as for example discussed hereinbelow with respect to FIGS. 8A through 9K.

By way of exemplification, microprocessor programming and the display information for each of the displays is generated at one or more sources, such as an information technology facility and/or a video production facility, wherein the display information is in the form of game specific information and game non-specific information. The microprocessor programming and display information are input to an input interface 24 to the central microprocessor 16 and/or to each of the displays directly via, for example, the data storage devices 25*a*, 25*b*, 25*c* being inserted into the data ports 20*a*, 20*b*, 20*c*.

Each electronic display 10*a*, 10*b*, 10*c* is located at its respective casino game table 12*a*, 12*b*, 12*c* (at least one display per table), preferably game tables throughout the casino floor 14. The game tables 12*a*, 12*b*, 12*c* may be for a variety of games, as for a non-limiting example blackjack tables, roulette tables, baccarat tables, craps tables, etc. The display screen 45*a*, 45*b*, 45*c* may be provided by any suitable display technology, as for example a CRT, a plasma or preferably an LCD or OLED display screen.

With respect to FIG. 1, generally speaking each display 10*a*, 10*b*, 10*c* has display electronics 23*a*, 23*b*, 23*c* which for example include, respectively: a microprocessor 28*a*, 28*b*, 28*c*; internal electronic interface 15*a*, 15*b*, 15*c*; data port 20*a*, 20*b*, 20*c* for receiving a removable data storage device 25*a*, 25*b*, 25*c*; internal data storage device 35*a*, 35*b*, 35*c*, display screen 45*a*, 45*b*, 45*c*, interface for recognizing a keypad 22*a*, 22*b*, 22*c*; wireless network interface card 19*a*, 19*b*, 19*c*; and interface for recognizing a status of play of the game detector (sensor) 21*a*, 21*b*, 21*c*

Figure 1A:
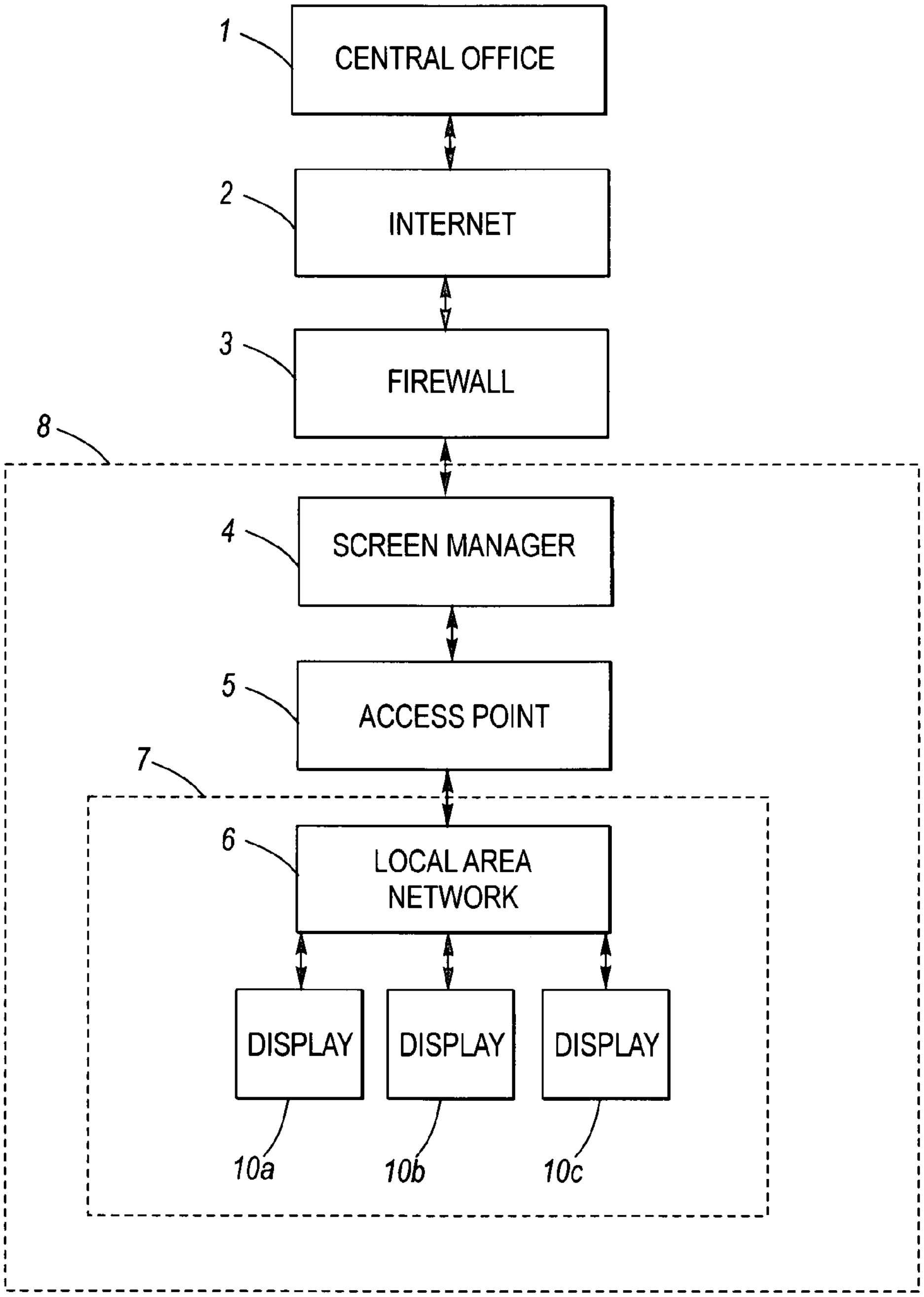
FIG. 1A is a flow chart representation of an internet-based implementation of FIG. 1.

FIG. 1A is a flow chart representation of an internet-based implementation of FIG. 1. In this regard, Block 1 represents one aspect of the present invention located on one side of the internet of Block 2, and Blocks 3 through 7 represent another aspect of the present invention located on the other side of the internet of Block 2; and wherein Block 8 represents an interface in which the displays 10*a*, 10*b*, 10*c* are updated with or without the internet of Block 2 via a screen manager computer at Block 4.

At Block 1, a selected computer in a predetermined office location provides programming of the game specific and game non-specific information and other programming and polling for the displays 10*a*, 10*b*, 10*c*. The selected computer at Block 1 receives data from the displays 10*a*, 10*b*, 10*c* and other locations, as for example casinos and/or advertisers, on the internet of Block 2 and provides commands and data selectively to the displays 10*a*, 10*b*, 10*c* and selected other locations on the internet, via the internet of Block 2. Block 2 is provided with respect to Block 1 preferably by a high speed data connection such as for non-limiting example DSL or cable.

At Block 3, a firewall is connected with the internet of Block 2 which is conventional to prevent unauthorized access downstream therefrom. At Block 4 a screen manager computer (i.e., the central microprocessor 16 at the remote location R) is connected to the access point at Block 5 as for example by a dedicated ethernet connection. The access point of Block 5 is a wireless router which wirelessly connects to the displays 10*a*, 10*b*, 10*c* utilizing preferably a WPA2 PSK encryption via the local area network of Block 6, wherein access to the local area network requires a log-in I.D. and password at the screen manager computer of Block 4, and/or at the central computer of Block 1.

The displays 10*a*, 10*b*, 10*c* are connected to the local area network (i.e. intranet) of Block 6 via a TCP socket. Once connected, the screen manager computer of Block 4 sends, for example, a command to set the time of day every 2 minutes the socket is idle, and further commands the displays to retrieve configuration files and data files via an FTP connection, which connection is established with a specific user name respectively for each display, the password being common to the displays. Each configuration and statistical file is encrypted with AES 1024 bit encryption.

Figure 2:
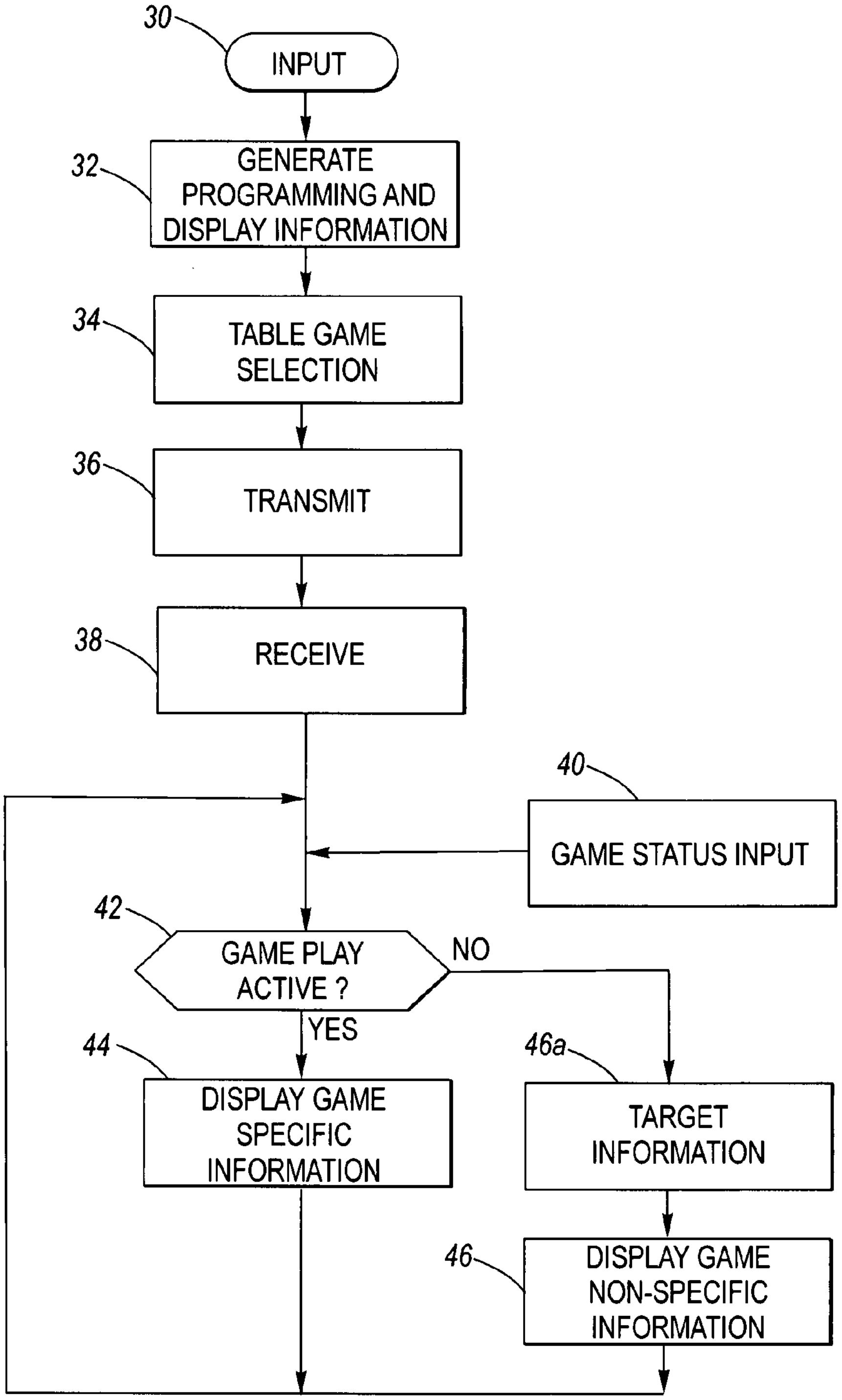
FIG. 2 is a flow chart of a first example for carrying out the method according to the present invention.
Figure 2A:
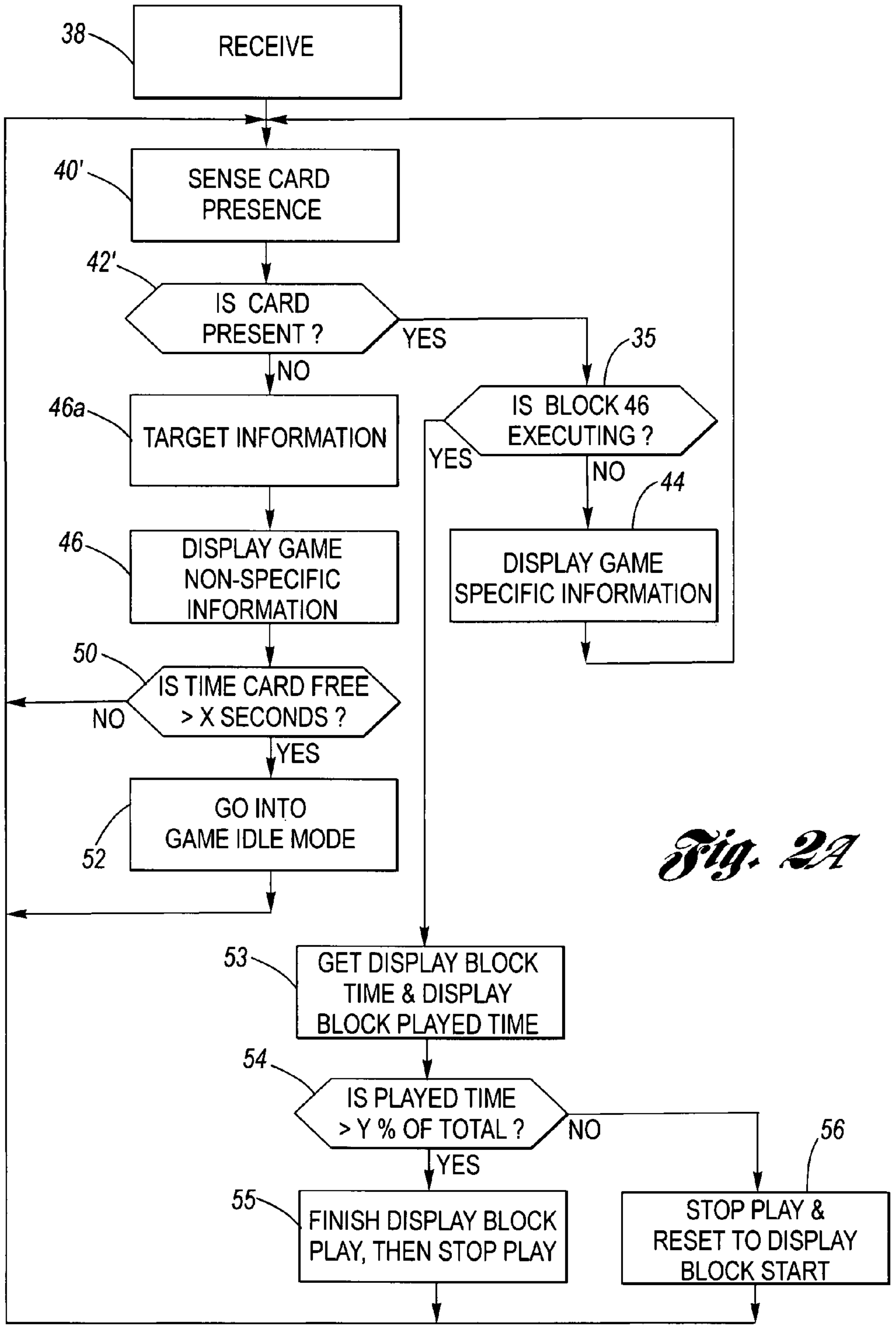
FIG. 2A is an alternative flow chart of the first example of FIG. 2, wherein status of play of the game is automatically detected.

Referring now to FIGS. 2 and 2A, depicted is a first example of algorithms for implementing the method according to the present invention, wherein a central microprocessor is present.

At Block 30 of FIG. 2, microprocessor programming and the display information for each of the displays is generated at one or more sources, such as an information technology facility and/or a video production facility, wherein the display information is in the form of game specific information and game non-specific information, and delivered to the input interface 24. At Block 32, the central microprocessor 16 generates the appropriate display information for each display, respectively. At Block 34, the central microprocessor pairs, according to its microprocessor programming, each display to its respective microprocessor programming and display information, provided, for example, by two-way recognition of an identification code, such as a unique alpha-numeric sequence, with respect to each display. At Block 36, the central microprocessor transmits the display information and any appropriate microprocessor programming for the displays. At Block 38 each individual display 10*a*, 10*b*, 10*c* receives its own specific display information and appropriate microprocessor programming. At Block 40, the status of play of the game is determined, as for example by a dealer input, using keys, for example on the keypad 22, the status of play of the game. Block 40 may also be an automatic status of play of the game detector, an example of implementation of which is shown at FIG. 2A. At Decision Block 42, inquiry is made by the microprocessor within the display whether the play of the game play is active or inactive, and if inactive, whether the play is closed, idle or paused. If the status of play of the game is active, then at Block 44, the microprocessor causes the electronic interface to display game specific information. This is exemplified at FIGS. 4A and 4B, whereat a display 60 displays at its screen 68 game specific information 62, for example in the form of the name of the game or type of game 62*a*, the dollar betting limits 62*b* of the game, and casino identification 62*c* whereat the game is situated. If the status of play of the game is inactive, then at Block 46, the microprocessor of the display causes the electronic interface to display at the screen 68 game non-specific information as exemplified at FIGS. 4C and 4D. In this regard, if the game play inactivity is because the game play is closed, then it is preferred for the display 60 to now display only the game non-specific information 66, 66*a*, for example an advertisement 66*a* as exemplified at FIG. 4C; however, if the game play inactivity is because the game play is idle or paused, then it is preferred for the display to then display both game specific information 62, 62*a*, 62*b* and game non-specific information 66, 66*a*, as exemplified at FIG. 4D, wherein it is preferred to continuously display the game specific information, and wherein the game specific information may be correlated to the type of game play inactivity (for example, a certain period of game play idleness may trigger information to be displayed which would induce players to play, i.e., lower betting limits). It is preferred to provide the game non-specific information to be tailored for displaying based upon predetermined factors, for example, the game specific information (i.e., the game bet minimums/maximums), the game location, or the game type so as to target the information to patrons at the game table; this can be accomplished by the central microprocessor 16 at Block 34 or by the microprocessor 28*a*, 28*b*, 28*c* at each display, respectively, via (optional) Block 46*a*. The execution of Decision Block 42 by each microprocessor 28*a*, 28*b*, 28*c* can be accomplished in conjunction with two-way communication 18 with the central microprocessor 16, wherein status of play of the game is communicated by the respective microprocessor to the central microprocessor, whereupon the central microprocessor sends thereto appropriate game non-specific information to be displayed.

Turning attention now to FIG. 2A, the algorithm of FIG. 2 is modified, after Block 38, to include an automatic status of play of the game detector, which detector, merely by way of exemplification is a card presence/absence detector, and which detector can be another game play article detector.

After Block 38, the status of play of the game is sensed at Block 40' by the status of play of the game detector 21*a*, 21*b*, 21*c* (implemented, by nonlimiting example, as discussed hereinbelow with respect to FIGS. 8A through 9K). At Decision Block 42', inquiry is made by the microprocessor within the display using the sensed information from Block 40' whether the status of play of the game play is active or inactive (card present means status of play is active, card not present means status of play is inactive).

If the answer to the inquiry at Decision Block 42' is no, meaning status of play of the game is inactive (because for nonlimiting example, no card is present i.e., a card is absent at a discard rack), then, after optional Block 46*a*, at Block 46 the microprocessor of the display causes the electronic interface to display at the screen 68 game non-specific information in the manner as discussed above. With regard to optional Block 46*a*, as mentioned above, it is preferred to provide the game non-specific information to be tailored for displaying based upon predetermined factors, for example, the game specific information (i.e., the game bet minimums/maximums), the game location, or the game type so as to target the information to patrons at the game table; this can be accomplished by the central microprocessor 16 at Block 34 or by the microprocessor 28*a*, 28*b*, 28*c* at each display, respectively, via (optional) Block 46*a*. The execution of Decision Block 42' by each microprocessor 28*a*, 28*b*, 28*c* can be accomplished in conjunction with two-way communication 18 with the central microprocessor 16, wherein status of play of the game is communicated by the respective microprocessor to the central microprocessor, whereupon the central microprocessor sends thereto appropriate game non-specific information to be displayed. The program then advances to Decision Block 50.

At Decision Block 50 inquiry is made as to whether a card has been absent from the discard rack for in excess of a predetermined time, as for example greater than 300 seconds. If the answer to the inquiry at Decision Block 50 is no, then the program returns to Block 40'. However, if the answer to the inquiry is yes, then the program advances to Block 52, whereat a game idle subroutine commences to run. This subroutine may, for example, cause the microprocessor to display game non-specific information (which may also include game specific information) based upon the play of the inactive game status now being changed from paused to idle, and may further include causing the microprocessor to invert (i.e., inversion of foreground for background) the displayed information at the rear of the display so as to serve as an alert to casino personnel of the extended duration of inactivity of the game; and/or may cause the microprocessor to initiate, after a predetermined time of card absence, as for example 30 minutes, reduction in the game limits to thereby attract players to the game table.

Figure 4A:
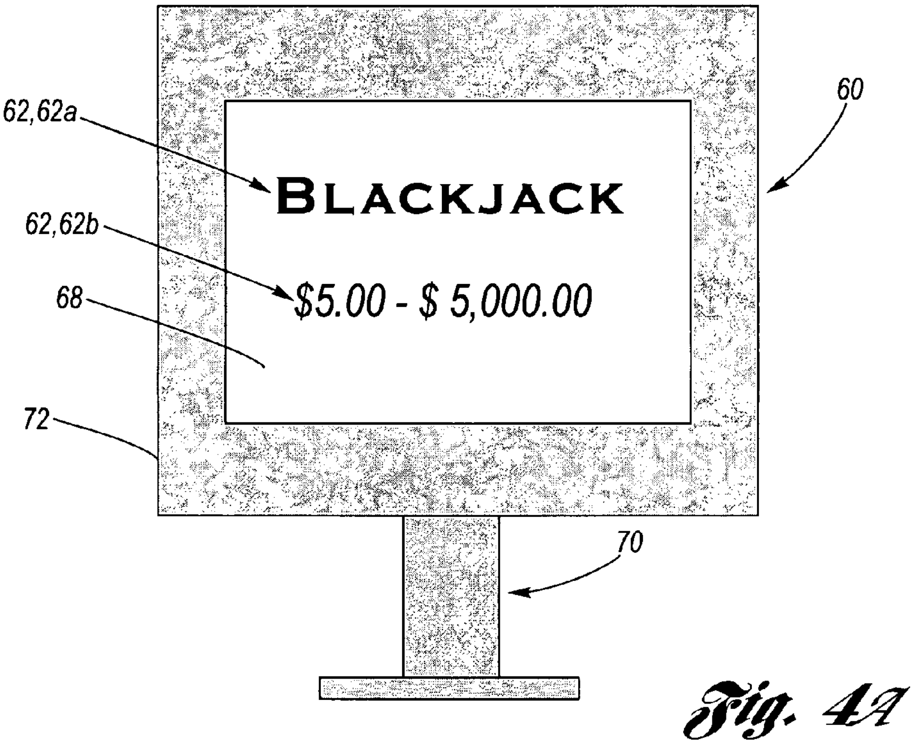
FIG. 4A is a schematic view of a display according to the present invention, wherein the display is displaying a first example of game specific information.
Figure 4B:
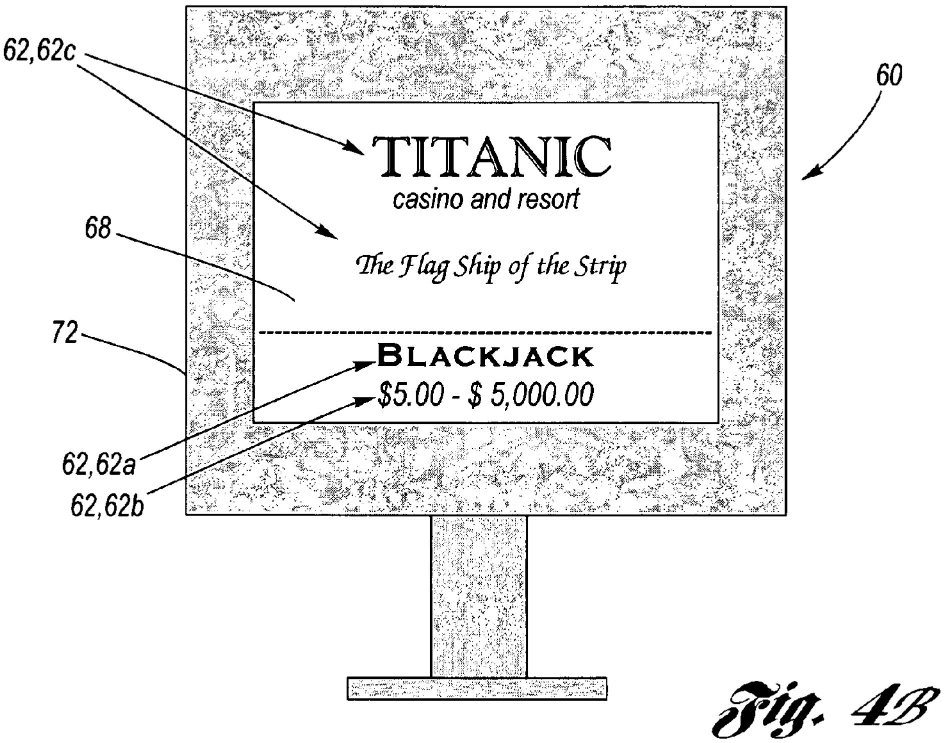
FIG. 4B is a schematic view of the display of FIG. 4A, wherein now the display is displaying a second example of game specific information.
Figure 4C:
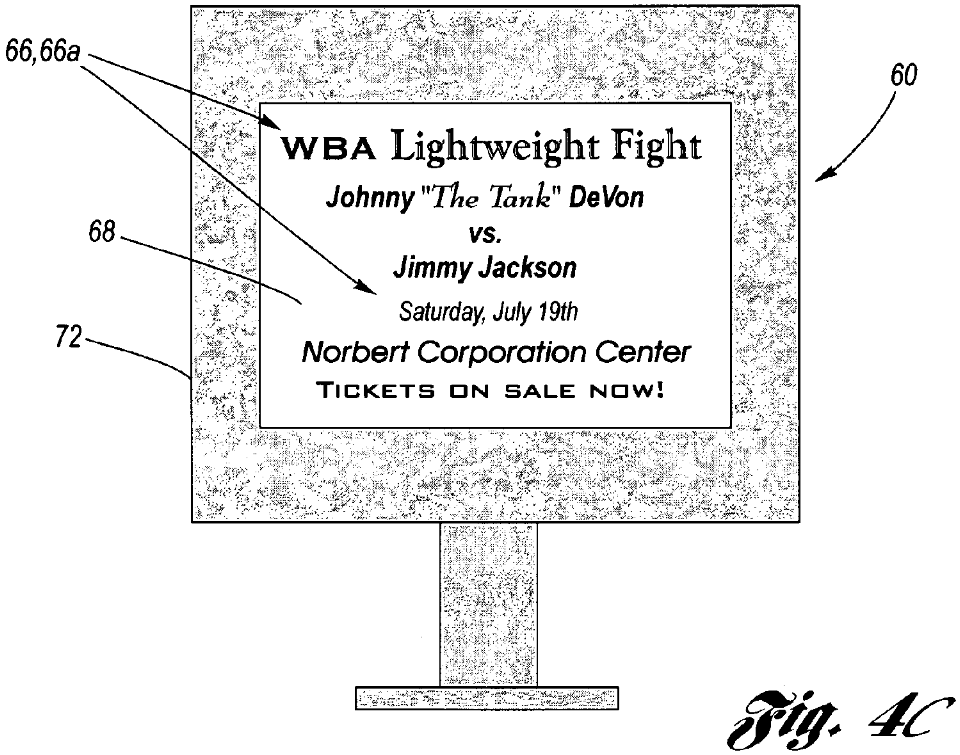
FIG. 4C is a schematic view of the display of FIG. 4A, wherein now the display is displaying game non-specific information.
Figure 4D:
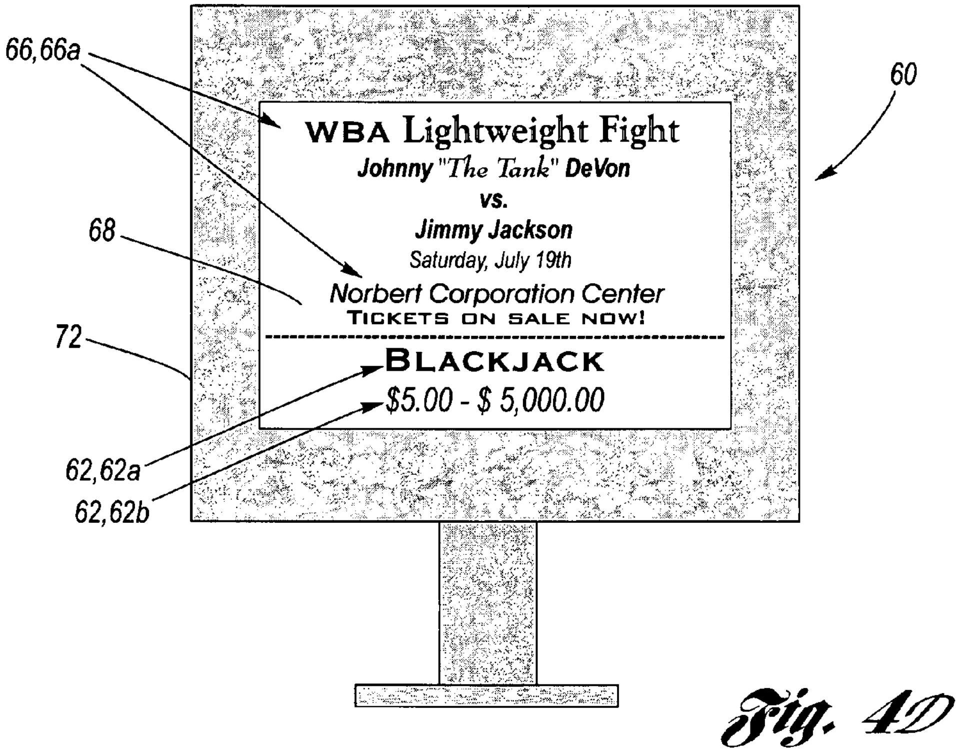
FIG. 4D is a schematic view of the display of FIG. 4A, wherein now the display is displaying both game non-specific information and game specific information.

As mentioned, if the game play inactivity is because the game play is idle or paused, then it is preferred for the display to then display both game specific information 62, 62*a*, 62*b* and game non-specific information 66, 66*a*, as exemplified at FIG. 4D, wherein it is preferred to continuously display the game specific information, and wherein the game specific information may be correlated to the type of game play inactivity (for example, a certain period of game play idleness may trigger information to be displayed which would induce players to play, i.e., lower betting limits).

However, if the answer to the inquiry at Decision Block 42' is yes, meaning the status of play of the game is active because a card is present, then at Decision Block 35 inquiry is made whether Block 46 is already executing. If the answer to this inquiry is no, then at Block 44, the microprocessor causes the electronic interface to display at the screen 68 game specific information, in the manner as discussed above, and the program returns to Block 40'.

However, if the answer to the inquiry at Decision Block 35 is yes, this means the status of the game has now gone from inactive to active, and the display of game non-specific information is to now terminate to be substituted by game specific information. The program now advances to Block 53, whereat the total play time of the displayed display block of the game non-specific information and the current play (i.e., already played) time thereof is obtained. By way of example, a display block has a duration of 30 seconds which approximates an average card shuffle time, and is composed of display segments (discussed below with regard to FIGS. 11A through 12B). The program then advances to Decision Block 54.

At Decision Block 54, inquiry is made whether the current time of play exceeds a predetermined percent of the total play time of the display block, as for example play time greater than 66 percent of total display block play time (see hereinbelow discussion with respect to FIGS. 12A and 12B). If the answer to the inquiry is yes, then at Block 55 the program causes the microprocessor to finish play of the display block, then stop play of the display block (see FIG. 12A), ready the start of the next play of the game non-specific information at the next scheduled display block, and then returns to Block 40'. If the answer to the inquiry is no, then at Block 56 the program causes the microprocessor to stop play of the display block, ready restart for the next display of the game non-specific information at the beginning of the display block that was in play (see FIG. 12B), and then returns to Block 40'.

According to the first example of the algorithm for implementing the method of the present invention, the microprocessor programming and display information are dynamically changed at the remote location R via the central microprocessor 16, but may be dynamically changed at the display, or both. For example, at the remote location R the microprocessor programming and the display information in the form of both game specific and game non-specific information are input to the central microprocessor and selectively sent wirelessly to the displays throughout the casino. In this regard, some displays may receive different display information depending, for example, upon location of game tables in the casino, or other criteria. Additionally, or alternatively, authorized personnel may program the microprocessor of the display at the game table using the various keys thereat, as for example to switch between game specific and game non-specific information based upon, for example, the status of play of the game at the game table. Additionally or alternatively, an automatic status of play of the game detector 21*a*, 21*b*, 21*c*, as for example a card presence detector interfaced with a discard rack, may provide automatic switching between display of game specific and game non-specific information responsive to the detected status of play of the game. Additionally or alternatively further, the microprocessor programming and the display information (i.e., the game specific and game non-specific information) may be data stored in a laptop computer and downloaded through a link (i.e., USB data cable) to the data port, or be data stored in a removable data storage device such as a USB flash memory drive, flash memory card, etc., which is inserted into the data port.

Figure 3:
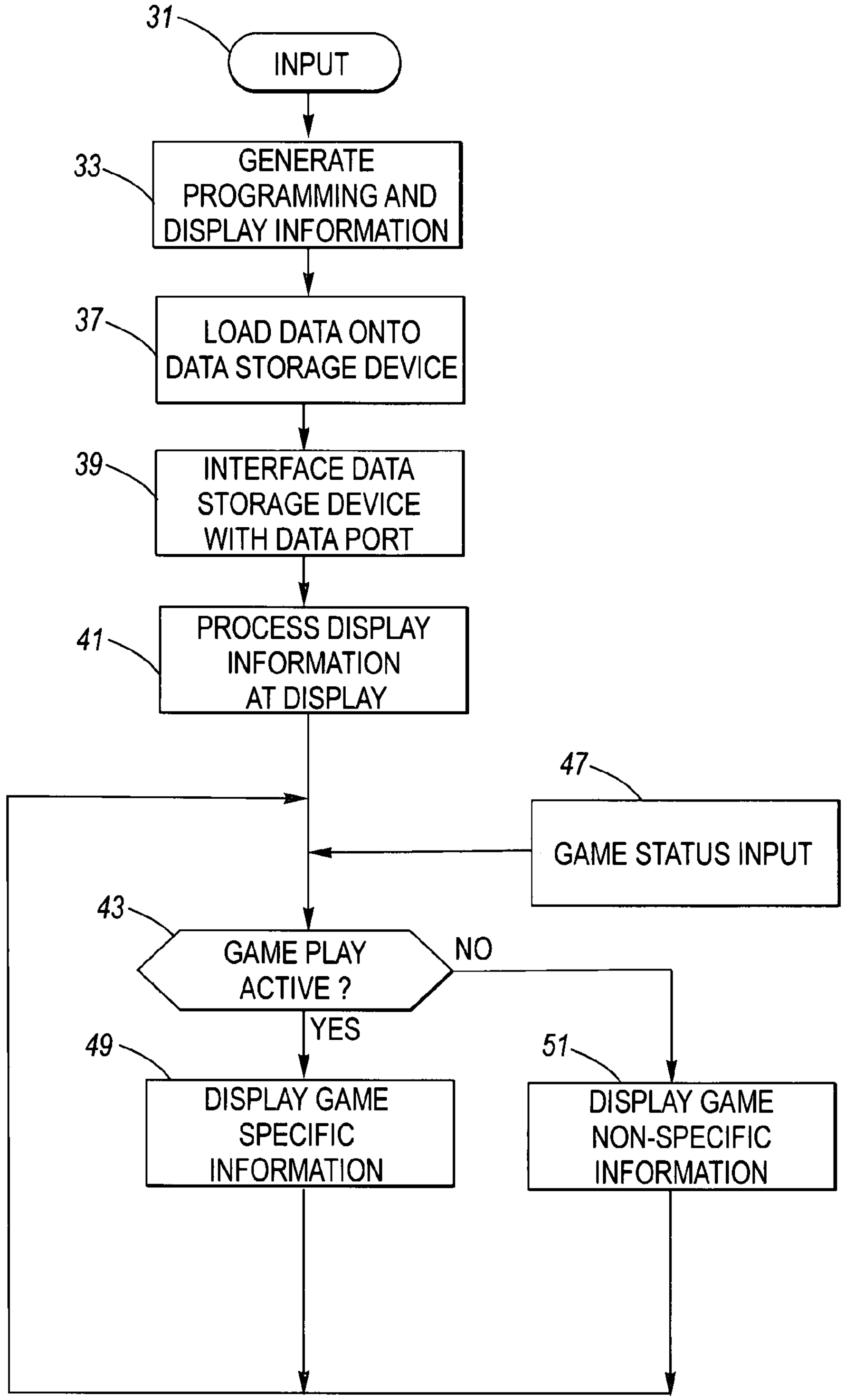
FIG. 3 is a flow chart of a second example for carrying out the method according to the present invention.
Figure 3A:
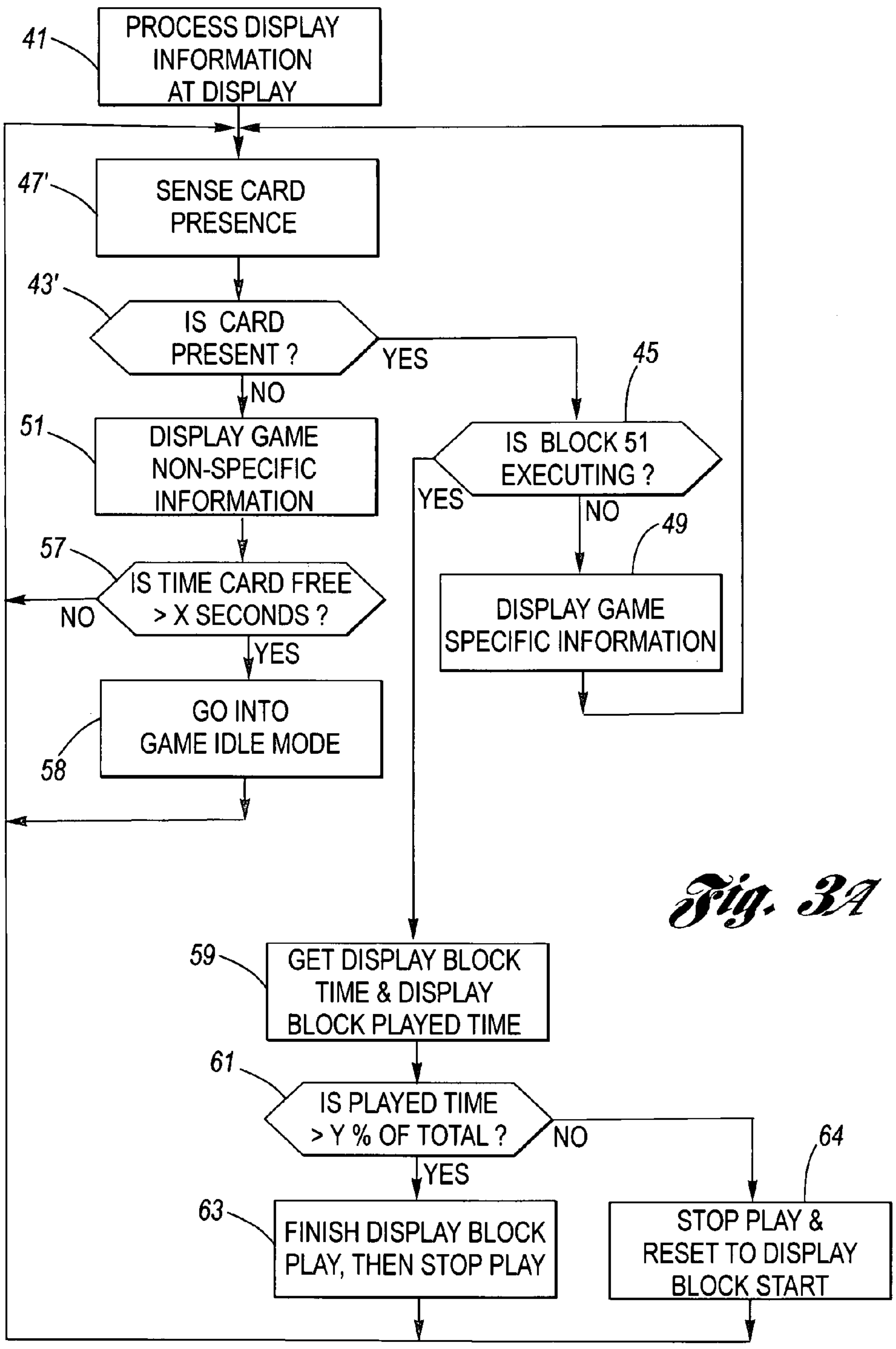
FIG. 3A is an alternative flow chart of the second example of FIG. 3, wherein status of play of the game is automatically detected.

Referring now to FIGS. 3 and 3A, depicted is a second example of algorithms for implementing the method according to the present invention, wherein there is no central microprocessor.

At Block 31 of FIG. 3, microprocessor programming and display information are obtained at one or more sources, such as an information technology facility and/or a video production facility, wherein the display information is in the form of game specific information and game non-specific information. At Block 33, the microprocessor programming and the display information, which is both game specific and game non-specific, are generated for each display, respectively. At Block 37, the microprocessor programming and the display information are loaded as data onto a data storage device, as for example a laptop computer, a USB flash memory drive, a flash memory card, etc. At Block 41, the data storage device is connected to the data port of a selected display. In this regard, for example, a particular data storage device is paired to a particularly selected display based upon selection criteria, as for example the type of game, game bet limits, game table location, etc. Further for example, the programming within the display may automatically select particularly selected display from a generic range of display information based upon selection criteria, as for example game type, game bet limits and game location. At Block 41, the microprocessor within the display uses the microprocessor programming to process the display information as displayable game specific and/or game non-specific information at the display. At Block 47, the status of play of the game is determined, as for example by dealer input, using keys of the display or a keypad wirelessly or wiringly connected with the display, the status of play of the game. Block 47 may also be an automatic status of play of the game detector, the implementation of which is shown at FIG. 3A. At Decision Block 43, inquiry is made by the microprocessor within the display whether the game play is active or not, which may include inquiry as to the type of inactivity. If the status of play of the game is active, then at Block 49, the microprocessor causes the electronic interface to display game specific information. This is exemplified at FIGS. 4A and 4B, whereat a display 60 displays at the screen 68 game specific information 62 in the form for example of the name of the game 62*a*, the dollar betting limits 62*b* of the game, and casino identification 62*c* whereat the game is situated. If the status of play of the game is inactive, then at Block 51, the microprocessor causes the electronic interface to display at the display 68 game non-specific information, as exemplified at FIGS. 4C and 4D. As mentioned above, if the game play inactivity is because the game play is closed, then it is preferred for the display 60 to now display only game non-specific information 66, 66*a*, for example an advertisement 66*a* as exemplified at FIG. 4C; however, if the game play inactivity is because the game play is idle or paused, then it is preferred to show both game specific information 62, 62*a*, 62*b* and game non-specific information 66, 66*a*, as exemplified at FIG. 4D, wherein it is preferred to continually display the game specific information, and wherein the game specific information may be correlated to the type of game play inactivity (for example, a certain period of game play idleness may trigger information to be displayed which would induce players to play, i.e., lower betting limits).

Turning attention now to FIG. 3A, the algorithm of FIG. 3 is modified, after Block 41, to include an automatic status of play of the game detector, which detector, merely by way of exemplification is a card presence/absence detector, and which detector can be another game play article detector.

After Block 41, the status of play of the game is sensed at Block 47' by the status of play of the game detector 21*a*, 21*b*, 21*c* (implemented, by nonlimiting example, as discussed hereinbelow with respect to FIGS. 8A through 9K). At Decision Block 43', inquiry is made by the microprocessor within the display using the sensed information from Block 47' whether the play of the game play is active or inactive (card present means status is active, card not present means status is inactive).

If the answer to the inquiry at Decision Block 43' is no, meaning status of play of the game is inactive (because, for nonlimiting example, no card is present, i.e., a card is absent at the discard rack), then at Block 51 the microprocessor of the display causes the electronic interface to display at screen 68 game non-specific information in the manner discussed above. As mentioned above, it is preferred to provide the game non-specific information to be tailored for displaying based upon predetermined factors, for example, the game specific information (i.e., the game bet minimums/maximums), the game location, or the game type so as to target the information to patrons at the game table. The program then advances to Decision Block 57.

At Decision Block 57 inquiry is made as to whether a card has been absent from the discard rack for in excess of a predetermined time, as for example greater than 300 seconds. If the answer to the inquiry at Decision Block 57 is no, then the program returns to Block 47'. However, if the answer to the inquiry is yes, then the program advances to Block 58, whereat a game idle subroutine commences to run. This subroutine may, for example, cause the microprocessor to display game non-specific information (which may also include game specific information) based upon the play of the inactive game status being now being changed from paused to idle, and may further include causing the microprocessor to invert (i.e., inversion of background for foreground) the displayed information at the rear of the display so as to serve as an alert to casino personnel of the extended duration of inactivity of the game; and/or may cause the microprocessor to initiate, after a predetermined time of card absence, as for example 30 minutes, reduction in the game limits to thereby attract players to the game table.

As mentioned, if the game play inactivity is because the game play is idle or paused, then it is preferred for the display to then display both game specific information 62, 62*a*, 62*b* and game non-specific information 66, 66*a*, as exemplified at FIG. 4D, wherein it is preferred to continuously display the game specific information, and wherein the game specific information may be correlated to the type of game play inactivity (for example, a certain period of game play idleness may trigger information to be displayed which would induce players to play, i.e., lower betting limits).

However, if the answer to the inquiry at Decision Block 43' is yes, meaning the status of play of the game is active because a card is present, then at Decision Block 45 inquiry is made whether Block 51 is already executing. If the answer to this inquiry is no, then at Block 49, the microprocessor causes the electronic interface to display at the screen 68 game specific information, in the manner as discussed above, and the program returns to Block 47'.

However, if the answer to the inquiry at Decision Block 45 is yes, this means the status of the game has now gone from inactive to active, and the display of game non-specific information is to now terminate to be substituted by game specific information. The program now advances to Block 59, whereat the total play time of the displayed display block of the game non-specific information and the current play (i.e., already played) time thereof is obtained. (As mentioned, an example of a preferable display block has a duration of 30 seconds which approximates an average card shuffle time, and is composed of display segments, per FIGS. 11A through 12B). The program then advances to Decision Block 61.

At Decision Block 61, inquiry is made whether the current time of play exceeds a predetermined percent of the total play time of the display block, as for example play time greater than 66 percent of total display block play time (see hereinbelow discussion with respect to FIGS. 12A and 12B). If the answer to the inquiry is yes, then at Block 63 the program causes the microprocessor to finish play of the display block, then stop play of the display block (see FIG. 12A), ready the start of the next play of the game non-specific information at the next scheduled display block, and then returns to Block 47'. If the answer to the inquiry is no, then at Block 64 the program causes the microprocessor to stop play of the display block, ready restart for the next display of the game non-specific information at the beginning of the display block that was in play (see FIG. 12B), and then returns to Block 47'.

According to the second example of the algorithm for implementing the method of the present invention, the displaying of the display information is dynamically changed at the display. For example, microprocessor programming and the display information (i.e., game specific information and game non-specific information) are stored in a data storage device which is then physically delivered to each display, via, for example, the data port thereof, throughout the casino. Each display transfers data from the data storage device for local storage therewithin. Upon insertion of the data storage device, the microprocessor detects the necessary data files and a configuration menu is displayed which allows options for choosing game type, location of the game (i.e., game number, pit number), and visual attributes (i.e., brightness, contrast, color hue, etc.). In this regard, some displays may receive from the data transfer different display information depending, for example, upon location of game tables in the casino or other criteria. The microprocessor of each display would then utilize its microprocessor programming to appropriately cause display of its respective display information so as to selectively display the game specific and the game non-specific information. Additionally, or alternatively, authorized personnel may change the display information and/or the microprocessor programming of the display at the game table using the various keys thereat, as for example to switch between game specific and game non-specific information based upon, for example, the status of play of the game at the game table, as well as certain game specific information, such as the dollar betting limits of the table game. Additionally or alternatively, an automatic status of play of the game detector 21*a*, 21*b*, 21*c*, as for example a card presence detector interfaced with a discard rack, may provide automatic switching between display of game specific and game non-specific information responsive to the detected status of play of the game.

Figure 3B:
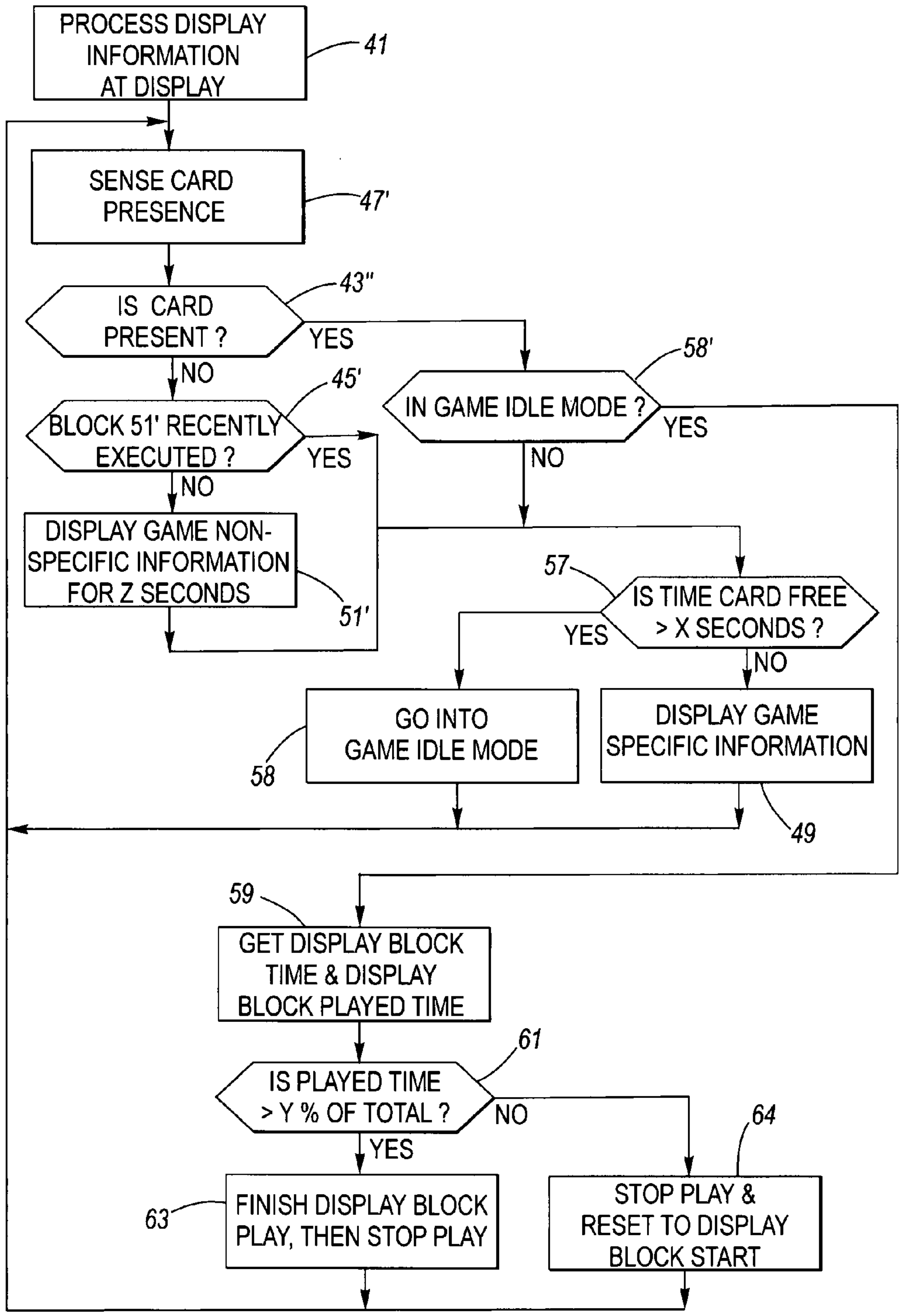
FIG. 3B is an alternative flow chart of the second example of FIG. 3A, wherein game paused timing is predetermined.

It is possible, though not as preferred as the processes represented by FIGS. 2A and 3A, to alter the process steps in FIGS. 2A and 3A such that if the answer to the inquiry at Decision Block 42' or 47', respectively, is no, then at Block 46 or 51, respectively, the display of the game non-specific information is for a predetermined set duration, as for example a typical card shuffle time of 30 seconds, which time preferably correlates to a complete play of a display block. By way of example, FIG. 3B is a modification of FIG. 3A to implement the predetermined set duration of play of the game non-specific information, wherein a similar modification of FIG. 2A is analogously possible, but not shown for brevity, and it is to be understood that other game play article detectors may instead be implemented therewith.

Presence of a card is sensed at Block 47', and the program advances to Decision Block 43" whereat inquiry is made as to whether a card is present at the discard rack. If the answer to the inquiry at Decision Block 43" is yes, then the program inquires at Decision Block 58' whether the game is in idle mode, wherein if the answer to the inquiry is no, the program advances to Decision Block 57 whereat inquiry is made whether a time the card is absent from the discard rack exceeds a predetermined time, as for example 300 seconds. If the answer to the inquiry is no, then at Block 49 the microprocessor causes to be displayed at the display 68 game specific information, and the program returns to Block 47'.

However, if the answer to the inquiry at Decision Block 43" is no, then the program advances to Decision Block 45' whereat inquiry is made whether Block 51 has recently executed preferably within the time specified in Decision Block 57 (i.e., 300 seconds). If the answer to the inquiry is no, then the program advances to Block 51', whereat the microprocessor causes display of game non-specific information for a preset time, as for example an average card shuffle time of 30 seconds, whereupon the program advances to Decision Block 57, wherein the answer to the inquiry will be no, so the program will advance to Block 49. At Block 49 the microprocessor commences display of game specific information, and returns to Block 47'. In this regard, since the timing of execution of Block 51' matches the timing of a whole display block, the switch from game non-specific information to game specific information is immediate. Now, if a card is present at Block 47', the program will advance through Decision Blocks 43", 58' and 57 so that Block 49 continues executing as long as a card remains present at the discard rack. On the other hand, if a card is not present at Block 47', then the program will advance through Decision Block 43" to Decision Block 45', whereat the answer to the inquiry will be yes, and the program will advance through Decision block 57, and, as long as the inquiry thereat is no, then on to Block 49, wherein the game specific information will continue to play even though no card is present in the discard rack. However, if the duration of card absence from the discard rack exceeds the predetermined time (i.e., the above mentioned 300 seconds), then at Block 57 the answer to the inquiry will be yes, and the program will then divert to Block 58, whereat the program goes into game idle mode, the nature of which is discussed hereinabove, and the program then returns to Block 47'.

Execution of Block 58 will continue until presence of a card is sensed at Block 47', whereupon the program advances through Decision block 43" to Decision Block 58', whereat the answer to the inquiry of whether the game idle mode is executing will be yes. The program then advances through to Block 59, Decision Block 61 and one of Block 63 or 64, the nature of which is detailed hereinabove, and the program then returns to block 47'.

It will be understood, in summary, that in the method of carrying out the present invention displaying, selectively, at least one of the game specific information and the game non-specific information at the display is related to the status of play of the game at the game table. For example, when the status of play of the game at the game table is "inactive", there are, for non-limiting example, three possible types of game play inactivity: the game play may be "closed", wherein the game table is closed for playing of the game; the game play may be "idle", wherein the game table is open for playing of the game but no one is presently playing; or, the game play may be "paused", wherein the game is in play but paused as for example during a dealer's cards shuffle procedure, between the end of play of one game and the start of the next. When the status of play of the game is inactive, the microprocessor programming causes to be displayed at the display the game non-specific information, but also causes to be displayed the game specific information if the game play inactivity is due to the game play being idle or paused, wherein the display information displayed may be correlated to the type of game play inactivity (for example, if the game play inactivity is due to the game play being closed, preselected non-game specific information may then be displayed which is appropriate to a long duration of game play inactivity). When the status of play of the game is active (i.e., the game is actively in play), the microprocessor programming causes to be displayed at the display, preferably only, the game specific information. The display information displayed may be in static format and/or may be in moving picture format (i.e., video, streaming video, etc.), and may or may not include sound.

Figure 6A:
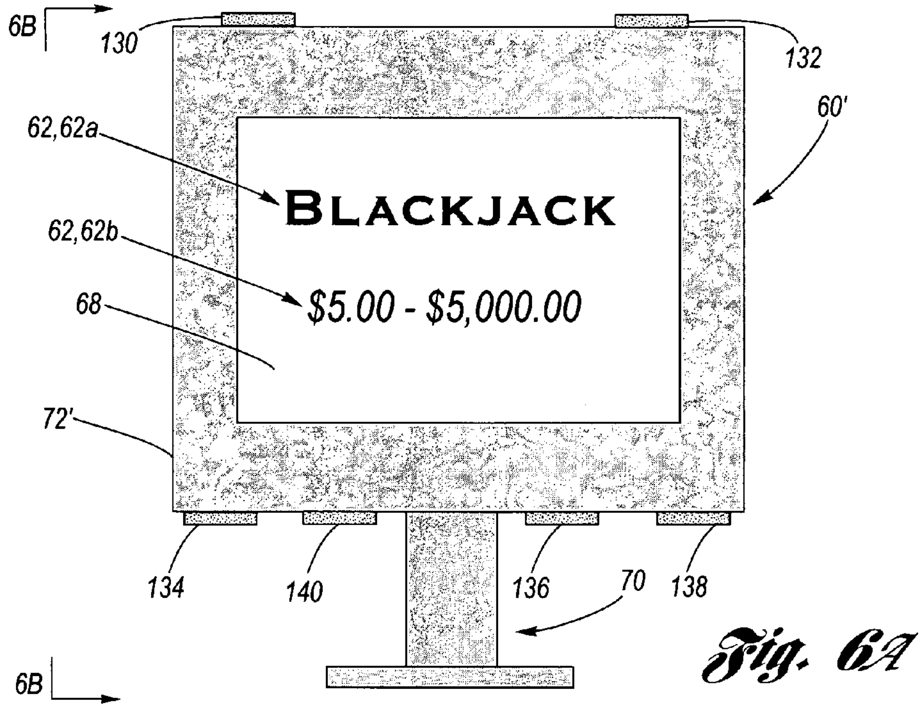
FIG. 6A is a schematic view of a display similar to that of FIGS. 4A through 4D, wherein now for controlling the information displayed are provided on the display itself rather than on a keypad.
Figure 6B:
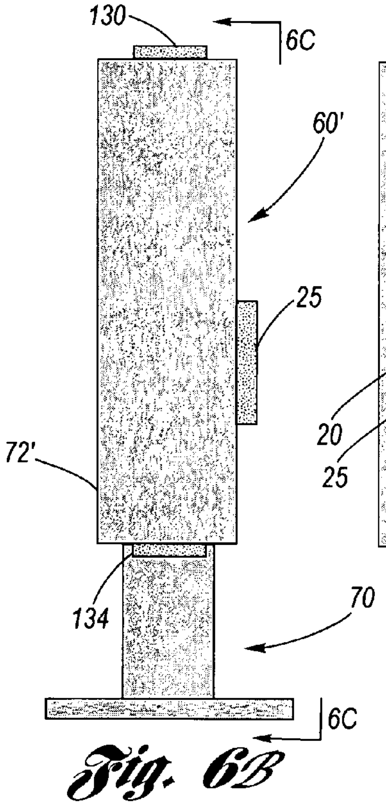
FIG. 6B is a side view, seen along lines 6B-6B of FIG. 6A.
Figure 6C:
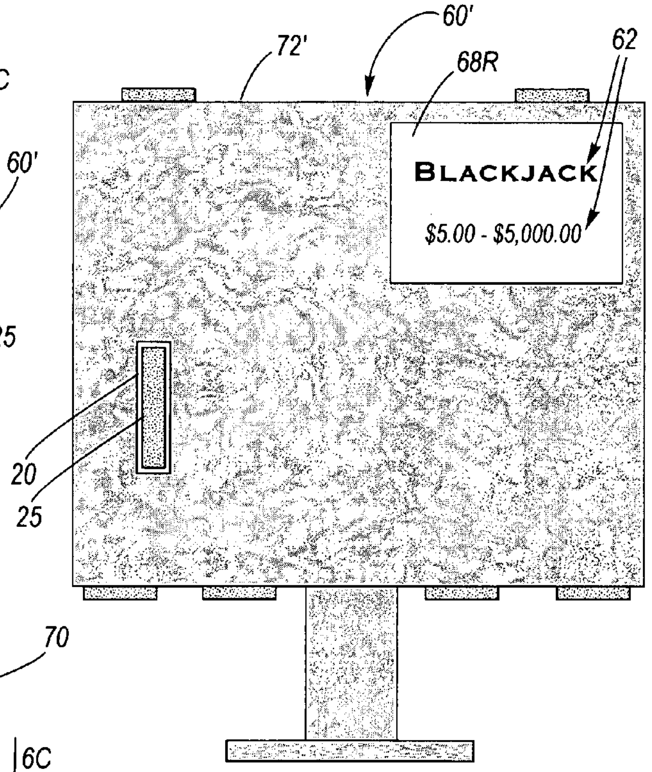
FIG. 6C is a rear view, seen along lines 6C-6C of FIG. 6B.
Figure 7A:
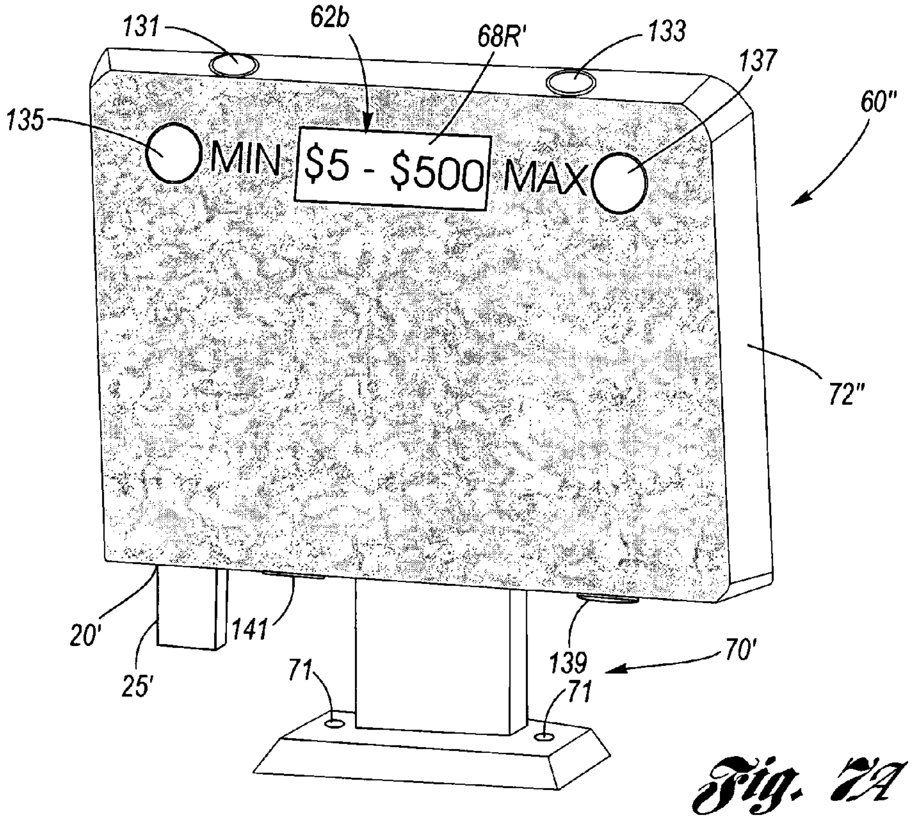
FIG. 7A is a front perspective view of a preferred display.
Figure 7B:
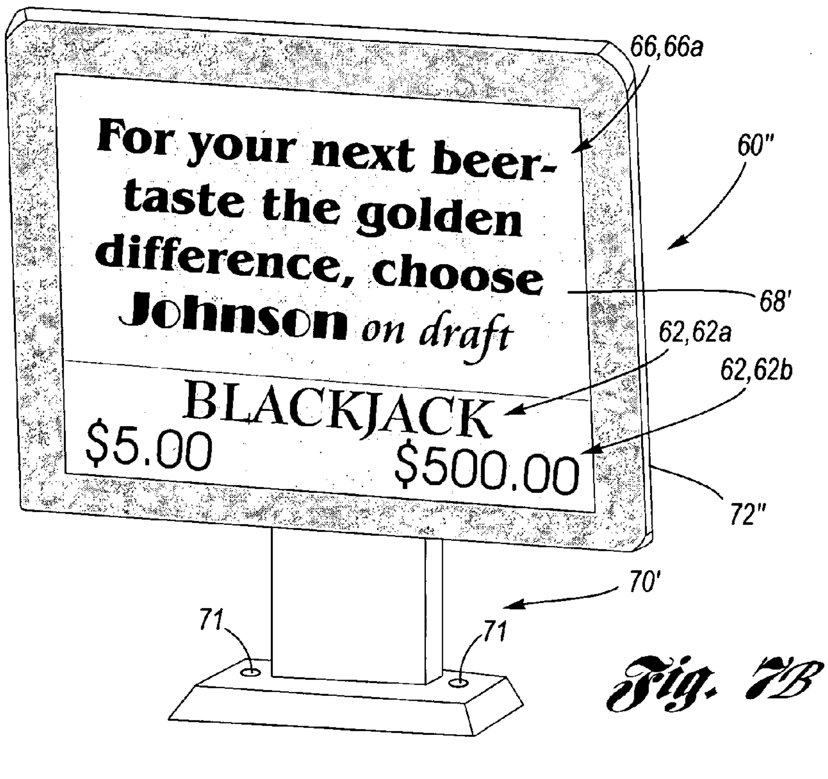
FIG. 7B is a rear perspective view of the preferred display of FIG. 7A.
Figure 7C:
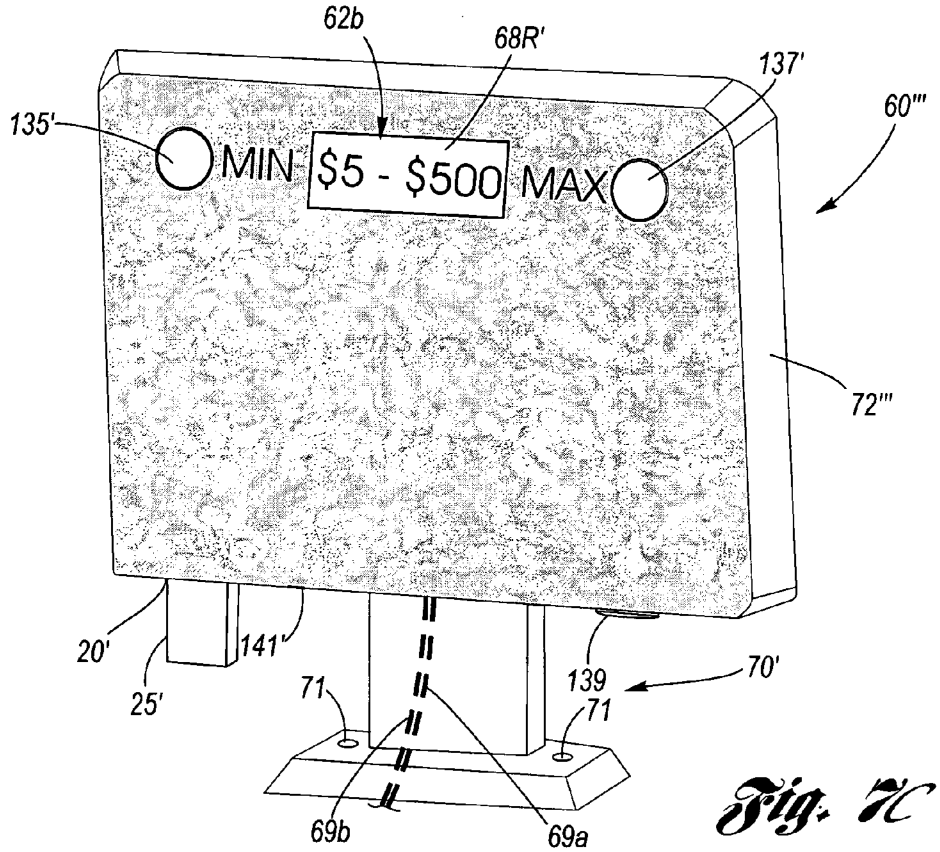
FIG. 7C is a front perspective view of a most preferred display.
Figure 7D:
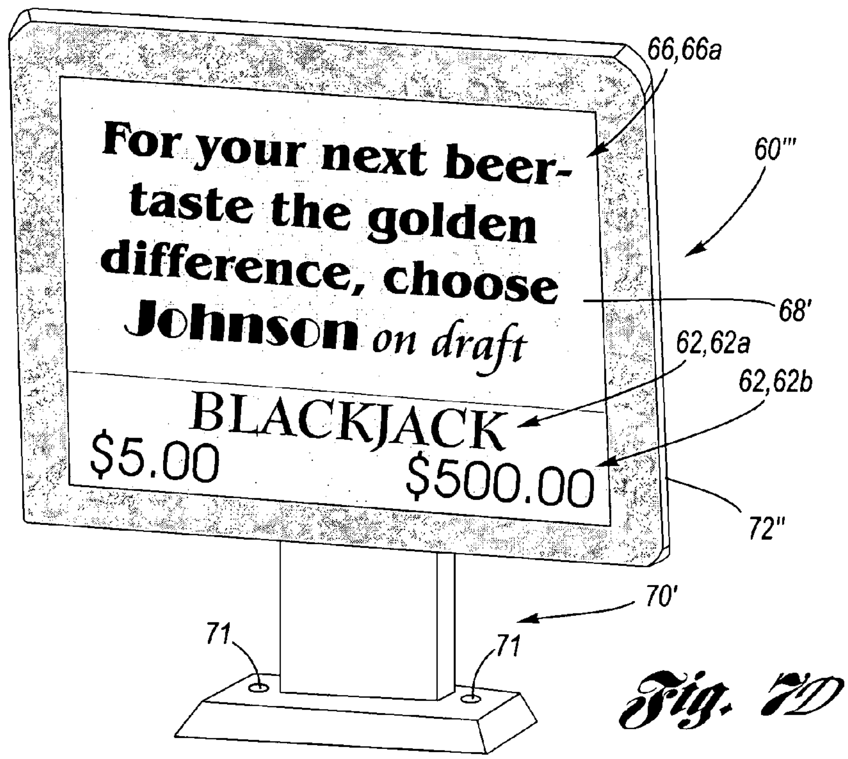
FIG. 7D is a rear perspective view of the most preferred display of FIG. 7C.
Figure 8A:
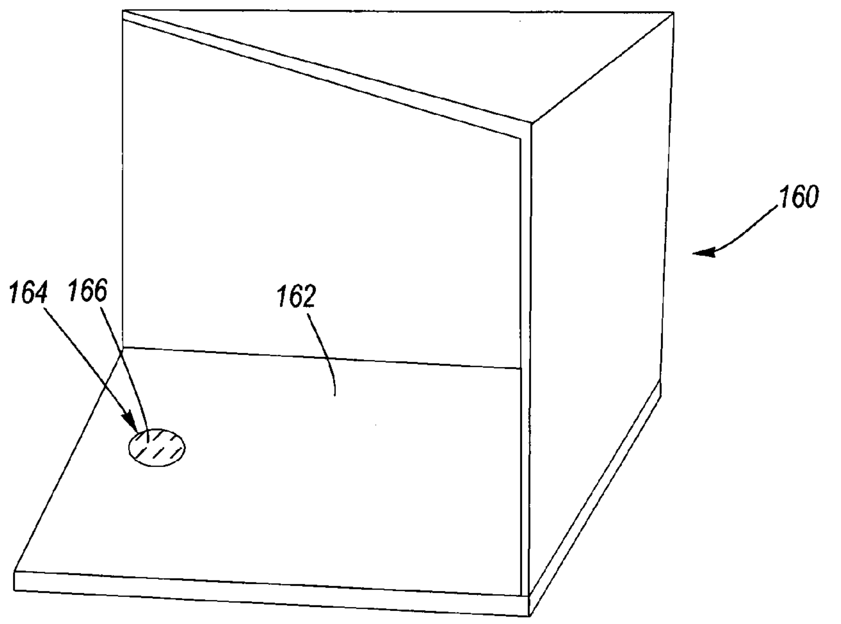
FIG. 8A is a perspective view of a discard rack equipped with a card detector according to the present invention.
Figure 8B:
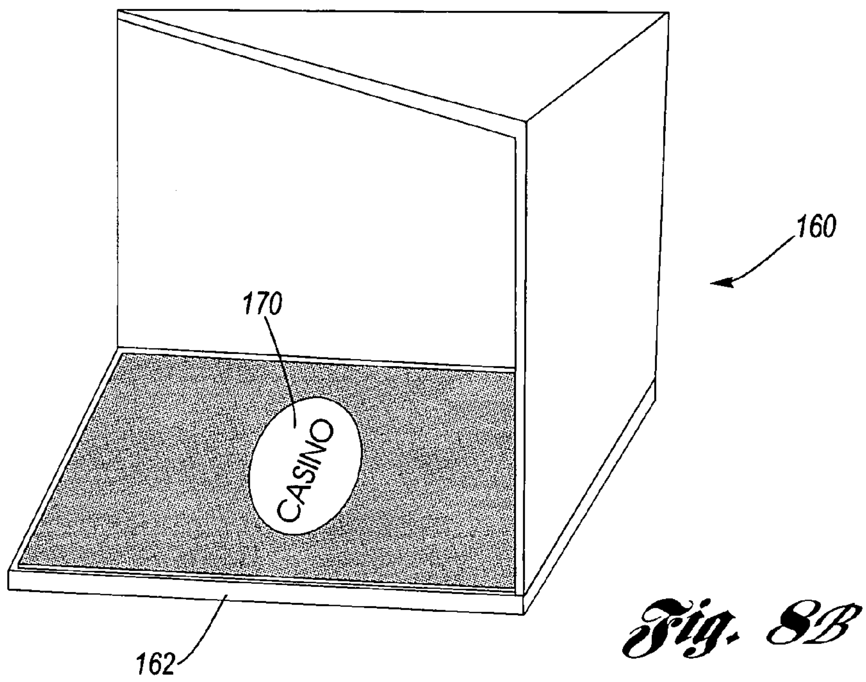
FIG. 8B is a perspective view as in FIG. 8A, wherein now a card is present in the discard rack, in overlying relation to the card detector.
Figure 8C:
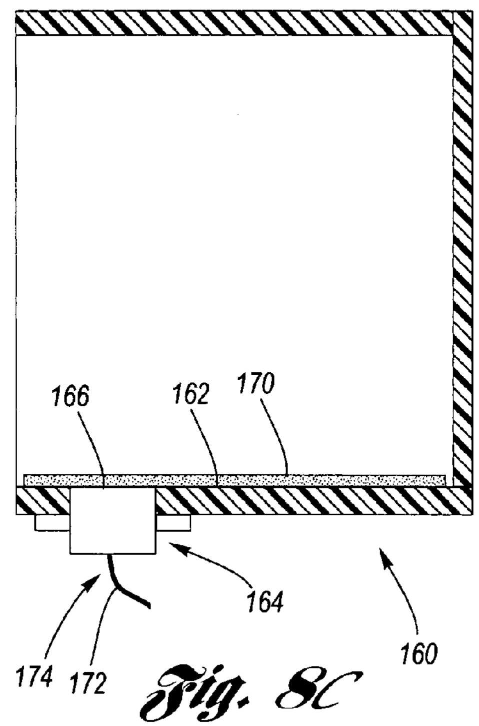
FIG. 8C is a partly sectional view of the discard rack of FIG. 8A, wherein a card is present.
Figure 8D:
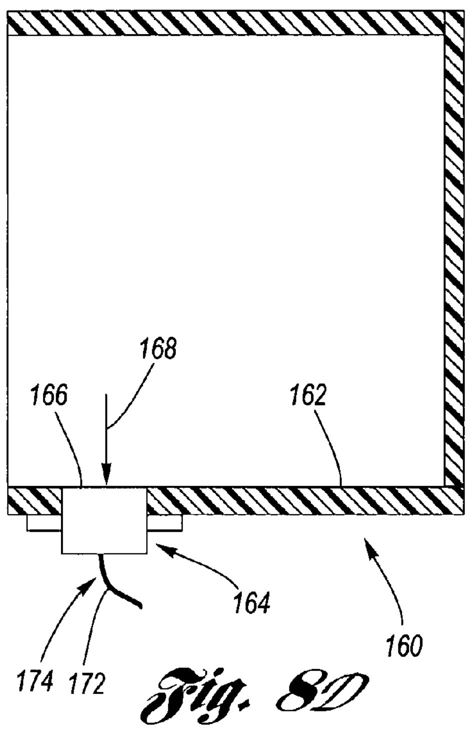
FIG. 8D is a partly sectional view of the discard rack of FIG. 8A, wherein a card is absent.

The preferred displays 60, 60', 60", 60'" are shown at FIGS. 4A through 4D, at FIGS. 6A through 6C, preferably at FIGS. 7A and 7B, and most preferably at FIGS. 7C and 7D. The display screen (see 45*a*, 45*b*, 45*c* of FIG. 1) is a preferred display screen 68, 68' which is most preferably LCD technology, but may also use OLED or plasma technology, well known in the art. A stand 70 may be pivotally and swivelably connected to a housing 72, 72', but for simplicity the stand 70' is more preferably fixedly connected to the housing 72". Preferred dimensions for the display 60, 60' of FIGS. 4A through 4D and 6A through 6C are: the display screen 68 is about 6.5 inches diagonally, the housing 72, 72' is about 6 inches wide, 7 inches high and about 0.5 inches deep, and the stand 70 is about 1 inch high, wherein the stand may include screw holes for mounting to a selected surface on or around the table. Preferred dimensions for the preferred display 60" of FIGS. 7A and 7B and the most preferred display 60'" of the FIGS. 7C and 7D are: the display screen 68' is about 8.5 inches diagonally, the housing 72", 72'" is about 8.75 inches wide, 8 inches high and about 1.75 inches deep, and the stand 70' is about 2 inches high, wherein the stand includes screw holes 71 for mounting to a selected surface on or around the table.

It is preferred for an indication of the content of the display information being displayed at the display screen 68, 68' to be visible at the rear of the display 60', 60", 60'" so that pit personnel can, at a glance, know this content (particularly betting limits). In this regard, comparing FIG. 6A with FIG. 6C, a first preferred mode to present this content at the rear of the display is to utilize a rear display screen 68R, preferably an LCD screen or an OLED or plasma screen relatively smaller than the display screen 68, which is electronically connected to the electronic interface of the display (see 15*a*-15*c* in FIG. 1) so as to display at the rear display screen 68R all, or a selection portion of, the same game specific information 62 as is displayed at the display screen 68. In this regard further, comparing FIG. 7A with FIG. 7B and FIG. 7C with FIG. 7D, a second preferred mode to present this content at the rear of the display is to utilize a rear display screen 68R', preferably a VFD or LED display screen (or possibly another type of display screen as for example, an LCD, OLED or plasma screen) smaller than the display screen 68', which is electronically connected to the electronic interface of the display (see 15*a*-15*c* in FIG. 1) so as to display at the rear display screen 68R' a selected portion of the same game specific information 62 (i.e., the betting limits numbers 62*b*) displayed at the display screen 68'.

Additionally, FIGS. 6B and 6C show a data storage device 25 (a flash memory card) inserted into a data port (see 20 in FIG. 6C).

Referring now additionally to FIGS. 5A through 7B operation of keys for implementing Blocks 40, 40', 47, 47' of FIGS. 2 through 3A according to the method of the present invention will be detailed, wherein, for the sake of brevity, the algorithm of FIG. 2 will only be referenced with specificity.

Figure 5A:
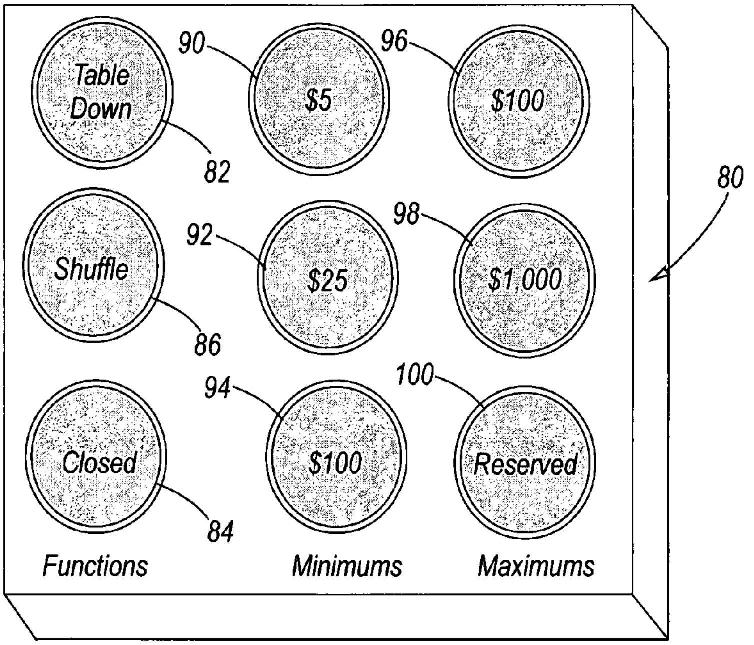
FIG. 5A is a schematic view of a first type of keypad for controlling the information displayed by the displays of FIGS. 4A through 4D according to a first aspect of the method according to the present invention.

Referring firstly to FIG. 5A, a "Type I" keypad 80 has a plurality of keys which are connected to the microprocessor of the display by wire or wirelessly. The normal mode of display is Block 44.

The TABLE DOWN function key 82 is pressed when the game is closed or open, but not active, in which case Block 46 is then operative until the CLEAR function key 84 is pressed. The SHUFFLE function key 86 is pressed when the dealer is shuffling cards or cards are in a shuffle machine or being exchanged, in which case Block 46 is then operative for a predetermined time period whereafter Block 44 is operative. The CLEAR function key 84 is pressed to reset.

Keys are also provided to select a minimum and a maximum dollar bet for the game under Block 44. This may be preset keys or input from a set of alpha-numeric keys.

Each display has a memory so that when the TABLE DOWN or SHUFFLE function keys are pressed, the game minimum and maximum will remain set, as well as in the case of the display being turned off.

Examples of the minimum keys are as follows. A $5 minimum key 90 is pressed when the minimum table limit is $5, $10, $15 or $20, wherein each time the $5 minimum key 90 is pressed the minimum displayed increases in increments of $5, but to revert to a lesser minimum, the CLEAR function key is pressed to reset to zero. A $25 minimum key 92 is pressed when the minimum table limit is $25, $50, or $75, wherein each time the $25 minimum key 92 is pressed the minimum displayed increases in increments of $25, but to revert to a lesser minimum, the CLEAR function key is pressed to reset to zero. A $100 minimum key 94 is pressed when the minimum table limit is $100 and above, wherein each time the $100 minimum key 94 is pressed the minimum displayed increases in increments of $100, but to revert to a lesser minimum, the CLEAR function key is pressed to reset to zero.

Examples of the maximum keys are as follows. A $100 maximum key 96 is pressed when the maximum table limit is between $100 and $1,000, wherein each time the $100 maximum key 96 is pressed the maximum displayed increases in increments of $100, but to revert to a lesser maximum, the CLEAR function key is pressed to reset to zero. A $1,000 maximum key 98 is pressed when the maximum table limit is above $1,000, wherein each time the $1,000 maximum key 98 is pressed the maximum displayed increases in increments of $1,000, but to revert to a lesser maximum, the CLEAR function key is pressed to reset to zero.

A RESERVED function key 100 is pressed when the table is reserved for a very important person, i.e., a VIP player, wherein the CLEAR function key is pressed to reset.

Figure 5B:
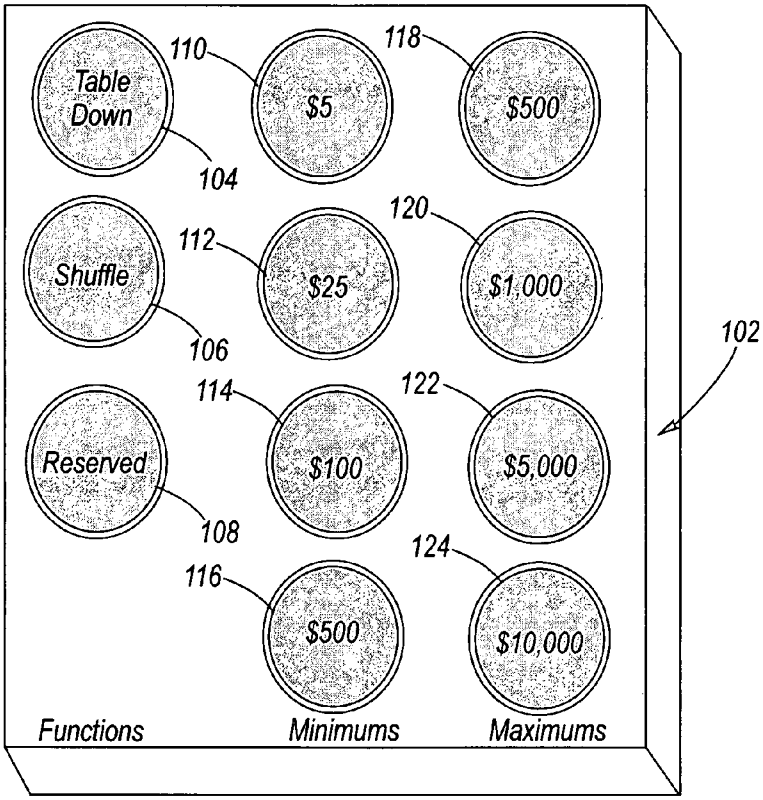
FIG. 5B is a schematic view of second type of keypad for controlling the information displayed by the displays of FIGS. 4A through 4D according to a second aspect of the method according to the present invention.

Referring now to FIG. 5B, a "Type II" keypad 102 has a plurality of keys which are connected to the microprocessor of the display by wire or wirelessly. The normal mode of display is Block 44.

The TABLE DOWN, SHUFFLE and RESERVED function keys 104, 106, 108 are as described hereinabove with respect to FIG. 4A. However, each of the minimum keys $5 110, $25 112, $100 114, $500 116 and the maximum keys $500 118, $1,000 120, $5,000 122, $10,000 124 are each of fixed face value and not incrementable with successive pressing.

Referring now to FIGS. 6A and 6B, a display 60' has a display screen 68, and stand 70 as described above, wherein now the housing 72' includes integrated keys, wherein there is no keypad. The keys operate, by way of example, generally as described above with respect to FIG. 5A, and include a TABLE DOWN function key 130 (operating similarly to key 82), a SHUFFLE function key 132 (operating similarly to key 86), a CLEAR function key 134 (operating similarly to key 84), at least one minimum function key 136 (operating similarly to any or all of keys 90-94), at least one maximum function key 138 (operating similarly to any or all of keys 96-98) and a RESERVED function key 140 (operating similarly to key 100). Keys may be combined or otherwise provided, and may be disposed at other locations of the housing.

Referring now to FIGS. 7A and 7B, a display 60" has a display screen 68', and stand 70' as described above, wherein now the housing 72" includes integrated keys, wherein there is no keypad. The keys operate, by way of example, somewhat as generally described above with respect to FIGS. 6A through 6C, having the following aspects. A Table Down (game idle) function key 133 (initiating by way of example display of game non-specific information), a Shuffle (game paused) function key 131 (initiating by way of example display of game non-specific information for a predetermined duration), a minimum bet function key 135 (for scrolling through preset betting minimums), and a maximum bet function key 137 (for scrolling through preset betting maximums). An optional Reserved function may be implemented at the end of scroll of either keys 135 or 137. A game closed key 139, initiating the programming to enter game closed mode and display, preferably, only game non-specific information. Keys may be combined or otherwise provided, and may be disposed at other locations of the housing.

An example of a preferable functionality of the display 60" is as follows.

The screen 68R' on the rear of the display 60" indicates what the minimum amount is at the front screen 68' of the display. Pressing the minimum bet function key 135 changes the minimum bet amount of the game table. Each time the key 135 is pressed and released the minimum bet amount is increased according to the amounts supplied by the casino. To go down in bet value, the keys 131 and 135 are pressed simultaneously and released for each amount that is to be reduced. The non-game specific information targeting (i.e., Block 46*a*) is based on the minimum bet amount selected.

The screen 68R' at the rear of the display 60" indicates what the maximum bet amount is at the front screen 68' of the display. The maximum bet function key 137 changes the maximum amount on the table. Each time the key 137 is pressed and released the bet maximum is increased according to the amounts supplied by the casino. If the amount is to be lowered, then keys 137 and 133 are pressed simultaneously and released for each amount that is to be reduced.

On the top of the display 60", closest to the dealer, is the Shuffle (or game paused) function key 131. Once the cards are ready for the shuffle sequence, this key 131 is pressed. The non-game specific information will be displayed for a set duration based on game type. There is no interaction needed for the display 60" to end its cycle and go back to the game specific information. If necessary the shuffle process can be ended early by pressing either of the keys 131 or 133 at the top of the display 60".

Also at the top of the display 60", furthest from the dealer, is the Table Down (or game idle) function key 133. Pressing this key 133, the display 60" continuously displays the game non-specific information while the game sits idle without players. The minimum and maximum bet amounts are also displayed at the bottom of the screen 68' during this time. The rear screen 68R' shows the min and max bets inverted (i.e., inversion of foreground for background) to inform casino pit personnel of the idle status of the game. Pressing either of the top keys 131 or 133 will restore display of the game specific information (i.e., the game play status has gone from inactive, because the game play is idle, to active).

If the status of the game is idle (also referable to as "dead game mode") for 25 minutes, the preset bet limits will drop down one amount. For example, if a game sits idle for 25 minutes and has a $50 minimum, the display will drop the minimum to $25, and at $25 it will not drop to $15 regardless of how long the game sits idle. Prior to when the minimum will drop, the rear screen 68R' will flash "DROPPING" for 72 seconds. During these 72 seconds pressing of either the minimum and maximum bet function keys 135, 137 will thwart the minimum bet limit drop process, wherein without a key press intervention the drop will occur.

The closed game function key 139 is located at the bottom of the display 60" (on the maximum bet side). This key 139 is pressed when the status of play of the game is inactive because the game is closed. Upon pressing the key 139, the game non-specific information will be displayed, along with a graphic image (i.e., a casino logo) where the bet minimum and maximum were located on the screen 68'. During operation of this mode, the rear screen 68R' will display "CLOSED" to inform the casino pit personnel of the closed status of the game (and display). When in this mode, the display 60" will display game-nonspecific information continuously at the screen 68'. In this mode, all keys except for the closed game function key 139 are inactive, wherein pressing of key 139 again will cause the display to return to status of play of the game active mode, and game specific information will again be displayed.

Additionally, FIG. 7A shows an audio functionality 141, and a data storage device 25' (a USB flash memory drive) which is inserted into a data port (not visible, but indicated at USB port 20') of the display.

Referring now to FIGS. 7C and 7D (like parts having like numerals to FIGS. 7A and 7B), a most preferred display 60'" has a display screen 68', and stand 70' as described above, except there are no buttons at the top (no buttons 131 and 133) for game paused and game idle which are obviated due to connection to an automatic status of play of the game detector (i.e., 21*a*, 21*b*, 21*c*) through connection 69*b* (connection 69*a* is for power, wherein both connections 69*a*, 69*b* run through the stand 70'). Provided are a minimum bet function key 135' (for scrolling through preset betting minimums), and a maximum bet function key 137' (for scrolling through preset betting maximums). An optional Reserved function may be implemented at the end of scroll of either keys 135' or 137'. A game closed key 139, initiating the programming to enter game closed mode and display, preferably, only game non-specific information. Keys may be combined or otherwise provided, and may be disposed at other locations of the housing.

An example of a preferable functionality of the display 60'" is as follows.

The screen 68R' on the rear of the display 60'" indicates what the minimum amount is at the front screen 68' of the display. Pressing the minimum bet function key 135 changes the minimum bet amount of the game table. Each time the key 135 is pressed and released the minimum bet amount is increased according to the amounts supplied by the casino. To go down in bet value, the keys 131 and 135 are pressed simultaneously and released for each amount that is to be reduced. The non-game specific information targeting (i.e., Block 46*a*) is based on the minimum bet amount selected.

The screen 68R' at the rear of the display 60'" indicates what the maximum bet amount is at the front screen 68' of the display. The maximum bet function key 137 changes the maximum amount on the table. Each time the key 137 is pressed and released the bet maximum is increased according to the amounts supplied by the casino. If the amount is to be lowered, then keys 137 and 133 are pressed simultaneously and released for each amount that is to be reduced.

Operation is interfaced with automatic detection of status of play of the game.

When the status of play of the game is paused (i.e., cards being shuffled), the non-game specific information will be displayed for a set duration based on game type. There is no interaction needed for the display 60'" to end its cycle and go back to the game specific information, as this is automatic.

When the status of play of the game is idle, the rear screen 68R' shows the min and max bets inverted (i.e., inversion of foreground for background) to inform casino pit personnel of the idle status of the game, per the automatic status of game detection. If the status of the game is idle (also referable to as "dead game mode") for 25 minutes, the preset bet limits will drop down one amount. For example, if a game sits idle for 25 minutes and has a $50 minimum, the display will drop the minimum to $25, and at $25 it will not drop to $15 regardless of how long the game sits idle. Prior to when the minimum will drop, the rear screen 68R' will flash "DROPPING" for 72 seconds. During these 72 seconds pressing of either the minimum and maximum bet function keys 135, 137 will thwart the minimum bet limit drop process, wherein without a key press intervention the drop will occur.

The closed game function key 139 is located at the bottom of the display 60" (on the maximum bet side). This key 139 is pressed when the status of play of the game is inactive because the game is closed. Upon pressing the key 139, the game non-specific information will be displayed, along with a graphic image (i.e., a casino logo) where the bet minimum and maximum were located on the screen 68'. During operation of this mode, the rear screen 68R' will display "CLOSED" to inform the casino pit personnel of the closed status of the game (and display). When in this mode, the display 60'" will display game-nonspecific information continuously at the screen 68'. In this mode, all keys except for the closed game function key 139 are inactive, wherein pressing of key 139 again will cause the display to return to status of play of the game active mode, and game specific information will again be displayed.

Additionally, FIG. 7A shows an audio jack 141', and a data storage device 25' (a USB flash memory drive) which is inserted into a data port (not visible, but indicated at USB port 20') of the display.

To change the game location, game number or game types of the display to agree with the game type being played at the game table (i.e., the game type displayed on the screen 68') an external data storage device (for example the USB flash memory drive 25') with appropriate data files stored therein is inserted into the data port (for example the USB port 20'), the keys 133 and 139 are pressed simultaneously and released. The rear display 68R' will then show the setup menu, whereupon the minimum or maximum bet function keys 135, 137 may be pressed so as to scroll through options of the menu. To edit an option, the keys 133, 139 are pressed simultaneously and released, which will then select an editable submenu. For example to select a game type, a label "L-GAME NAME" where "L" represents "logo", or "H-GAME NAME" where "H" represents "hotel". Once this is displayed on the rear screen 68R', the minimum or maximum bet function keys 135, 137 may be scrolled through. Once selected, the game choice will be implemented after 5 seconds or by pressing the closed game function key to return to the menu options.

Within the game types there is preferably included one or more game training titles, as for example "BJ Training". If selected as a game type, a continuous loop game training seminar will be displayed (i.e., blackjack training seminar if "BJ Training was selected) until the keys 133 and 139 are again simultaneously pressed and released to scroll to another selection (game type or other training). Before selecting a game training title, the audio functionality 141' of the display 60''' would need to be implemented.

It is also preferred that inserting a data storage device (i.e., the USB flash memory drive 25') into the data port (i.e., the USB port 20') will initiate the display to detect the presence of data files for instant playback. If these data files are present on the data storage device, the display will begin displaying the data files while the data storage device is present. This information may be game specific or game non-specific information. When the data storage device is removed the display will return back to the last documented display position.

By pressing the minimum and maximum bet function 135, 137 simultaneously and releasing, a volume indicator on the rear screen 68R' will be displayed, whereupon the volume can be adjusted accordingly. Once adjusted, the volume indicator will disappear and revert back to the previous screen (i.e., BJ Training).

Each display has a memory (as mentioned) so that when the TABLE DOWN or SHUFFLE function keys are pressed, the game minimum and maximum will remain set, as well as in the case of the display being turned off. The power connection 69*a* runs through the stand and is connected to a source of power at the game table.

It is preferred that when a minimum (and/or maximum) key is pressed, it will trigger display of separate and unique game non-specific information (i.e., advertisements or other messages) to that display so as to target the information to patrons frequenting that particular table game. For example, if a low minimum is displayed at Blocks 44, 51, then advertisements displayed at Blocks 46, 51 would feature inexpensive facilities of the casino, whereas if a high minimum is displayed at Blocks 44, 49, then advertisements displayed at Blocks 46, 51 would feature expensive facilities of the casino.

Turning attention now to FIGS. 8A through 9K, preferred structural implementations of the status of play of the game detectors 21*a*, 21*b*, 21*c* of FIG. 1, of Block 40' of FIG. 2A, and of Block 47' of FIG. 3A will be detailed.

Referring firstly to FIGS. 8A through 8D, a discard rack 160 is of conventional configuration for receiving cards therein, wherein one or more cards 170 conventionally locatable upon a base 162 of the discard rack. A card 170 being present in the discard rack 160 means the status of the game (as for non-limiting example, blackjack) is active. However, the absence of any card 170 in the discard rack 160 means the status of the game is inactive, wherein if the card is absent a predetermined short time, then the inactivity can be attributed the inactivity being because the game is paused (as for example during shuffling of the cards); if absent for a first predetermined longer time, then the inactivity can be attributed to the inactivity being because the game is idle (as for example the game is open for play, but there are no players present); and, optionally, if absent for a second, predetermined even longer time, then the inactivity can be attributed to the inactivity being because the game is closed (as for example the game is closed for play).

A card presence detector 164 is connected with the discard rack 160, wherein the card presence detector can be any sensor which automatically distinguishes card presence from absence, and provides a signal indicative of whether the card is present or absent. By way of preferred example, a conventional electro-optical sensor (i.e., any photodetector) 166 is located within the base 162, having a clear reception of light 168 above the base. Whenever a card 170 is absent (see FIG. 8D), the light falls upon the electro-optical sensor 166 providing a voltage output via a connection 172, whereby the signal (i.e., a voltage) at the connection is indicative of card absence in the discard rack 160; however, whenever a card 170 is present (see FIG. 8C), then less light will fall on the electro-optical sensor 166, whereby the changed signal (i.e., a reduced voltage) at the connection 172 is indicative of card presence in the discard rack 160. With respect to the foregoing description, the status of game play is detected by the microprocessor by a voltage change from an electro-optical sensor in response to light change due to the presence or absence of the game play article thereat. The connection 172 is a preferred form of a connection interface 174, as for example wires, fiber optics, wireless, etc., which connects the card presence detector 164 to the microprocessor of the display (see for example the μP 28*a*, 28*b*, 28*c*, respectively, of displays 10*a*, 10*b*, 10*c* of FIG. 1).

Figure 9A:
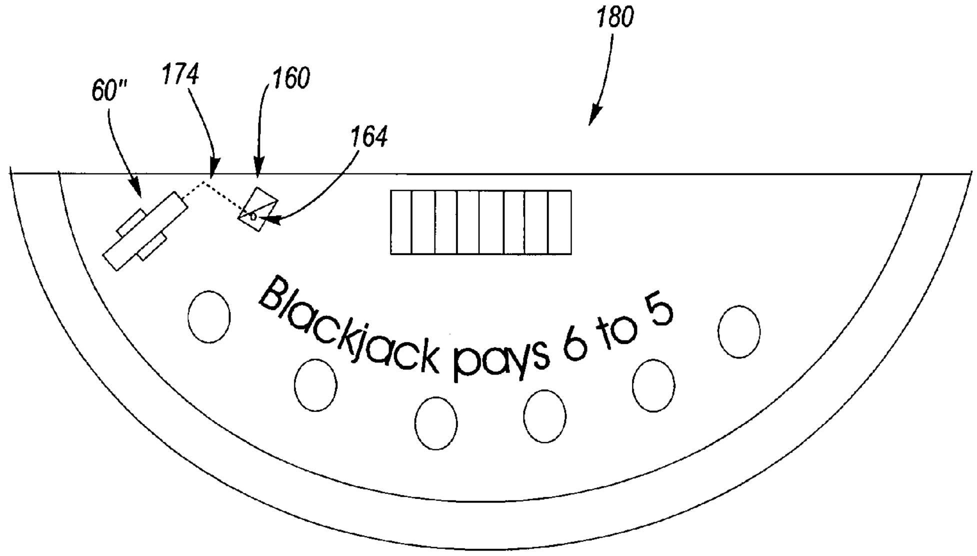
FIG. 9A is a plan view of a blackjack table equipped with the display of FIG. 7C and the discard rack of FIG. 8A.

FIG. 9A depicts an example of a first implementation of a status of play of the game detector with respect to a blackjack game table 180. The above described discard rack 160 with card presence detector 164 is attached to the blackjack table 180, wherein a connection interface 174 connects the card presence detector 164 to the microprocessor of the display (display 60''' being shown by way of preference).

Figure 9B:
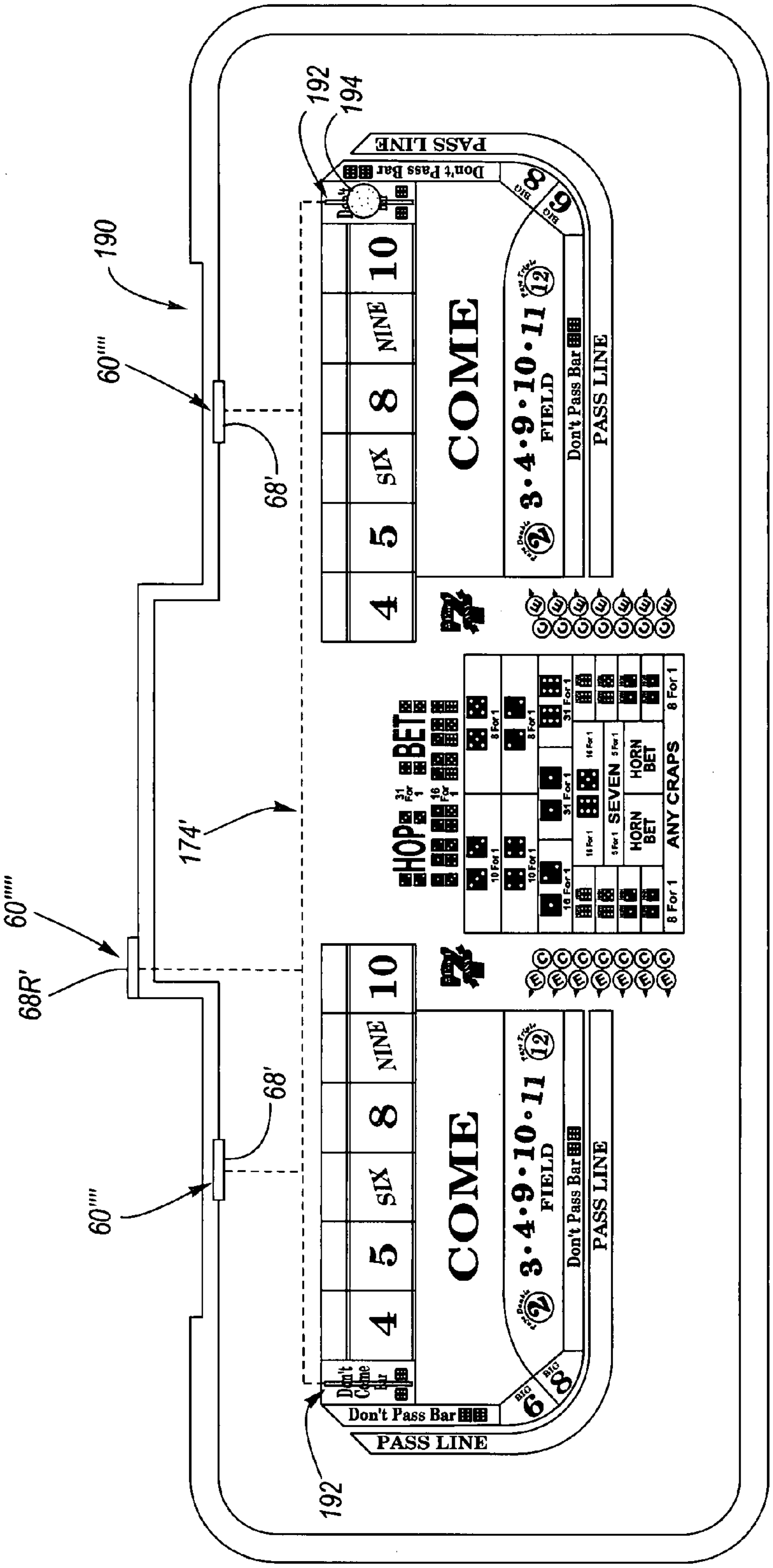
FIG. 9B is a plan view of a craps table equipped with the display of FIG. 7C and a status of game play detector, both located at each wing of the layout.

FIG. 9B depicts an example of a second implementation of a status of play of the game detector with respect to a craps table 190. A puck presence detector 192 is located in the craps table, as for example an electro-optical sensor having light reception at a location where conventionally during play of craps the puck 194 is located prior to the first come-out roll of the dice. The presence of the puck 194 causes the output signal (i.e., a voltage output) from the electro-optical sensor to be different (i.e., less voltage) as compared to when the puck is not present thereat, to be delivered to a connection interface 174' to the microprocessor of the display 60'''''. In this regard, it is preferred to have two displays 60''''', one display at each wing, each display having a display screen 68' (as shown at FIG. 7D (there being no rear screen)) and, additionally, the display 60''''' at the rear of the table 190 having just a rear screen 68R' (as shown at FIG. 7A (there being no display screen 68')), along with keys, port and internal microprocessor as mentioned regarding the display 60'''. The presence of the puck is indicative the status of the game is inactive, the type of inactivity being that the game is paused.

Figures 9C, 9D, 9E:
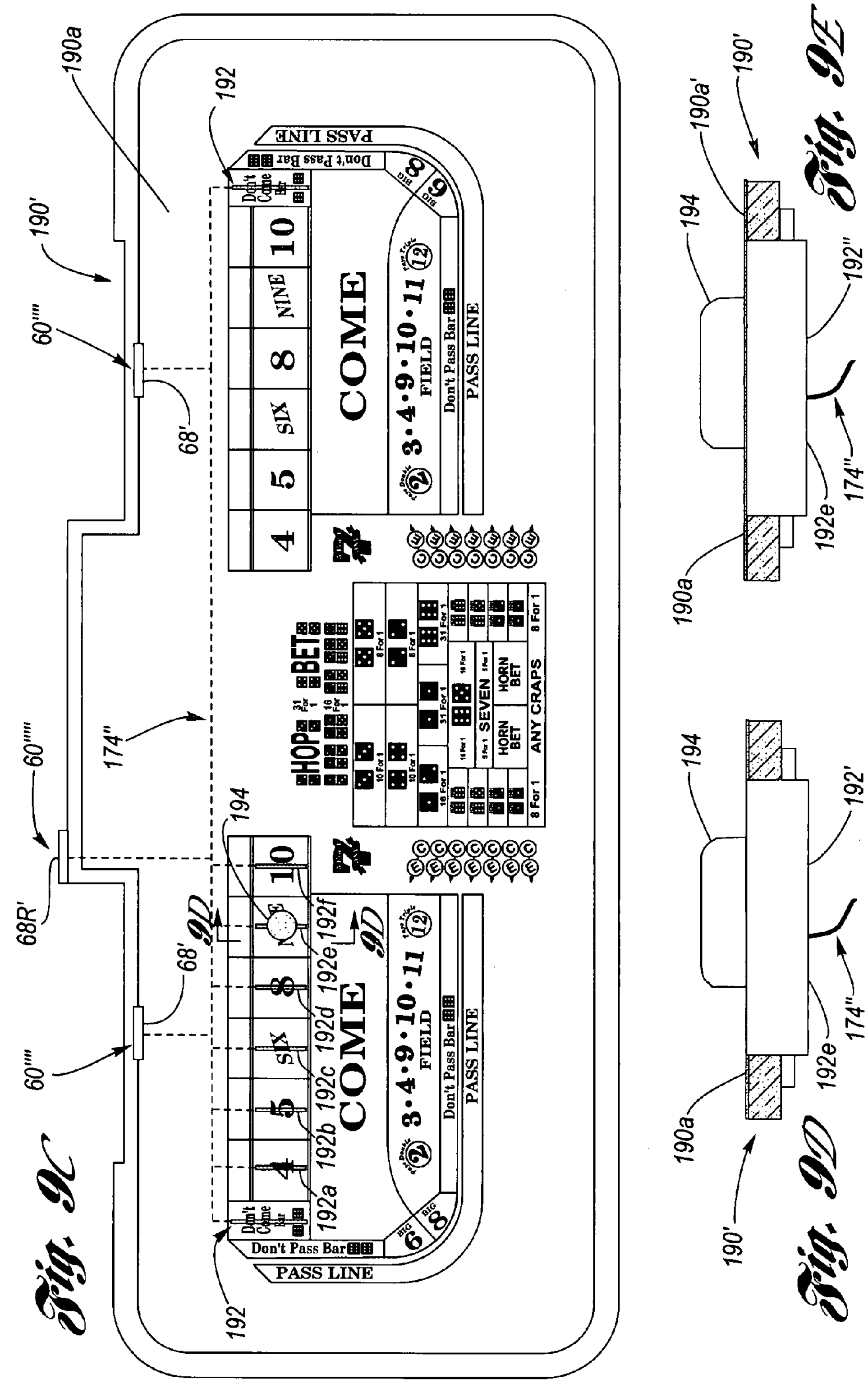
FIG. 9C is a plan view of a craps table as generally in FIG. 9B, now being equipped with a modified status of game play detector.
FIG. 9D is a cross-sectional view seen along line 9D-9D of FIG. 9C, showing a status of play of the game detector.
FIG. 9E is a cross-sectional view as in FIG. 9D, wherein the status of play of the game detector detects the puck through the layout.

FIG. 9C depicts a second aspect of the second implementation of a status of play of the game detector with respect to a craps table 190', wherein like functioning parts are identified by like numerals of FIG. 9B. The aforementioned puck presence detector 192 and the displays 60'''', 60''''' are as recounted above, and now there are point number puck presence detectors at each point number of the layout 190*a*: a detector 192*a* at the number "4", a detector 192*b* at the number "5", a detector 192*c* at the number "six", a detector 192*d* at the number "8", a detector 192*e* at the number "nine", and a detector 192*f* at the number "10". While puck detectors 192*a*-192*f* are shown at the point numbers of the left wing of the layout 190*a*, they may be present alternatively at the right wing of the layout, or at both wings of the layout.

As aforementioned, the detectors (see FIGS. 9D and 9E) may be in any form including, for nonlimiting example, a electro-optical sensor 192' having ambient light reception such that the presence of the puck 194 thereover causes a signal (i.e., a voltage) output via a modified connection interface 174" to the microprocessor of the display 60'''''. Since it is advantageous if the layout of the craps table 190' can, itself, be an unmodified layout 190*a*' and be, therefore, installed conventionally by being laid over the puck detectors 192, 192*a*-192*f*, the light sensing of the puck detectors (see FIG. 9E) can utilize an electro-optical sensor 192" sensitive to a selected portion of the electromagnetic spectrum of the ambient light of the casino which is able to pass through the layout, as may be determined by empirical testing. Or, for another example, the puck detector can include an optical device emitting nonvisible light that is passable through the layout, the puck having a bottom surface that is reflective to this nonvisible light, and the detector detecting the reflection of the nonvisible light when the puck is present thereover. Or, for yet another example, the puck detector may be a pressure sensitive device which recognizes when the weight of the puck is thereover.

It is to be noted that all detector descriptions herein (hereinabove and hereinbelow) are merely by way of exemplification and without intention of limitation, wherein any other suitable detector capable of detection of the presence of the puck (or any other game play article) may be used.

The presence of the puck 194 (or another game play article) at any of the numbers is indicative of the number having been rolled by a shooter during play of the game of craps. A methodology for carrying out the present invention in regard to the embodiment of FIG. 9C is described hereinbelow with respect to FIG. 9M.

Figure 9F:
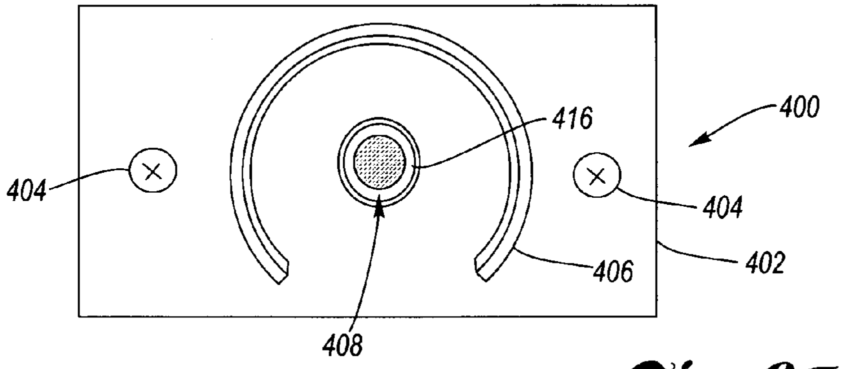
FIG. 9F is a plan view of a status of game play detector for the game of roulette.
Figure 9G:
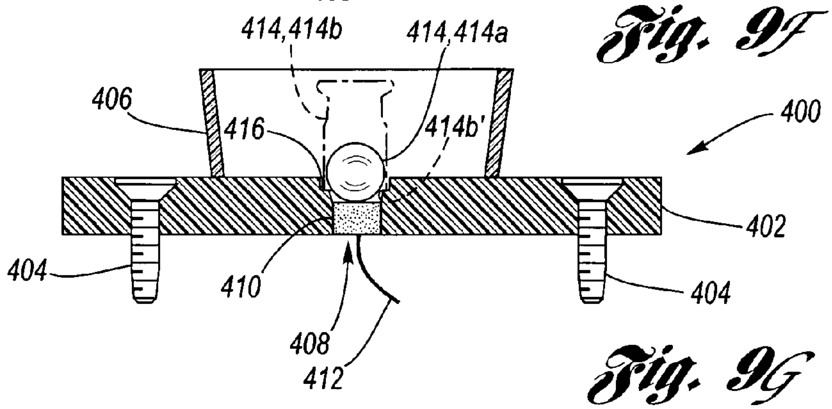
FIG. 9G is a sectional side view of the status of game play detector of FIG. 9F, shown in operation with respect to a marble game play article, and, in phantom, a marker game play article.

FIGS. 9F and 9G depict an example of a third implementation of a status of play of the game detector with respect to the game of roulette. The status of play of the game detector 400 has a base 402 which may be attached to any surface, as for example by screws 404. A truncated, frustoconically shaped cup wall 406 is centered with respect to a game play article detector 408, as for example a photodetector 410, as discussed generally hereinabove wherein light provides a voltage when a game play article is not present thereover, having a suitable connection 412 (any suitable connection interface) to the microprocessor of the display (see for example the μP 28*a*, 28*b*, 28*c*, respectively, of displays 10*a*, 10*b*, 10*c* of FIG. 1). Any suitable game play article 414 may be used in connection with the detector 408, preferably for roulette, the game play article is a marble 414*a* or a marker (shown in phantom) 414*b* (which, if it is clear, may have an opaque bottom 414*b*' to provide proper sensing of its presence at the photodetector 410). For location of the game play article 414 with respect to the detector 408, it is preferred to provide a stepped recess 416 which circumscribes the detector.

Figure 9H:
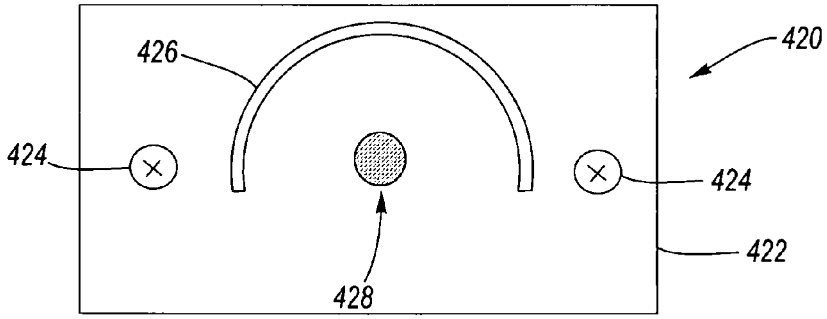
FIG. 9H is a plan view of a status of game play detector for the game of pai gow tiles.
Figure 9I:
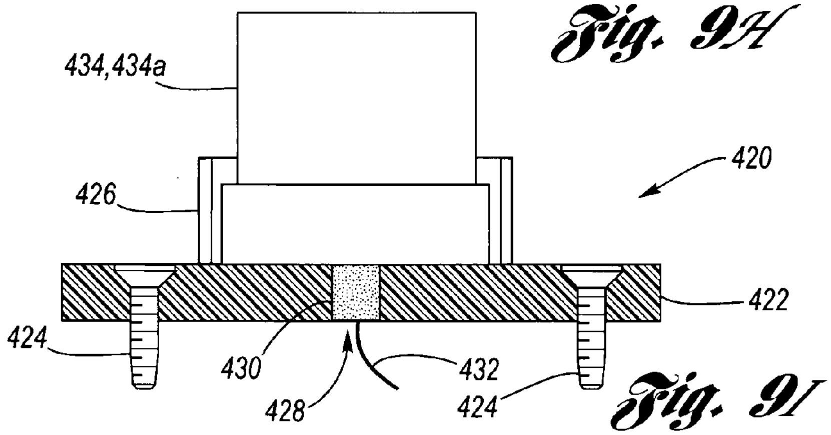
FIG. 9I is a sectional side view of the status of game play detector of FIG. 9H, shown in operation with respect to a shaker game play article.
Figure 9J:
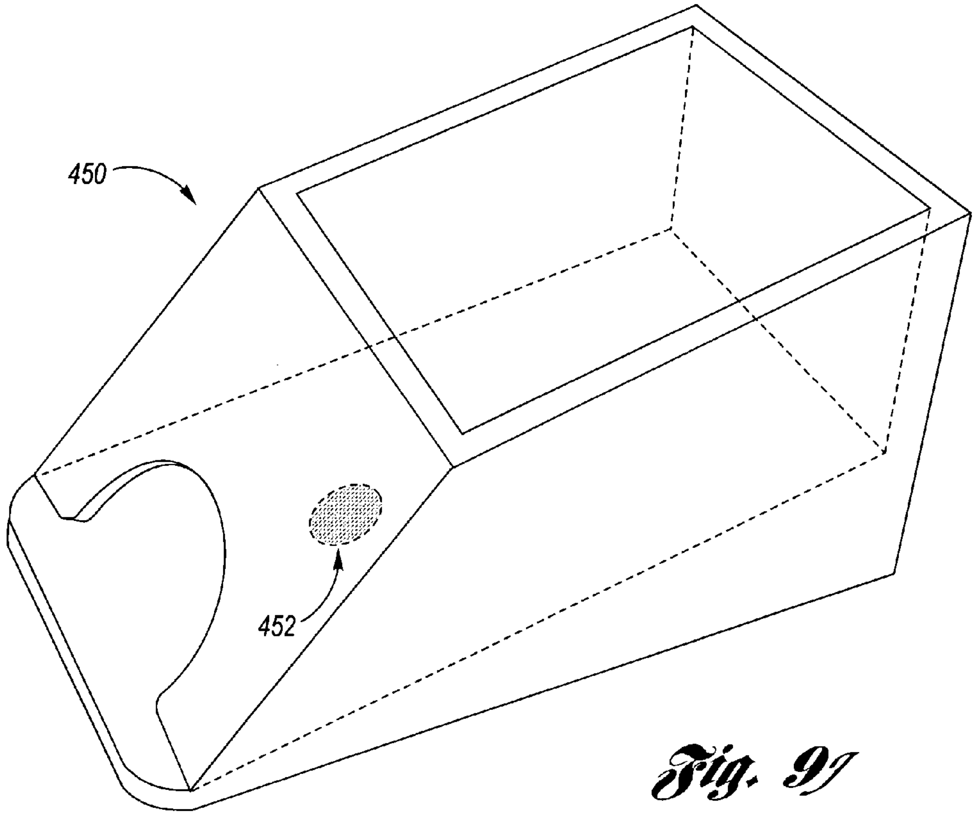
FIG. 9J is a perspective view of a card shoe equipped with a status of game play detector.
Figure 9K:
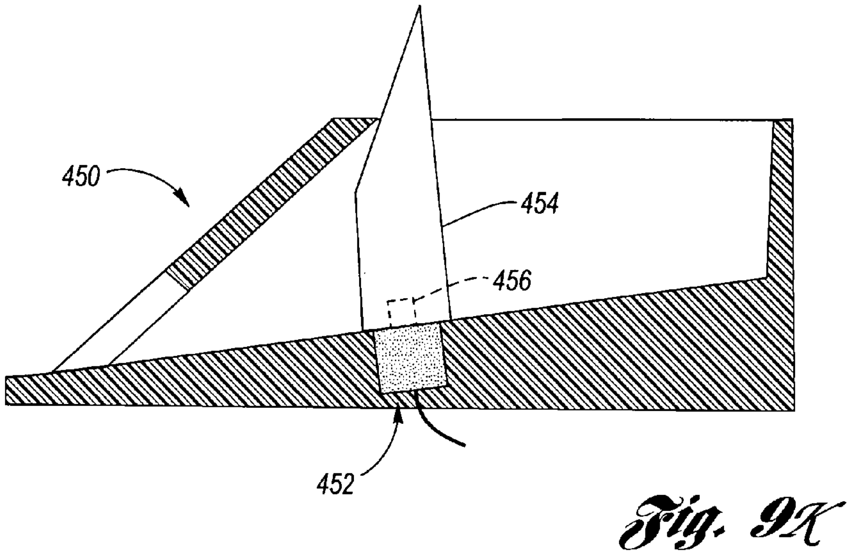
FIG. 9K is a sectional side view of the card shoe of FIG. 9J, shown in operation with respect to a card weight.

FIGS. 9H and 9I depict an example of a fourth implementation of a status of play of the game detector with respect to the game of pai gow tiles. The status of play of the game detector 420 has a base 422 which may be attached to any surface, as for example by screws 424. A semicircular shaped cup wall 426 is centered with respect to a game play article detector 428, as for example a photodetector 430, as discussed generally hereinabove wherein light provides a voltage when a game play article is not present thereover, having a suitable connection 432 (any suitable connection interface) to the microprocessor of the display (see for example the μP 28*a*, 28*b*, 28*c*, respectively, of displays 10*a*, 10*b*, 10*c* of FIG. 1). Any suitable game play article 434 may be used in connection with the detector 428, preferably for roulette, the game play article is a shaker 434*a*.

It will be understood from the foregoing that detection of status of play of any game can be implemented according to the teachings of the present invention. In this regard, per the method according to the present invention, a detector detects the presence (or absence) of a game play article, and that information is provided to a microprocessor which, per the programming according to the present invention, affects the display of game specific and game non-specific information on a display. As an exemplification of how the teachings of the present invention can be expansively applied to other games and devices other than those specifically detailed hereinabove, consider FIGS. 9J and 9K, which depict a card shoe 450 having a game play article detector 452 associated therewith. The game play article is, in this example, a card weight 454, and the detector may be an electro-optical sensor, a magnetically sensitive device (reed switch, magnetoresistor, etc.) or a pressure sensitive switch which senses the presence of a magnet 456 embedded in the game play article 454 and sends a signal to a microprocessor.

Turning attention now to FIGS. 9L through 9P, while also considering FIGS. 2 through 3B, further aspects of the methodology according to the present invention will be detailed.

As mentioned hereinabove, the flow charts of FIGS. 2 through 3B are applicable to any game play article simply by substituting the word "game play article" for "card" in the various relevant Blocks respectively thereof. Thus, by way of exemplification, with respect to the status of play of the game detector 400 of FIGS. 9F and 9G, the flow charts of FIGS. 2 through 3B are to be read as reciting "game play article" in place of "card", wherein the game play article 414 is, for example, a marble 414*a* or a marker 414*b*.

However, there may be situations in which the flow charts of FIGS. 2A, 3A and 3B may be advantageously modified to suit a particular game application, as indicated at FIGS. 9L through 9P. In this regard, the flow chart of FIG. 3A will be utilized to exemplify the modification, wherein like functioning Blocks will have like numerals, and wherein the modification of the other flow charts of FIGS. 2A and 3B follows similarly therefrom such that an artisan of ordinary skill will have a full comprehension form the present detailed description with respect to the modification of FIG.

3A such that a tedious repetitious exposition shall be omitted as to the modifications of FIGS. 2A and 3B for the sake of brevity.

Figure 9L:
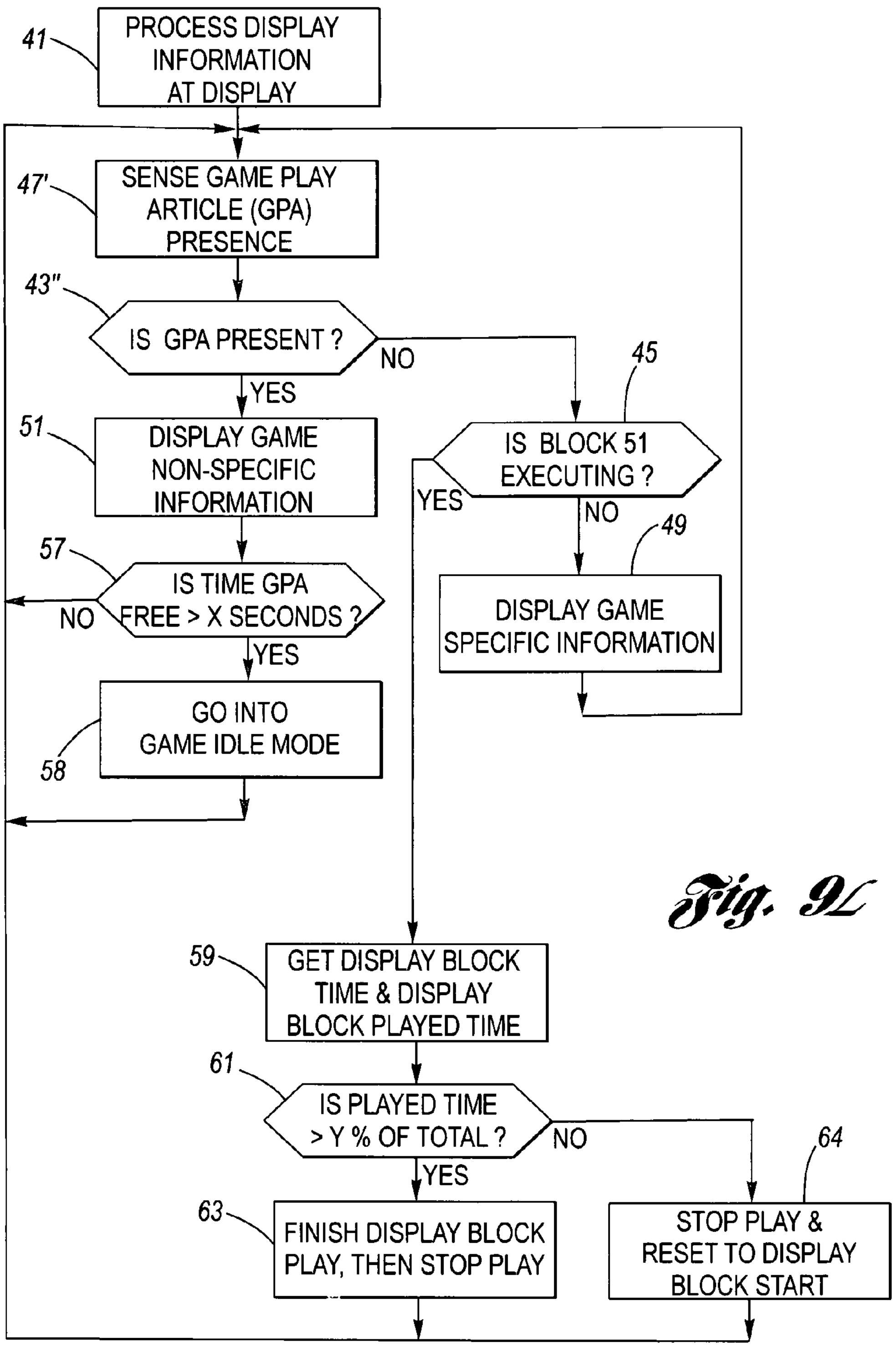
FIG. 9L is a flow chart for a method of carrying out the present invention for utilization in games such as craps, for example per the embodiment of FIG. 9B, and pai gow tiles for example per the embodiment of FIGS. 9H and 9I.

Referring now to FIG. 9L, it will be seen that the steps are identical to FIG. 3A except that at Decision Block 43" the "yes" and "no" paths are reversed from that of Decision Block 43' of FIG. 3A. What this means is that the inquiry at Decision Block 43" as to the presence or absence of the game play article has an opposite result as to that of Decision Block 43' of FIG. 3A. For example, with respect to the games of blackjack (see FIGS. 8C through 9A) and roulette (see FIGS. 9F and 9H), the presence of the game play article at the detector means that the game is active; whereas with respect to the game of craps (FIGS. 9B through 9E, wherein FIGS. 9B and 9C refer in this regard to detector 192 only) and the game of pai gow tiles (FIGS. 9H and 9I) the presence of the game play article at the detector means the game is inactive.

Figure 9M:
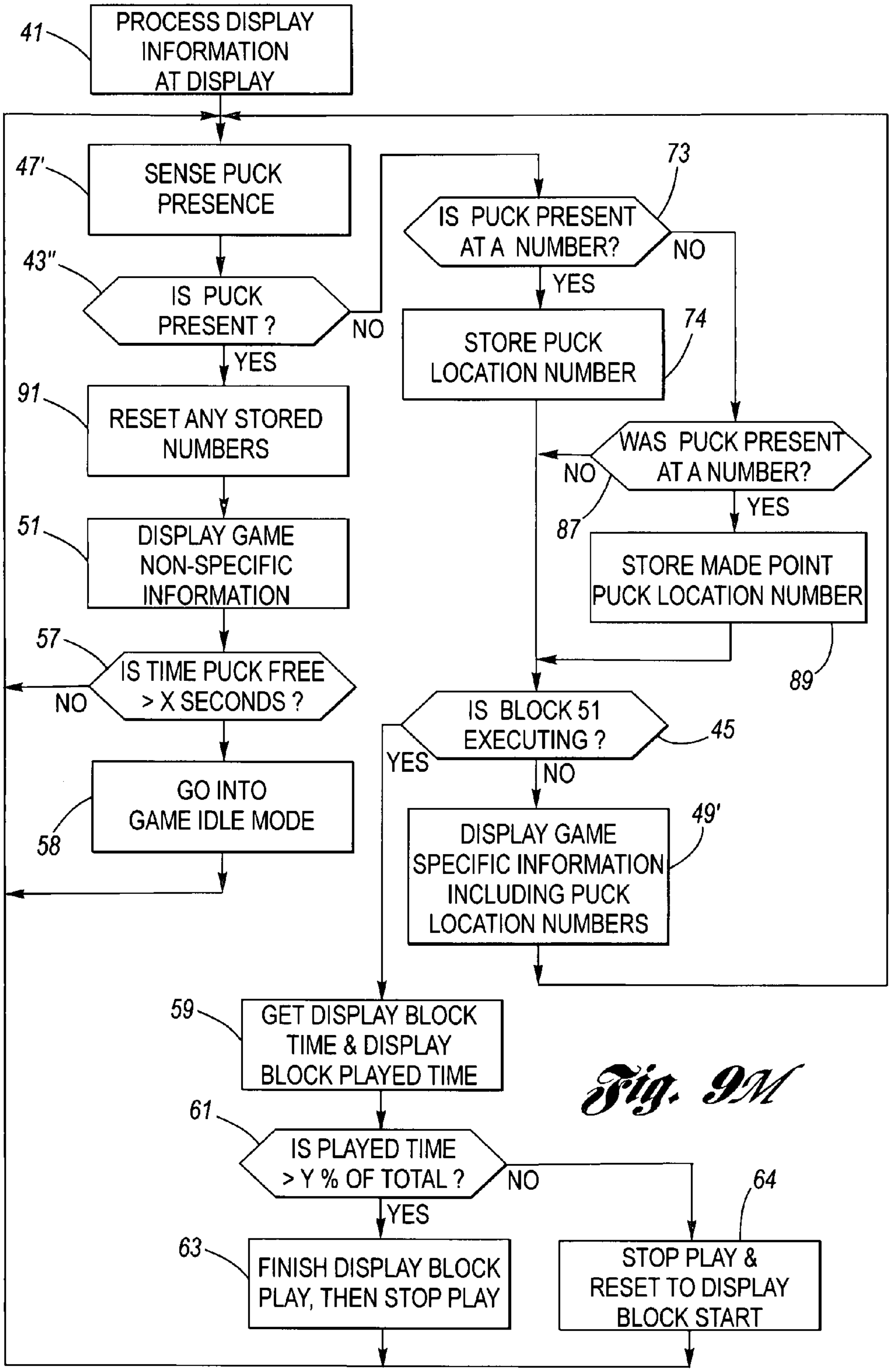
FIG. 9M is a flow chart for a method of carrying out the present invention for a game of craps utilizing the embodiment of FIG. 9C.

Referring next to FIG. 9M, shown is a flow chart in which the flow chart of FIG. 9L has been modified for the purpose of accommodating the craps table 190' and detectors 192 and 192*a*-192*f* of FIGS. 9C through 9E. In this regard, what is additionally desired is to detect puck placement when it is positioned over each point number of the layout 190*a* during the course of play of the game, and to show those point number placements as part of the game specific information.

For example, before a shooter is on his/her come out roll, the puck 194 will be located at the "don't come" area of the layout 190*a*, resting above a puck detector 192. When the puck is at this location, the game is interpreted to be inactive and game non-specific information is then displayed at the display(s). When a shooter is going to make his/her come out roll, the casino personnel will then place the puck behind the "don't come" area (not over any sensor 192 or 192*a*-192*f*), and now game specific information is displayed at the display(s). Once a point number is rolled by the shooter (i.e., the numeric outcome of the dice roll was a point number) the puck will be moved by casino personnel to the appropriate point number associated with the rolled point, and the respective puck detector located thereat 192*a*-192*f* will detect the presence of the puck thereover, which detection will thereupon trigger the microprocessor of the display to indicate, as part of the game specific information, the active point number. If subsequently the point number is made by the shooter, the casino personnel will then remove the puck from the position above the respective point number and then place the puck again behind the "don't come" area. The removal of the puck from the number and not subsequently over any sensor 192 or 192*a*-192*f* (after a predetermined time) is interpreted by the microprocessor to mean the point has been made (alternatively, another puck presence detector behind the "don't come" area could be used as an affirmative indication of when the puck is located thereat). Accordingly, the display will then indicate, as part of the game specific information, the point number that was made. This process is repeated as the shooter throws other rolls of the dice, desirably including shooting point numbers and made point numbers. On the other hand, however, if the shooter "sevens-out" on a roll of the dice, then the casino personnel will place the puck again in the "don't come" area of the layout, which will be detected by a sensor 192, and the game non-specific information will again be displayed (all numbers being cleared) at the display(s).

Returning to FIG. 9M, if the inquiry of Decision Block 43" is no, per a puck detector 192 at the "don't come" area of the layout, then inquiry is next made at Decision Block 73 whether the puck is located at a point number, using a respective one of the puck detectors 192*a*-192*f*. If the answer to the inquiry is no, then this means the puck is located behind the "don't come" area, and the game is active. Inquiry is next made at Decision Block 87 whether the puck had been previously at a point number location, and if the answer to the inquiry is no, then next at Decision Block 45, inquiry is made whether Block 51 is executing (as discussed above with respect to FIG. 3A), and if the answer to the inquiry is yes, then on to Block 59 and so on as described with respect to FIG. 3A. However, if the answer to the inquiry at Decision Block 73 is yes, then the point number is stored in memory at Block 74 and then inquiry is made at Decision Block 45, and so on as mentioned above. If, however, the answer to the inquiry at Decision Block 87 is yes, then this means the last stored point number has now been made, and at Block 89 the point number is stored in memory as a made point number.

If the answer to the inquiry at Decision Block 45 is no, then the microprocessor causes, at Block 49', to be displayed at the display(s) game specific information, which information includes the point number information, preferably including what point number is in play and what point numbers have been made by the shooter during his/her dice throwing session, and then return is made to Block 47'. Should the shooter seven-out during his/her dice throwing session, then, at Block 43", the puck will be moved to the "don't come" area detector 192, and the microprocessor will become aware that the puck is present at the puck detector 192, whereupon any stored point and made point numbers are erased at Block 91, and game non-specific information will be displayed at Block 51, with advance to Block 57, etc. as described above with respect to FIG. 3A.

Figure 9N:
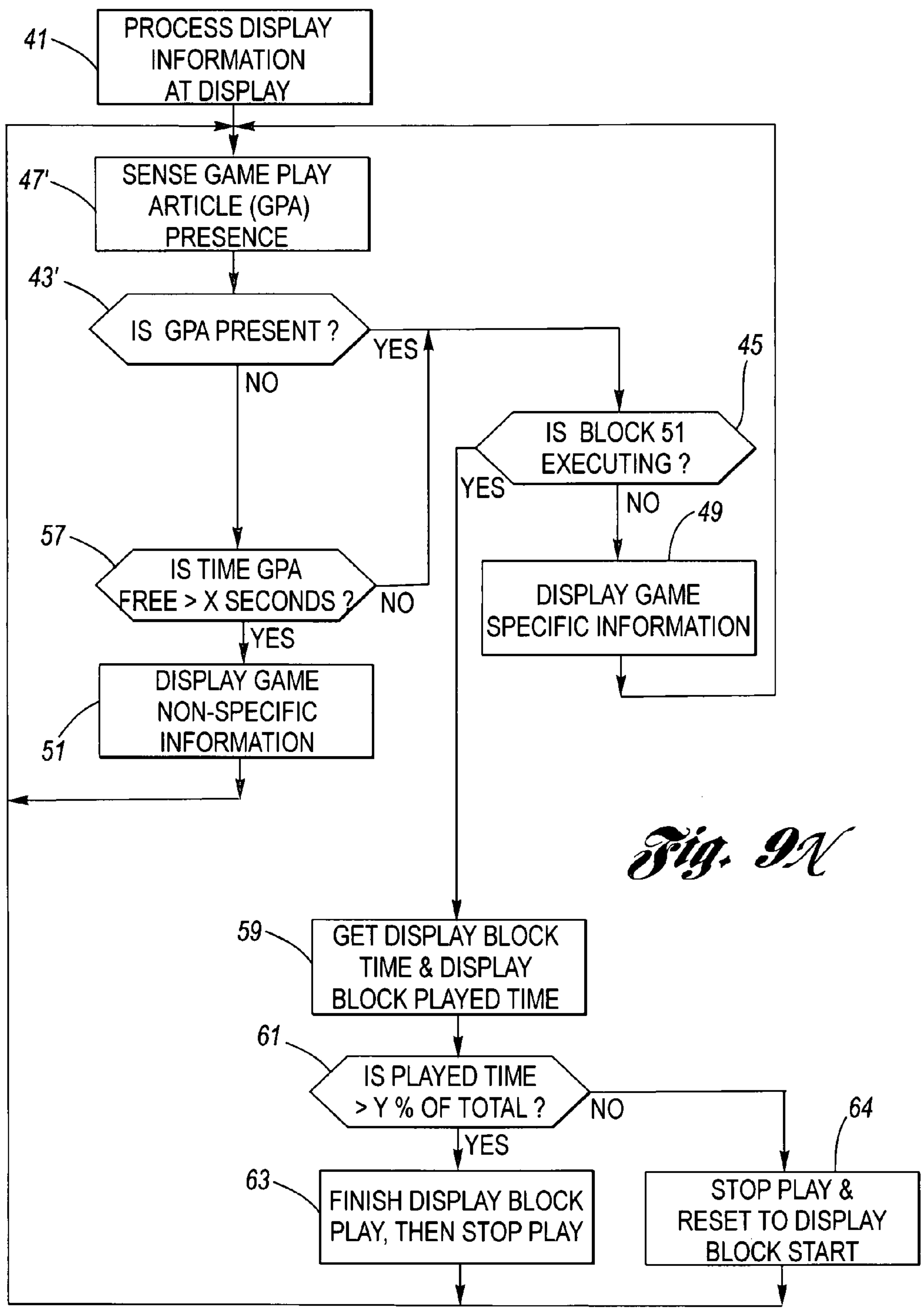
FIG. 9N is a flow chart for a method of carrying out the present invention in a game in which the status of the game is never, or rarely, paused.
Figure 90:
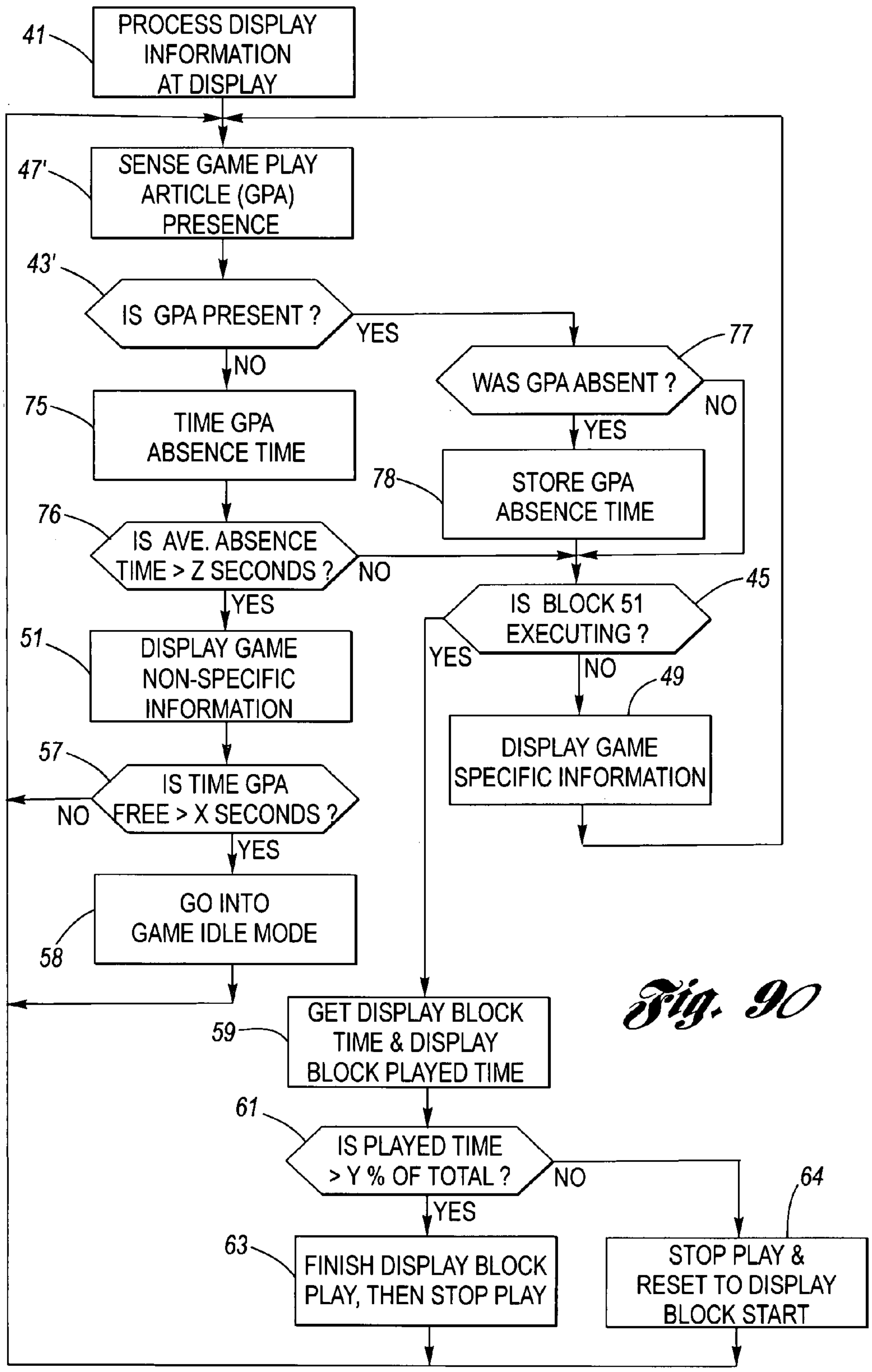

Turning attention now to FIG. 9N, shown is a flow chart in which the flow chart of FIG. 3A has been modified for the purpose of accommodating a game in which there is an absence of pausing, or pausing is either haphazard or so short that it is not practical to display game non-specific information thereduring. Accordingly, for practical purposes in this game scenario, the status of game inactivity is either idle or closed (paused is either not present or is ignored). The flow chart of FIG. 3A is modified to provide the flow chart of FIG. 9N by eliminating Block 58, placing Block 51 now as the yes result of the inquiry at Decision Block 57, and directing the no result of Decision Block 57 as an input to Decision Block 45, so that when game non-specific information is displayed at Block 51, the status of the game is, basically, idle.

Considering next FIG. 9O, shown is a flow chart in which the flow chart of FIG. 3A has been modified for the purpose of accommodating a game in which the pause time thereof may be sometimes too short, for practical reasons, to display game non-specific information thereduring, wherein by learning the status of play of the game over several game play cycles (a game play cycle comprises processing of the flow chart between a time in which the game play article presence is detected, the game play article absence is detected, and the game play article presence is again detected), the microprocessor determines whether it is appropriate to display game non-specific information during subsequent detected pauses of the game, per the game play article presence detection.

The flow chart of FIG. 3A is modified to provide the flow chart of FIG. 9O by adding Blocks 75 and 78 and Decision Blocks 76 and 77. If the result of the inquiry of Decision Block 43' is no, then at Block 75 the length of time the game play article has been absent is timed. At Decision Block 76, inquiry is made whether over the last several game cycles (as for example 3 cycles) the game play article has been absent on average greater than Z seconds. The time Z depends upon the length of time of play of a play segment of the game non-specific information, wherein for example Z equals the play time of a play segment, as for nonlimiting example Z may equal 30 seconds. Unless the minimum number of cycles have ensued (i.e., the 3 cycles mentioned hereinabove), or if the average game play article absence time has been less than Z seconds, then the answer to the inquiry will be no, whereupon Decision Block 45 executes, as described with respect to FIG. 3A. However, if the answer to the inquiry at Decision Block 76 is yes, then Block 51 executes, as described herein with respect to FIG. 3A. However, if the answer to the inquiry at Decision Block 43' is yes, then inquiry is made at Decision Block 77 whether the game play article had been absent, and if the answer to that inquiry is no, then Decision Block 45 executes as described herein with respect to FIG. 3A. However, if the answer to the inquiry at Decision Block 77 is yes, then the time of absence of the game play article is stored for later use in Decision Block 76 to ascertain the average time of absence of the game play article; thereupon Block 45 executes as previously described.

Figure 9P:
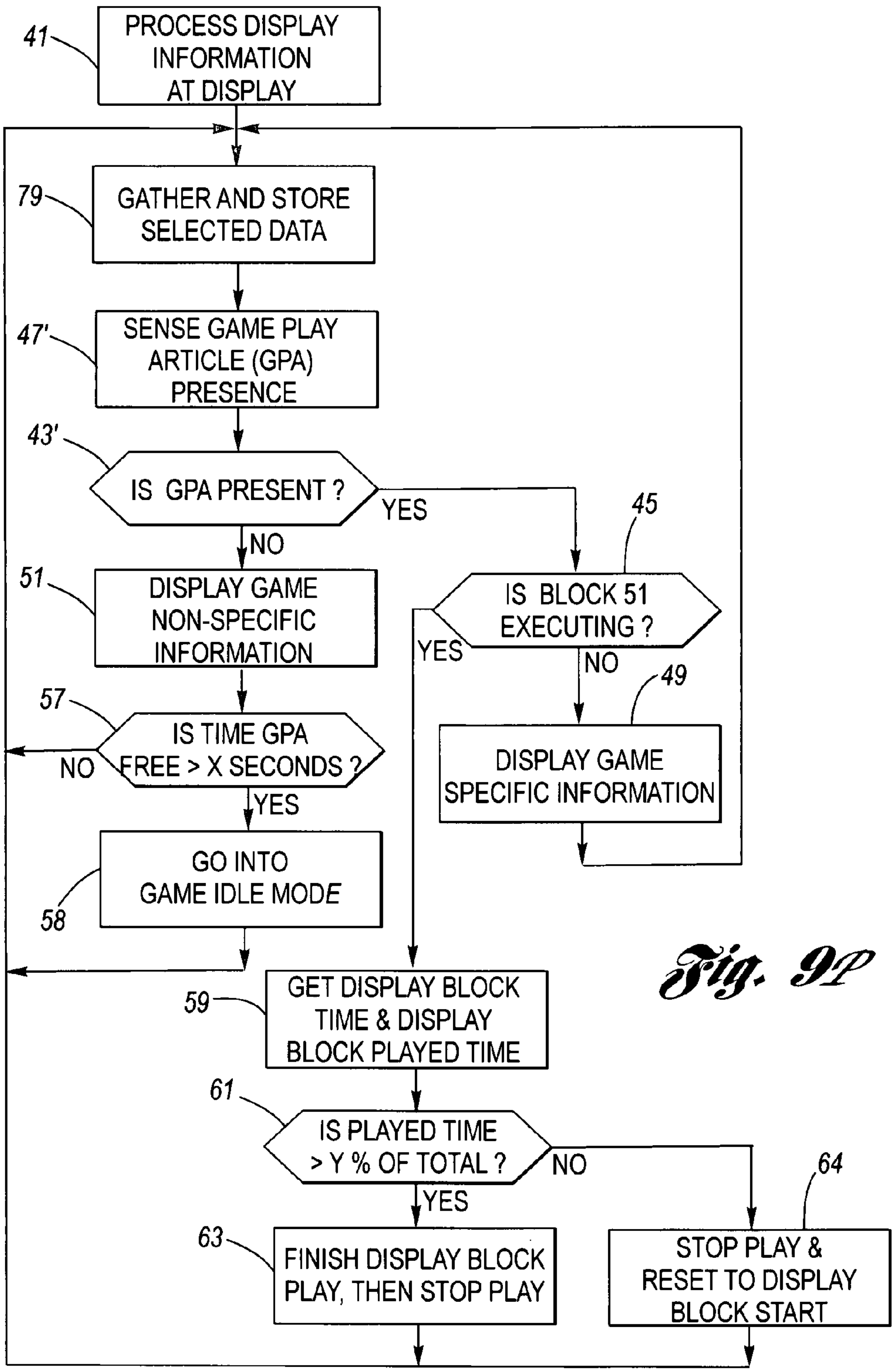
FIG. 9P is a flow chart for a method of carrying out the present invention, wherein statistical information is provided.

Moving on now to a consideration of FIG. 9P, shown is a flow chart in which the flow chart of FIG. 3A has been modified for the purpose of providing statistical data. For example the data may include how many times each individual play segment has played, how much elapsed time has the display displayed game specific information, how much elapsed time the display has displayed game non-specific information, how much elapsed time the status of play of the game is active, how much elapsed time the status of play of the game is inactive, how much elapsed time the status of the inactive play of the game is because the game has been paused, how much elapsed time the status of the inactive play of the game is because the game has been idle, and how much elapsed time the status of the inactive play of the game is because the game has been closed.

The flow chart of FIG. 3A is modified to provide the flow chart of FIG. 9P by adding Block 79. Each time the flow chart passes through Block 79 from any of Blocks 41, 58, 49, 63 and 64, and Decision Block 57, Block 79 processes predetermined data by obtaining (as for example by use of electronically recognizable identifiers embedded in the displayed information) and then storing the data for later retrieval. The data may be any data, and includes, preferably, information about what has been displayed on the display over a selected period of time. The data processed at Block 79 may, for nonlimiting example include: how many times each individual play segment of the game non-specific information has played, which data may be statistically arranged with respect to individual advertisements displayed, segments played of individual advertisers, segments played of the casino, and segments played of the display supplier; how much elapsed time has the display displayed game specific information; how much elapsed time the display has displayed game non-specific information; how much elapsed time the status of play of the game is active; how much elapsed time the status of play of the game is inactive; how much elapsed time the status of the inactive play of the game is because the game has been paused; how much elapsed time the status of the inactive play of the game is because the game has been idle; and how much elapsed time the status of the inactive play of the game is because the game has been closed.

It is to be understood from the foregoing description that the status of play of the game detector 21*a*, 21*b*, 21*c* may be any detector which detects the presence and/or absence of a game play article of the game with respect to the game table of the game, wherein the game play article may be for example, a card, a puck or another game play article.

Various aspects and considerations, among others, of the method according to the present invention are as follows.

Ability to display and adjust the table limits, game types and coordinating colors, independently, manually at the game or from a centralized remote station (a pit stand or a casino central location).

Ability to have the table minimum automatically reduced to another table minimum after a selected time lapse in the "TABLE DOWN" operational mode.

Ability to display interchangeable advertisements, which can be displayed at varying times and for varying duration.

Ability to target market by synchronizing advertisements in correlation with the table game limits (for example, each limit may have its own specific series of advertisements) or game types (for example, pai gow games may target Chinese restaurants) or game locations (for example games near a convention center may target advertisements for the convention).

Ability to manually select play of advertisement cycles at the game via the SHUFFLE and TABLE DOWN function keys.

Ability to change or program (download) new information, i.e., advertisements, from a remote location.

Ability to service or maintain the system from a remote location.

Ability to carryout all of the above using wireless communication.

Ability to carry out all the above using the internet.

Ability to deliver to each display individually tailored display information and/or microprocessor programming by connecting a data storage device to the data port of the display and then uploading the data to memory storage in the display, most preferably, for example, via a USB flash memory drive inserted into a USB port, but could alternatively for example be a flash memory card inserted into a flash card reader port, etc.; and further to change the display information and/or the microprocessor programming simply replacing the data storage device with another having different or revised display information and/or microprocessor programming data stored therein.

Ability for pit personnel to apprehend the displayed display information, particularly game specific information, from glancing at the rear of the display.

Ability to automatically detect status of play of the game and then to automatically display game specific and/or game non-specific information responsive to the detected status.

An example of operation of Blocks 44 and 46 for a blackjack table is as follows over a 24 hour day. Block 44 operates normally. Shuffling time is estimated at 192 minutes, whereduring Block 46 is operative. Table down time is estimated at 2 hours per day, whereduring Block 46 is operative. In this example, Block 46 would be operative for about 312 minutes per day, whereduring revenues are generatable from the displayed game non-specific information (ie., advertisements).

It is to be understood that the methodology of the present invention is independent of the exact type of electronics and hardware used for its implementation. As such, in considering the method according to the present invention all electronics and hardware discussed hereinabove should be regarded merely as providing an illustration of implementation, and not a definitive and/or limiting implementation.

It is a further aspect of the present invention that the automatic detection of the status of play of the game may be combined, in any synergistic manner, with manual input (i.e., casino personnel manual key press input) of status of play of the game.

Turning attention next to FIGS. 10 through 12B, a method of implementation of the present invention will be described with respect to an exemplar flow chart 200 and exemplar display segments allocations 300, 300', 300", 300'" for the game non-specific information.

Figure 10:
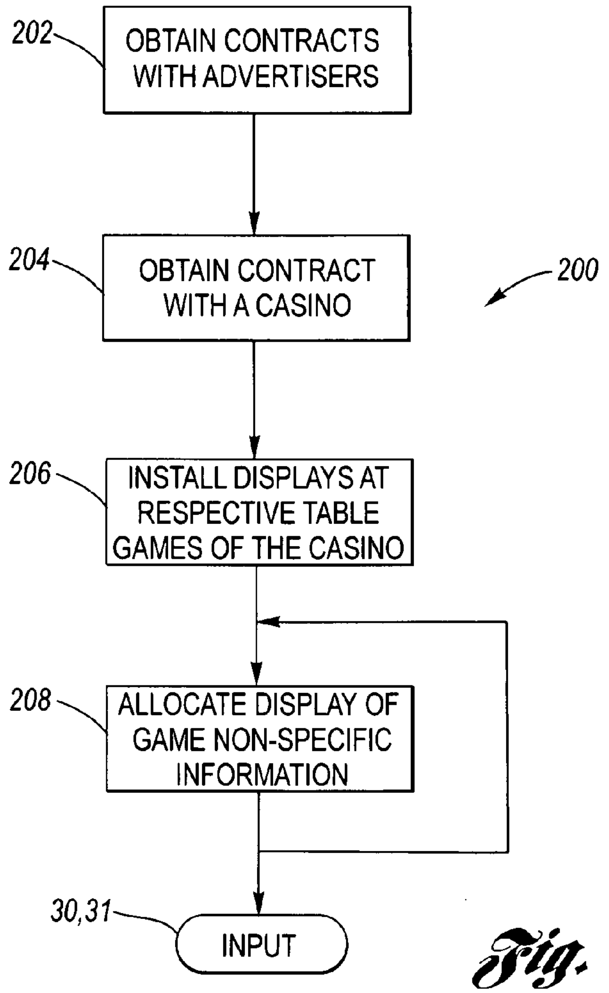
FIG. 10 is a flow chart for a method of implementation of the present invention.

Referring to FIG. 10, in Block 202, a supplier obtains contracts with advertisers (as for example corporations having products or services to advertise) with respect to paid advertisements for one or more display segments (see FIGS. 11A through 11D) of the display of game non-specific information as generally described hereinabove. In Block 204, a contract is obtained by the supplier with a casino for installation of displays at table games as generally described hereinabove, wherein preferably the casino has no cost and any profit for the supplier is derived from the execution of Block 206 via the contracts obtained in Block 202, and wherein mutual agreement between Blocks 202 and 204 is present such that the casino accepts certain of the advertisers of Block 202, which may also include acceptance of the advertisements thereof, for display as display segments (see FIGS. 11A through 11D). In Block 206, the displays inclusive of the display electronics and any other components, as for example status of play of the game detectors (sensors), other electronics, etc. as described hereinabove (see FIGS. 1 and 1A), are installed in the casino with respect to various table games thereof, wherein the casino, as mentioned, preferably receives the installation at no cost as a result of the casino accepting the display of certain display segments of advertisers of Block 202. In Block 208, display segments of the game non-specific information are determined and allocated among the one or more of the advertisers and, preferably, also the casino, as generally based upon, and pursuant to, Blocks 202 and 204. The display segments sequentially repeat or repeat in another predetermined order, wherein the allocation in Block 208 is subject to periodic revision. The allocation in Block 208 is input, for example, at either Block 30 of FIG. 2 or Block 31 of FIG. 3, whereupon the invention as previously described is implemented (as for example via the implementations described for FIGS. 2 through 3B, above) with respect to selective display of game specific and game non-specific information.

It is to be understood that flow chart 200 is merely exemplar. For example, the supplier can reach contractual accord with advertisers of predetermined display segments and/or display blocks and with a casino for installation of the displays, wherein the supplier and the casino can share in revenue on a predetermined agreed basis from the advertisers, and wherein the casino can be allocated to itself certain of the display segments and/or display blocks.

Figure 11A:
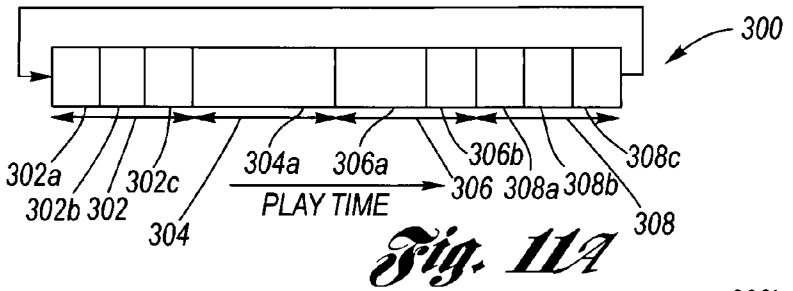
FIGS. 11A through 11D are schematic representations of allocations of display segments of game non-specific information according to the present invention.
Figure 11B:
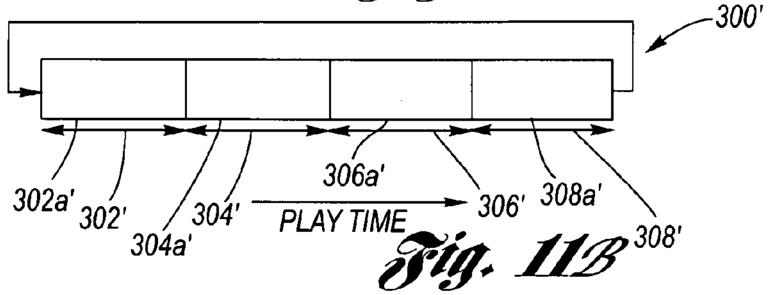

Referring now to FIGS. 11A and 11B, an example of a display segments allocation 300 for a low betting limit (i.e., a game specific information of for example "Betting Limits of $1 to $5") and a display segments allocation 300' for a high betting limit (i.e., a game specific information of for example "Betting Limits of $25 to $500") are shown, being rendered upon completion of, for example, either execution Block 32 or Block 33 of FIG. 2 or 3, respectively. In this regard, by way merely of example, the game of Blackjack may have a dealer card shuffle time of 30 seconds. Accordingly, it is desirable to allocate display segments in display blocks of 10 seconds, so that during a shuffle time, whole number display segments will be displayed. Thus, in FIG. 11A there are four display blocks 302, 304, 306, 308, each 30 seconds long; and, similarly, in FIG. 11B there are four display blocks 302', 304', 306', 308', each 30 seconds long. In FIGS. 11A and 11B play time is from left to right.

With regard to FIG. 11A, by way merely of example and not limitation, the display segments are allocated and generated as programming of the game non-specific information, wherein the display segments are allocated as follows. Display block 302 is divided into three display segments, 302*a*, 302*b*, 302*c*, wherein: display segment 302*a* has a play time of 10 seconds, is allocated to a first advertiser of Block 202 and is in the form of MPEG video; display segment 302*b* has a play time of 10 seconds, is allocated to a second advertiser of Block 202 and is in the form of a BMP image; and display segment 302*c* has a play time of 10 seconds, is allocated to the casino of Block 204 and is in the form of MPEG video. Display block 304 is undivided as one display segment 304*a*, wherein: display segment 304*a* has a play time of 30 seconds, is allocated to the casino of Block 204 and is in the form of MPEG video. Display block 306 is divided into two display segments, 306*a*, 306*b*, wherein: display segment 306*a* has a play time of 20 seconds, is allocated to the first advertiser of Block 202 and is in the form of MPEG video; and display segment 306*b* has a play time of 10 seconds, is allocated to a third advertiser of Block 202 and is in the form of MPEG video. Display block 308 is divided into three time display segments, 308*a*, 308*b*, 308*c*, wherein: display segment 308*a* has a play time of 10 seconds, is allocated to a fourth advertiser of Block 202 and is in the form of a BMP image; display segment 308*b* has a play time of 10 seconds, is allocated to the casino of Block 204 and is in the form of a BMP image; and display segment 308*c* has a play time of 10 seconds, is allocated to a fifth advertiser of Block 202 and is in the form of MPEG video.

With regard to FIG. 11B, by way merely of example and not limitation, the display segments are allocated and generated as programming of the game non-specific information, wherein the display segments are allocated as follows. Display block 302' is undivided as one display segment, 302*a*', wherein: display segment 302*a*' has a play time of 30 seconds, is allocated to a first advertiser of Block 202 and is in the form of MPEG video. Display block 304' is undivided as one display segment 304*a*', wherein: display segment 304*a*' has a play time of 30 seconds, is allocated to the casino of Block 204 and is in the form of MPEG video. Display block 306' is undivided as one display segment, 306*a*', wherein: display segment 306*a*' has a play time of 30 seconds, is allocated to a second advertiser of Block 202 and is in the form of MPEG video. Display block 308 is undivided as one display segment 308*a*', wherein: display segment 308*a*' has a play time of 30 seconds, is allocated to the casino of Block 204 and is in the form of MPEG video.

Figure 11C:
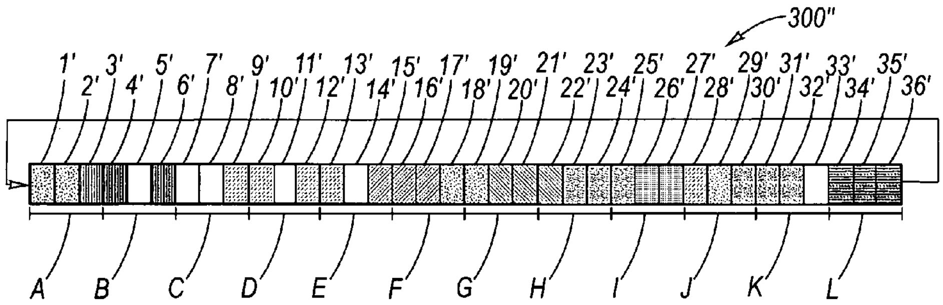

Turning attention now to FIG. 11C, a display segments allocation 300" of the game non-specific information is presented. The allocation is made by determining a paused time of the game, said paused time comprising game play inactivity which is due to the game play being paused, then allocating the length of the display segments into a division of the pause time, wherein the display block composed thereof is equal to the paused time.

There are 36 display segments (each shown having its own respective number designator 1'-36'), of which thirty of the display segments are allocated for use by a casino where the displays are installed, and six of the display segments are allocated to the vendor supplying the displays. The display segments are each 10 seconds long, and can be combined, preferably providing display blocks of three display segments (each of 30 seconds duration), wherein consecutively for the entire segments allocation 300", every three display segments constitutes a display block of 30 seconds duration, indicated by letters A through L.

By way merely of exemplification, the particular shading of each display segment is indicative of its allocation to a respective particular advertiser, wherein: display segments 1', 2', 18', 19' and 29' are allocated to a first advertiser; display segments 3', 4' and 6' are allocated to a second advertiser; display segments 5', 7', 8', 11', 14' and 33' are allocated to a third advertiser; display segments 9', 10', 12', 13' and 28' are allocated to a fourth advertiser; display segments 15', 16' and 17' are allocated to a fifth advertiser; display segments 20', 21' and 22' are allocated to a sixth advertiser; display segments 23', 24', 25', 30', 31' and 32' are allocated to a seventh advertiser; display segments 26' and 27' are allocated to an eighth advertiser; and, finally, display segments 34', 35' and 36' are allocated to a ninth advertiser. By further exemplification, the display segments of FIG. 11C have been sold to advertisers in which display segments number 3', 4', 6', 34', 35' and 36' are allocated to the vendor, and the remaining display segments are allocated to the casino.

By way merely of example, the displaying of the display segments in FIGS. 11A through 11C may sequentially repeat, or go on to other pre-programmed display blocks, until modified per FIG. 10. In this regard a most preferred example of a display segments allocation 300" is depicted at FIG. 11D.

Figure 11D:
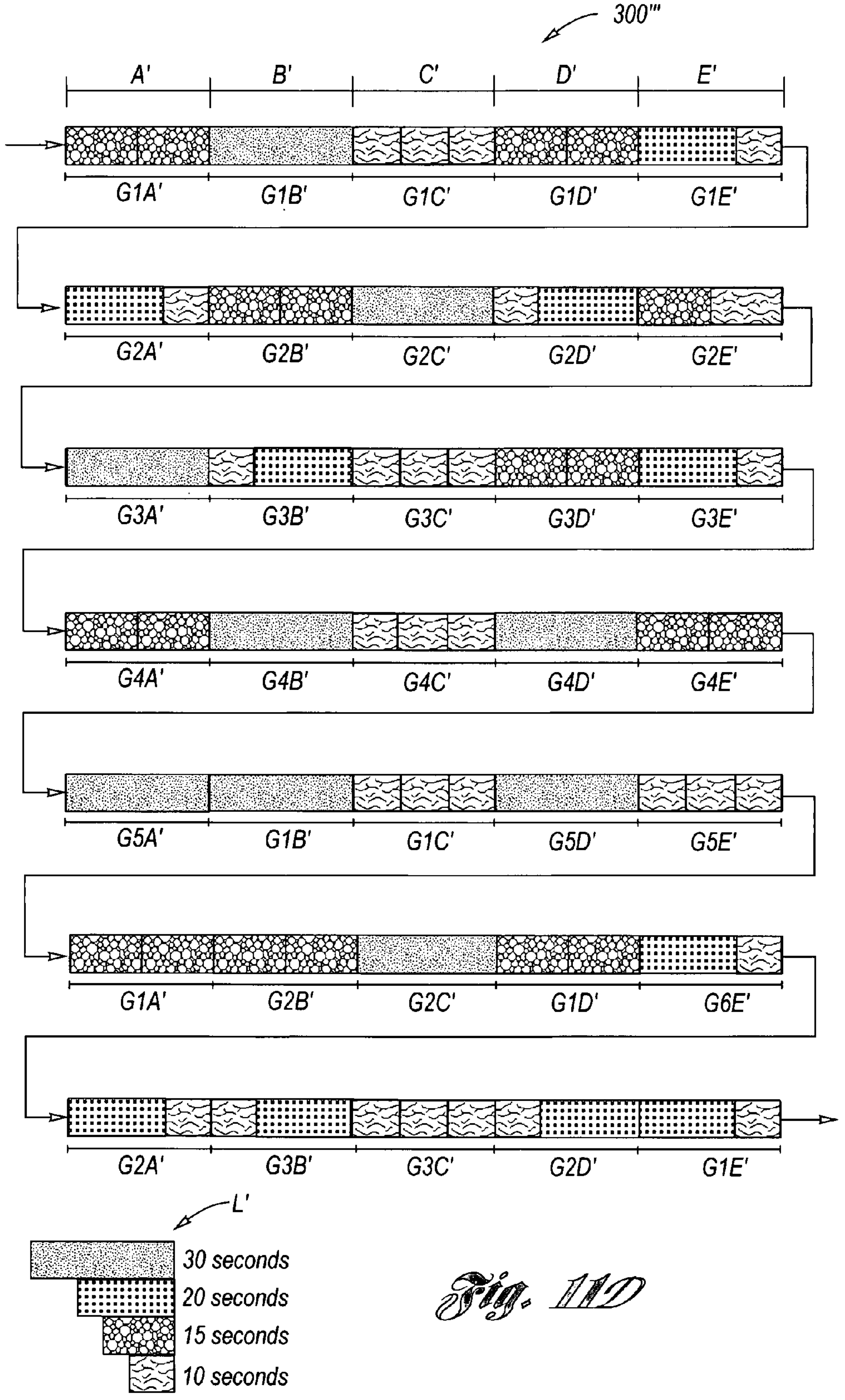

At FIG. 11D, a plurality of display blocks are provided, each of 30 seconds duration. There are preferably five display blocks in total, A', B', C', D', and E'. Each display block A'-E' has its own respective display group, the number of display groups may be varied from time to time and may be different among the various display blocks (as a practical matter, the number of display groups of any one display segment is limited by data storage space capacity of the display taking into account the data storage allocated to the other display segments). For example merely be way of exemplar illustration in FIG. 11D, display block A' has display groups G1A', G2A', G3A', G4A', and G5A'; display block B' has display groups G1B', G2B', G3B', and G4B'; display block C' has display groups G1C', G2C', G3C', and G4C'; display block D' has display groups G1D', G2D', G3D', G4D', and G5D'; and display block E' has display groups G1E', G2E', G3E', G4E', G5E', and G6E'.

Each of the display groups G1A'-G6E' is divided, respectively, into display segments, each of which having a duration of any of 10 seconds, 15 seconds, 20 seconds or 30 seconds (see legend L' of FIG. 11D), provided that any combination of which equals the 30 seconds duration of its respective display segment. For example, display group G1A' has two 15 second display segments, display group G1B' has one 30 second display segment, display group G1C' has three 10 second display groups, and display group G1E' has two display segments, one of 20 seconds and the other of 10 seconds.

Display of the content of the display blocks A'-E' is performed when the game status of the respective game is inactive due to the game being paused, idle or closed. While the length of play (duration) the display blocks may all be the same (i.e., 30 seconds), the displayed content in the display groups and the number of played display groups may be different based on whether the status of the game is idle or closed, or if the status of play of the game is paused. Allowing additional display groups allows for advertisers to vary their advertising content of the game non-specific information.

It is to be noted that a display block time of 30 seconds is by way of preference and another time could be selected. In this regard, the number of display segments and the durations of the various display segments may be other than 10, 15, 20 and 30 seconds so as to fit the selected time of the display block.

The display blocks are played sequentially. In FIG. 11D, this would entail display of display block A', then display block B' then display block C' then display block D' then display block E', and then repeat. The display sequence and the repetition are based upon sequencing through the display groups. Once the last display group of a display block has been displayed, then when that display block is next displayed, per the display block sequencing, the first display group in that display block will be displayed. For example, the display segments allocation 300'" would sequentially display the following display segments: G1A', then G1B', then G1C', then G1D', then G1E', then G2A', then G2B', then G2C', then G2D', then G2E', then G3A', then G3B', then G3C', then G3D', then G3E', then G4A', then G4B', then G4C', then G4D', then G4E', then GSA', then G1B', then G1C', then G5D', then G5E', then G1A' then G2B', then G2C', then G1D', then G6E', then G2A' then G3B', then G3C', then G2D', then G1E', etc.

Figure 12A:
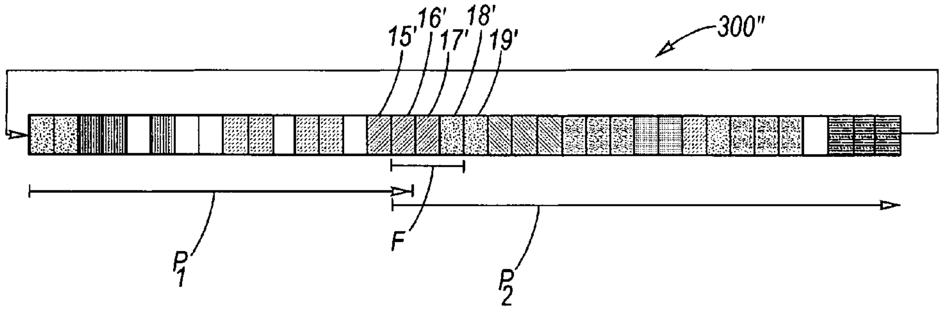
FIGS. 12A and 12B are schematic representations of allocations as in FIG. 11C, wherein each shows a different play stop and play restart scenario according to the present invention, as for example per FIGS. 2A and 3A, respectively.
Figure 12B:
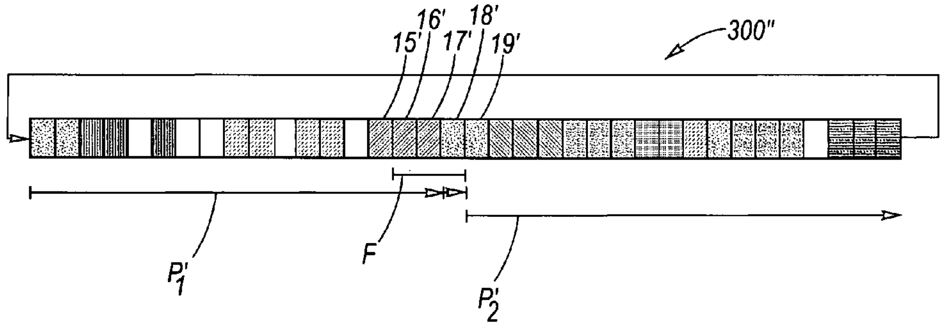

Referring back to the implementation algorithms of FIGS. 2 through 3B as they pertain to the preferred display segments allocation 300" of FIG. 11C, FIG. 12A exemplifies the execution of Block 56 of FIG. 2A and the execution of Block 64 of FIG. 3A, wherein when display of game non-specific information is to end, play $P_1$ is less than 66% into display block F at about the end of display segment 16', so the next play $P_2$ will be restarted at the beginning of display block F (corresponding to the beginning of display segment 16'); whereas FIG. 12B exemplifies the execution of Block 55 of FIG. 2A and the execution of Block 63 of FIG. 3A, wherein when display of game non-specific information is to end, play $P'_1$ is more than 66% into display block F, so play continues through the end of the display block (corresponding to the end of display segment 19'), then the next play $P'_2$ will be started at the beginning of the next display block G (corresponding to the beginning of display segment 19').

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for providing dynamic casino game signage, comprising:

providing an electronic display at a table of a game which is a live table game utilizing a dealer;

providing display information on the electronic display comprising a table betting minimum and maximum which is related to the game wherein the table betting minimum is a minimum bet required to play the game at the table and the table betting maximum is a maximum bet permitted on the game at the table and providing advertisements unrelated to the game, wherein players at the table are permitted to bet amounts including and between the minimum and the maximum to play the game;

providing a game closed key on the electronic display which is configured to set a current status of the table to a closed mode, providing adjustment keys on the electronic display configured to enable adjustment of the table betting minimum and maximum;

wherein the current status of the table is variable from a set comprising at least closed, active, and two inactive types, comprising inactive paused, and inactive idle, wherein closed represents that the table is closed for play, inactive paused represents that the game at the table is currently undergoing shuffling, inactive idle represents that the table is open but the game is not currently in play due to no players being at the table;

automatically detecting at the table, using an electronic detector, between a presence and absence of a tangible moveable game play article at a predetermined location associated with the table, said game play article being physically moved by a casino personnel who is not a player, and determining the current status using circuitry which provides that except when the current status is closed determines that the current status is active when the game play article is present and determines that the current status is inactive paused when the game play article is absent and determines that the current status is inactive idle instead of inactive paused when the game play article is absent for more than a predetermined period of time;

providing programming for the electronic display comprising: (a) upon the current status being inactive of either type, displaying both the table betting minimum and maximum bet and displaying the advertisements; (b) upon the current status going from inactive of either type to active, displaying the table betting minimum and maximum and terminating display of the advertisements; (c) upon the current status being closed, displaying the advertisements and not the table betting minimum and maximum; and (d) upon the current status being inactive idle for a predetermined amount of time then automatically reducing the table betting minimum; and implementing the programming on the electronic display.

2. The method of claim 1, wherein the terminating display of the advertisements terminates a currently displaying advertisement.

3. The method of claim 1, wherein the terminating display of the advertisements allows a currently displaying advertisement to finish playing before displaying the table betting minimum and maximum without the advertisements.

4. The method of claim 1, wherein the terminating the display of the advertisements comprises:

determining a percent a currently playing display block that has already been played;

completing play of the currently playing display block if the percent is more than a predetermined percentage otherwise immediately stopping play of the currently playing display block.

5. The method as recited in claim 4, wherein the currently playing display bock is a single advertisement.

6. The method of claim 1, further comprising selecting advertisements for displaying based on the table betting minimum.

7. The method of claim 1, further comprising wirelessly transmitting at least one of the advertisements and the table betting minimum and maximum to the display.

8. The method of claim 7, wherein said step of wireless transmitting comprises transmission over the internet to a local area network.

9. The method of claim 1, further comprising changing the table betting minimum and maximum from presses of the adjustment keys located on the electronic display.

10. The method as recited in claim 1, further comprising:

providing a plurality of display segments comprising the advertisements;

allocating the display segments into display blocks;

determining a paused time of the game, said paused time comprising game play inactivity which is due to the game being shuffled; and allocating a length of the display segments into a division of the pause time, wherein any display block composed thereof is equal to the paused time.

11. The method of claim 1, further comprising:

Gathering at the electronic display statistical information pertaining to the game.

12. The method as recited in claim 1, further comprising providing a discard rack comprising the electronic detector located on a base of the discard rack, wherein the detector detects presence and absence of a card placed in the discard rack, wherein the game play article is the card.

13. The method as recited in claim 12, wherein the detector comprises a light sensitive device configured to detect light in the discard rack, and configured such that when no light is detected in the discard rack then it is determined there is the presence of the card in the discard rack, and when light is detected in the discard rack then it is determined that there is the absence of the card in the discard rack.

14. The method as recited in claim 12, wherein the game is blackjack, the table is a blackjack table.

15. The method as recited in claim 12, further comprising:

triggering a change in the current status from active to inactive paused, wherein the electronic display is not currently displaying advertisements; and in response to the change in the current status, initiating a display of advertisements on the display.

16. The method as recited in claim 12, further comprising:

triggering a change in the current status from inactive of either type to active, wherein the electronic display is currently displaying an advertisement; and in response to the change in the current status, terminating display of advertisements on the display.

17. The method as recited in claim 1, further comprising:

providing a first block comprising a plurality of advertisements and a second block comprising a plurality of advertisements, the first block being selected to display when the current status is closed and the second block being selected to display when the current status is inactive idle, the first block being different from the second block;

providing advertising rules comprising when the current status is closed the first block is displayed on the electronic display and when the current status is inactive idle the second block is displayed on the electronic display; and implementing the advertising rules.

18. The method as recited in claim 1, wherein the game is blackjack, the game play article is a card, and the predetermined location is inside a discard rack on the table.

19. A method for providing dynamic casino game signage, comprising:

providing display information comprising a table betting minimum and maximum related to a live casino game at a table wherein the table betting minimum is a minimum bet required to play the game at the table and the table betting maximum is a maximum bet permitted on the game at the table and providing advertisements unrelated to the game, wherein players at the table are permitted to bet amounts including and between the minimum and the maximum to play the live casino game;

providing an electronic display at the table;

providing a game closed key on the electronic display which is configured to set a status of play to closed when pressed;

automatically detecting the status of play between active and inactive of the game at the table, and automatically displaying on the electronic display the table betting minimum and maximum without advertisements when the status of play of the game is active and displaying on the electronic display the advertisements when the status of play is inactive, wherein the selections are at least in part responsive to the automatically detected status of play of the game;

wherein said operation of automatically detecting comprises automatic detection of at least one presence and absence of a tangible physically movable game play article of the game having been physically moved with respect to a predetermined location at the table, said game play article being physically moved by a live dealer of the game who is other than a player of the game, wherein presence of the tangible physically movable game play article in the predetermined location determines that the status of play of the game is active and absence of the tangible physically movable game play article in the predetermined location determines that the status of play of the game is inactive, wherein there are two types of inactive statuses comprising inactive paused when the table is undergoing shuffling and inactive idle due to no players being at the table;

determining that the status of play is inactive paused due to the absence of the tangible physically movable game play article;

after a predetermined amount of time that the tangible physically movable game play article is continuously absent then determining that the status of play is inactive idle instead of inactive paused;

after a predetermined amount of time that the status of play is inactive idle, then automatically reducing the table betting minimum;

receiving a press of the game closed key and then automatically displaying on the electronic display the advertisements without displaying the table betting minimum and maximum.

20. The method of claim 19, wherein the game play article is a card, wherein said step of automatically detecting comprises automatic detection of presence and absence of the card at a predetermined location associated with the table, wherein detected presence of the card causes the status of play of the game at the table to be active; and wherein detected absence of the card causes the status of play of the game at the table to be inactive.

21. The method as recited in claim 19, further comprising:

providing a discard rack comprising an electronic detector located on a base of the discard rack, wherein the detector detects presence and absence of a card placed in the discard rack, wherein the game play article is the card, wherein the automatically detecting utilizes the detector.

22. The method as recited in claim 21, further comprising:

triggering a change in the status of play from active to inactive paused, wherein the display is not currently displaying advertisements; and in response to the change in the status of play, initiating a display of advertisements on the display.

23. The method as recited in claim 21, further comprising:

triggering a change in the status of play from inactive to active, wherein the display is currently displaying an advertisement; and in response to the change in the status of play, terminating display of advertisements on the display.

24. A system for providing dynamic casino game signage, comprising:

an electronic display located at a table for a live casino table game, the electronic display comprising a game closed key;

display information comprising game betting minimum and maximum which is related to the game and advertisements which is unrelated to the game;

a detector which automatically detects a status of play of the game between active and inactive; and display electronics programmed to selectively display at said electronic display the game betting minimum and maximum without the advertisements when the status of play is active and selectively displaying at said electronic display the advertisements when the status of play is inactive, wherein what is selectively displayed is dependent upon the status of play determined by the detector;

wherein said detector comprises a sensor connected with said electronic display electronics, said sensor detecting at least one of presence and absence of a tangible physically movable game play article having been moved with respect to a predetermined location of the table, said game play article limited to physical movement by a live dealer of the game who is other than a player of the game, wherein presence of the tangible physically movable game play article in the predetermined location determines that the status of play of the game is active and absence of the tangible physically movable game play article in the predetermined location determines that the status of play of the game is inactive, wherein the electronic display electronics are further programmed such that there are two types of inactive statuses comprising inactive paused when the table is undergoing shuffling and inactive idle due to no players being at the table, wherein absence of the tangible physically movable game play article in the predetermined location results in the status of play of the game being inactive paused, and absence of the tangible physically movable game play article in the predetermined location after a predetermined period of time results in the status of play changing from inactive paused to inactive idle, wherein the electronic display electronics are further programmed such that after a predetermined period of time that the status of play is inactive idle, then automatically reducing the game betting minimum, wherein the electronic display electronics are further programmed such that upon receiving a press of the game closed key then setting the status of play to closed and display the advertisements without the game betting minimum and maximum.

25. The system of claim 24, further comprising a wireless delivery system which delivers the display information to said electronic display.

26. The system of claim 24, further comprising a data storage device which delivers the display information to said electronic display.

27. The system of claim 24, wherein said detector comprises:

a discard rack;

the sensor located with respect to said discard rack, wherein said sensor senses presence and absence of a card placed in said discard rack, wherein the game play article is the card; and an interconnection between said sensor and said display electronics.

28. The system of claim 27, wherein said sensor comprises an electro-optical sensor located at a base of said discard rack.

29. An apparatus, comprising:

an electronic display located at a table for a live game, the electronic display configured to display information, the information comprising a table betting minimum and maximum which is related to the game and advertisements unrelated to the game;

a game closed key on the electronic display configured to set a current status of the table into a closed mode;

adjustment keys on the electronic display configured to enable adjustment of the table betting minimum and maximum, wherein the current status of the table is variable from a set comprising at least closed, active, and two inactive types, comprising inactive paused and inactive idle, wherein closed represents that the table is closed for play, active represents that the game at the table is currently in play, inactive paused represents that the table is open but the game not currently available for play due to shuffling, and inactive idle represents that the table is open but the game is not currently in play due to no players being at the table;

an electronic detector configured to detect between a presence and absence of a tangible moveable game play article at a predetermined location associated with the table; and a microprocessor programmed to determine the current status, unless the current status is closed, between active, inactive paused and inactive idle based on the presence/absence of the game play article at the predetermined location using the detector, the microprocessor in communication with the electronic display, wherein the current status is determined to be inactive paused upon the absence of the game play article, and the current status is determined to be inactive idle instead of inactive paused upon the absence of the game play article after a predetermined amount of time, and the current status is determined to be active upon the presence of the game play article, wherein the microprocessor is further programmed to (a) upon the current status being inactive of either type, display on the electronic display both the table betting minimum and maximum bet and display the advertisements; (b) upon the current status going from inactive of either type to active, display on the electronic display the table betting minimum and maximum and terminate display of the advertisements; (c) upon the current status being closed, display on the electronic display the advertisements and not the table betting minimum and maximum; and (d) after a predetermined amount of time that the current status is inactive idle, then automatically reducing the game betting minimum.

30. The apparatus as recited in claim 29, wherein the microprocessor is further programmed such that the terminate display of the advertisements terminates a currently displaying advertisement.

31. The apparatus as recited in claim 29, wherein the microprocessor is further programmed such that the terminate display of the advertisements allows a currently displaying advertisement to finish playing before displaying the table betting minimum and maximum without the advertisements.

32. The apparatus as recited in claim 29, wherein the microprocessor is further programmed such that the terminate the display of the advertisements performs operations to:

determine a percent a currently playing display block that has already been played;

complete play of the currently playing display block if the percent is more than a predetermined percentage otherwise immediately stopping play of the currently playing display block.

33. The apparatus as recited in claim 32, wherein the currently playing display block is a single advertisement.

34. The apparatus as recited in claim 29, further comprising a discard rack comprising the electronic detector located on a base of the discard rack, wherein the detector is configured to detect presence and absence of a card placed in the discard rack, wherein the game play article is the card, wherein the microprocessor is further programmed such that presence of the card in the discard rack triggers the current status to be active and the absence of the card in the discard rack triggers the current status to be inactive.

35. The apparatus as recited in claim 34, wherein the detector comprises a light sensitive device configured to detect light in the discard rack, and configured such that when no light is detected in the discard rack then it is determined there is the presence of the card in the discard rack, and when light is detected in the discard rack then it is determined that there is the absence of the card in the discard rack.

36. The apparatus as recited in claim 34, wherein the game is blackjack and the table is a blackjack table.

37. The apparatus as recited in claim 29, wherein the microprocessor is further programmed such that a first block of a plurality of advertisements is displayed when the current status is closed and a second block of plurality of advertisements is displayed when the current status is inactive idle, the first block being different from the second block.

38. The apparatus as recited in claim 29, wherein the microprocessor is further programmed to determine the current status such that the presence of the game play article at the predetermined location results in the current status being active and the absence of the tangible moveable game play article at the predetermined location results in the current status being inactive of either type.

39. The apparatus as recited in claim 38, further comprising a discard rack housing the detector which is configured to detect whether a card is present in the discard rack, the detector being in communication with the microprocessor such that when the card is present in the discard rack the game play article is present at the predetermined location and when the card is not present in the discard rack the game play article is not present at the predetermined location, wherein the game is blackjack, the game play article is the card, and the predetermined location is inside the discard rack on the table.

40. A method, comprising:

providing an electronic display at a casino game table of a casino table game;

providing display information comprising game specific information which comprises a bet minimum which is a minimum amount that a player must bet to play at the casino table game and a bet maximum which is a maximum amount that the player is permitted to bet at the casino table game and game non-specific information comprising an advertisements which is unrelated to the casino table game;

a) determining a current status of play of the casino table game to be closed by receiving a corresponding status of play key press activated by casino personnel;

b) automatically displaying at the electronic display the game non-specific information but not displaying the game specific information when the current status of play of the casino table game is closed, wherein closed means the casino table game is unavailable for play;

c) determining the current status of play of the casino table game to be active by receiving a corresponding status of play key press activated by casino personnel, and automatically displaying at the electronic display the game specific information when the current status of play of the casino table game is active;

d) determining the current status of play of the casino table game to be paused by receiving a corresponding status of play key press activated by casino personnel, and automatically displaying at the electronic display both the game specific information and the game non-specific information when the current status of play of the casino table game is paused, wherein the paused status is due to shuffling;

e) determining the current status of play of the casino table to be idle by receiving a corresponding status of play key press activated by casino personnel, wherein the idle status means the casino table game is not currently in play due to no players being at the game table; and f) automatically, after a predetermined amount of time elapses when the status of play is idle, reducing the bet minimum.

41. The method as recited in claim 40, further comprising providing keys on the electronic display enabling adjustment of the bet minimum.

42. The method as recited in claim 41, further comprising receiving keypresses on keys provided on the electronic display thereby causing an adjustment of the bet minimum.

43. An apparatus, comprising:

a gaming table enabled to accommodate a casino game;

status input keys configured to receive a current status of the casino game, the current status being in a set of different potential statuses comprising closed, active, inactive paused and inactive idle, each of the potential statuses being individually selectable;

an electronic display located at the gaming table, the electronic display storing a bet minimum and a bet maximum, the bet minimum being a minimum bet permitted at the gaming table and the bet maximum being a maximum bet permitted at the gaming table, the electronic display comprising a display screen;

the electronic display also programmed to display stored advertisements unrelated to the casino game;

the electronic display programmed to continuously perform:

detect any change in the current status by receiving presses of the status input keys;

when the current status is the closed status then display on the electronic display screen the advertisements and not display on the electronic display screen the bet minimum and the bet maximum;

when the current status is the active status, then display on the electronic display screen the bet minimum and the bet maximum;

when the current status is the inactive paused status then display on the electronic display screen the advertisements;

when the current status is the inactive idle status then display on the electronic display screen the advertisements; and when the current status is the inactive idle status after a predetermined period of time, then automatically reducing the bet minimum.

44. The apparatus as recited in claim 43, wherein the electronic display is further programmed such that when the current status is the inactive paused status then display on the electronic display screen both the advertisements and the bet minimum and the bet maximum.

45. The apparatus as recited in claim 44, wherein the electronic display is further programmed such that when the current status is the inactive idle status, then display on the electronic display screen both the advertisements and the bet minimum and the bet maximum.

46. The apparatus as recited in claim 43, wherein the electronic display is further programmed such that when the current status is the inactive idle status, then display on the electronic display screen both the advertisements and the bet minimum and the bet maximum.

47. The apparatus as recited in claim 43, wherein the electronic display is further programmed such that a first block of a plurality of advertisements is displayed when the current status is the closed status and a second block of plurality of advertisements is displayed when the current status is the inactive idle status, the first block being different from the second block.

* * * * *